United States Patent
Cam et al.

(10) Patent No.: US 10,995,414 B2
(45) Date of Patent: May 4, 2021

(54) ELECTROCHEMICAL PROCESS FOR IMPROVING THE GRADE OF IRON

(71) Applicant: HYDRUS TECHNOLOGY PTY. LTD., Murarrie (AU)

(72) Inventors: David Victor Cam, Houston, TX (US); John Frederick Ellers, Cleveland (AU); Brook Douglas Hill, Glass House Mountains (AU)

(73) Assignee: HYDRUS TECHNOLOGY PTY. LTD., Brisbane (AU)

( * ) Notice: Subject to any disclaimer, the term of this patent is extended or adjusted under 35 U.S.C. 154(b) by 0 days.

(21) Appl. No.: 16/250,742

(22) Filed: Jan. 17, 2019

(65) Prior Publication Data
US 2019/0203368 A1    Jul. 4, 2019

Related U.S. Application Data

(63) Continuation-in-part of application No. PCT/AU2017/050743, filed on Jul. 19, 2017.

(30) Foreign Application Priority Data

Jul. 19, 2016    (AU) .......................... AU2016902826

(51) Int. Cl.
*C25C 1/06* (2006.01)
*C25C 7/00* (2006.01)
(Continued)

(52) U.S. Cl.
CPC ............... *C25C 1/06* (2013.01); *C02F 1/001* (2013.01); *C02F 1/488* (2013.01); *C02F 11/125* (2013.01);
(Continued)

(58) Field of Classification Search
CPC ... C02F 1/488; C22B 1/00; C25B 1/00; C25C 1/06
See application file for complete search history.

(56) References Cited

U.S. PATENT DOCUMENTS 2,503,234 A * 4/1950 Cain .......................... C25C 1/06
                                                            205/588
4,639,302 A * 1/1987 Everett ..................... C25C 7/02
                                                            204/258
(Continued)

FOREIGN PATENT DOCUMENTS

CN        103721671 A    4/2014
GB         2500663 A     10/2013
(Continued)

OTHER PUBLICATIONS

Barkley et al., "Emerging Technology Summary: Electro-Pure Alternating Current Electrocoagulation," *EPA Superfund Innovative Technology Evaluation*, Report EPA/540/S-93/504, pp. 1-5 (Sep. 1993).

(Continued)

*Primary Examiner* — Salil Jain
(74) *Attorney, Agent, or Firm* — Leydig, Voit & Mayer, Ltd.

(57) ABSTRACT

The present invention relates to processes including the step of electrochemically treating an iron mineral. The processes are for improving the grade of iron, producing a magnetic iron mineral, or producing an iron oxide. In one aspect, the process for improving the grade of iron includes electrochemically treating a slurry including at least one iron mineral to thereby improve the grade of the iron in the slurry.

20 Claims, 24 Drawing Sheets

(51) Int. Cl.
| | |
|---|---|
| C02F 1/00 | (2006.01) |
| C02F 11/125 | (2019.01) |
| C22B 1/00 | (2006.01) |
| C25B 1/00 | (2021.01) |
| C02F 1/48 | (2006.01) |
| C25B 11/02 | (2021.01) |
| C02F 1/28 | (2006.01) |
| C02F 103/16 | (2006.01) |
| C25B 9/06 | (2006.01) |
| C02F 1/52 | (2006.01) |
| C02F 1/44 | (2006.01) |
| C02F 101/20 | (2006.01) |

(52) U.S. Cl.
CPC .................. *C22B 1/00* (2013.01); *C25B 1/00* (2013.01); *C25C 7/00* (2013.01); *C02F 1/283* (2013.01); *C02F 1/441* (2013.01); *C02F 1/442* (2013.01); *C02F 1/5245* (2013.01); *C02F 2101/203* (2013.01); *C02F 2103/16* (2013.01); *C25B 9/06* (2013.01); *C25B 11/02* (2013.01); *C25C 7/002* (2013.01)

(56) References Cited

U.S. PATENT DOCUMENTS

| | | | | |
|---|---|---|---|---|
| 4,936,909 | A | * | 6/1990 | Takeshima ................ B22F 9/24 75/364 |
| 4,940,549 | A | * | 7/1990 | Olsen ...................... C02F 1/488 210/695 |
| 2009/0090886 | A1 | | 4/2009 | Wong et al. |

FOREIGN PATENT DOCUMENTS

| | | | |
|---|---|---|---|
| SU | 436027 | * | 7/1974 |
| WO | 2015/176137 | A1 | 11/2015 |

OTHER PUBLICATIONS

Bazylinski et al., "Modes of Biomineralization of Magnetite by Microbes," *Geomicrobiology Journal*, 24(6): 465-475 (2007).

Campbell et al., "Mechanochemical Transformation of Haematite to Magnetite," *NanoStructured Materials*, 6(5-8): 735-738 (1995).

Coker et al., "Time-resolved synchrotron powder X-ray diffraction study of magnetite formation by the Fe(III)-reducing bacterium *Geobacter sulfurreducens,*" *American Mineralogist*, 93(4): 540-547 (2008).

Glasauer et al., "Controls on Fe reduction and mineral formation by a subsurface bacterium ," *Geochimica et Cosmochimica Acta*, 67(7): 1277-1288 (2003).

Gualtieri et al., "In Situ Study of the Goethite-Hematite Phase Transformation by Real time Synchrotron Power Diffraction," *American Mineralogist*, 84(5-6): 895-904 (1999).

Hansel et al., "Secondary mineralization pathways induced by dissimilatory iron reduction of ferrihydrite under advective flow," *Geochimica et Cosmochimica Acta*, 67(16): 2977-2992 (2003).

Li et al., "Biomineralization, crystallography and magnetic properties of bullet-shaped magnetite magnetosomes in giant rod magnetotactic bacteria," *Earth and Planetary Science Letters*, 293(3-4): 368-376 (2010).

Matteazzi et al., "Reduction of haematite with carbon by room temperature ball milling," *Materials Science and Engineering: A*, 149(1): 135-142 (1991).

Australian Patent Office, International Report on Patentability in International Patent Application No. PCT/AU2017/050743 (dated Jan. 22, 2019).

Australian Patent Office, International Search Report in International Patent Application No. PCT/AU2017/050743 (dated Oct. 12, 2017).

* cited by examiner

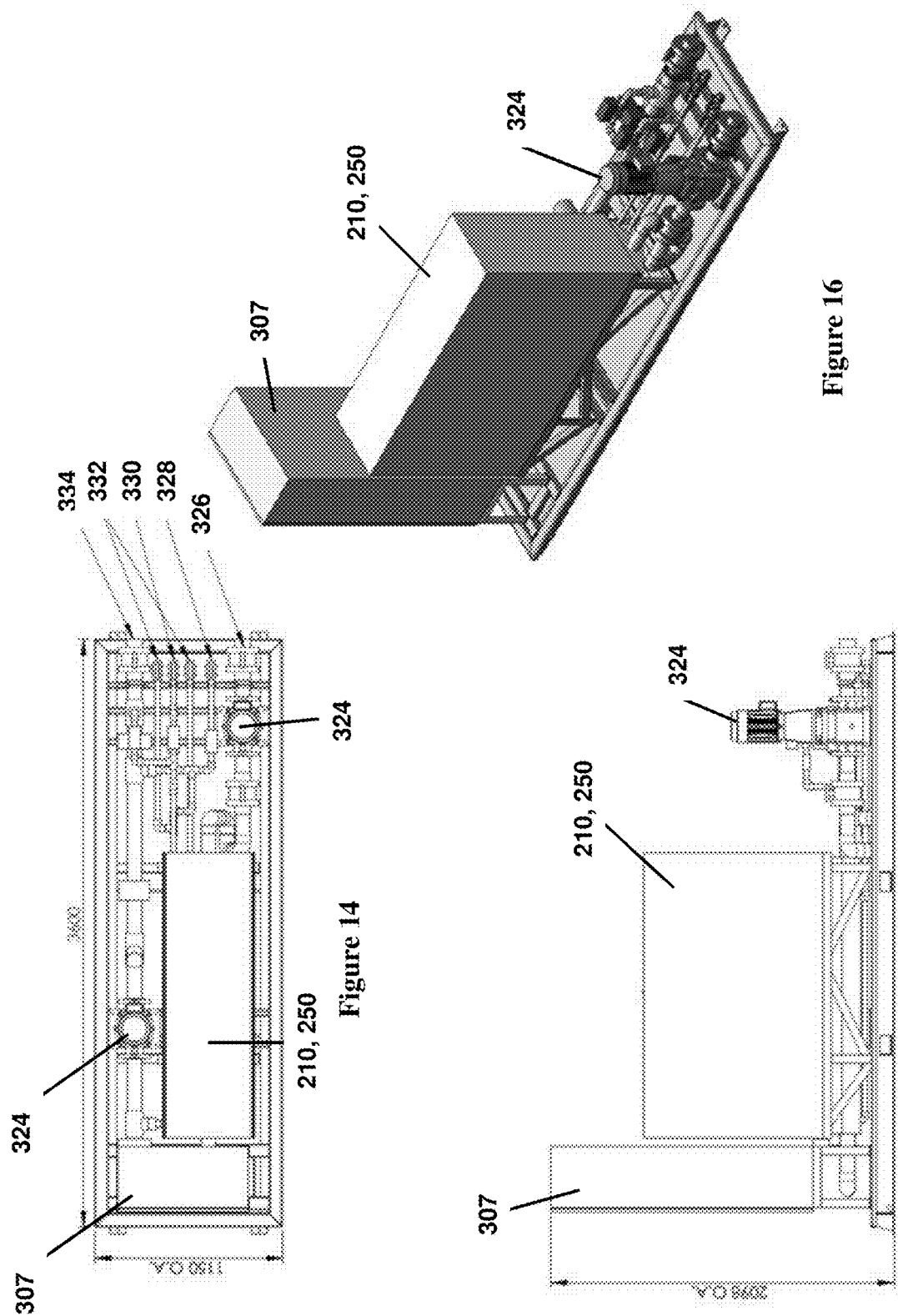

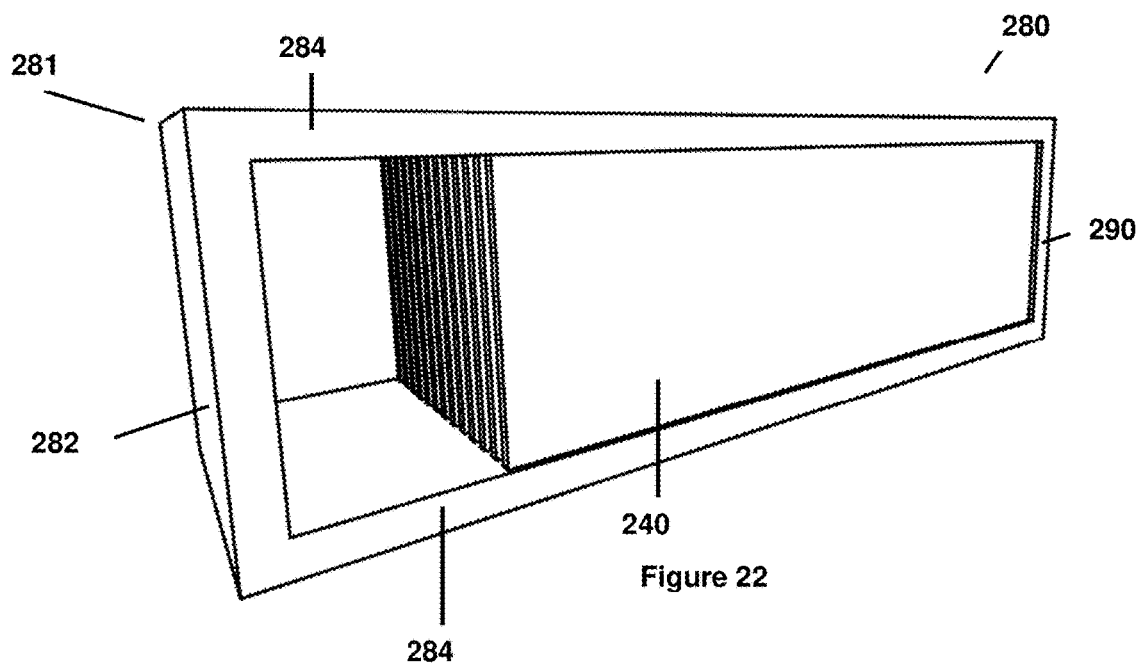
Figure 22
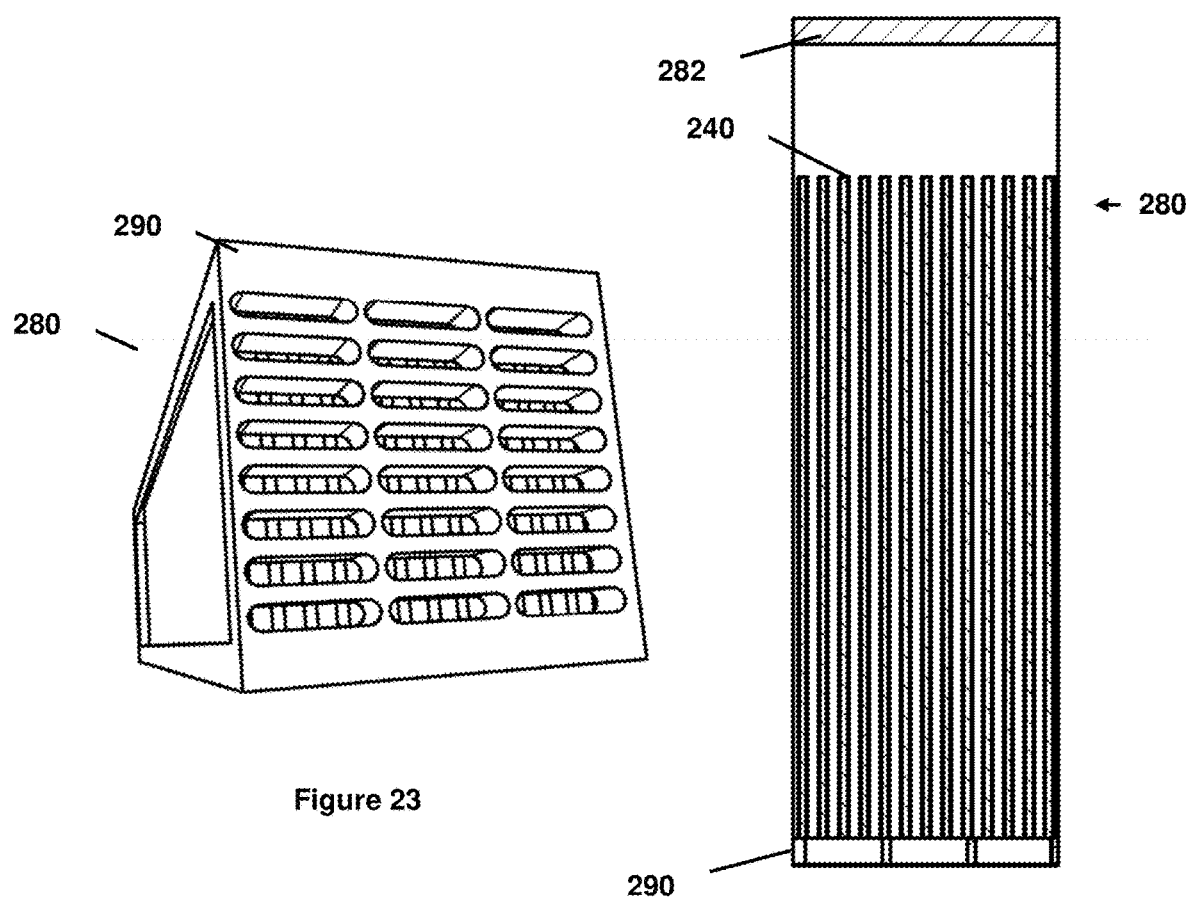
Figure 23
Figure 24

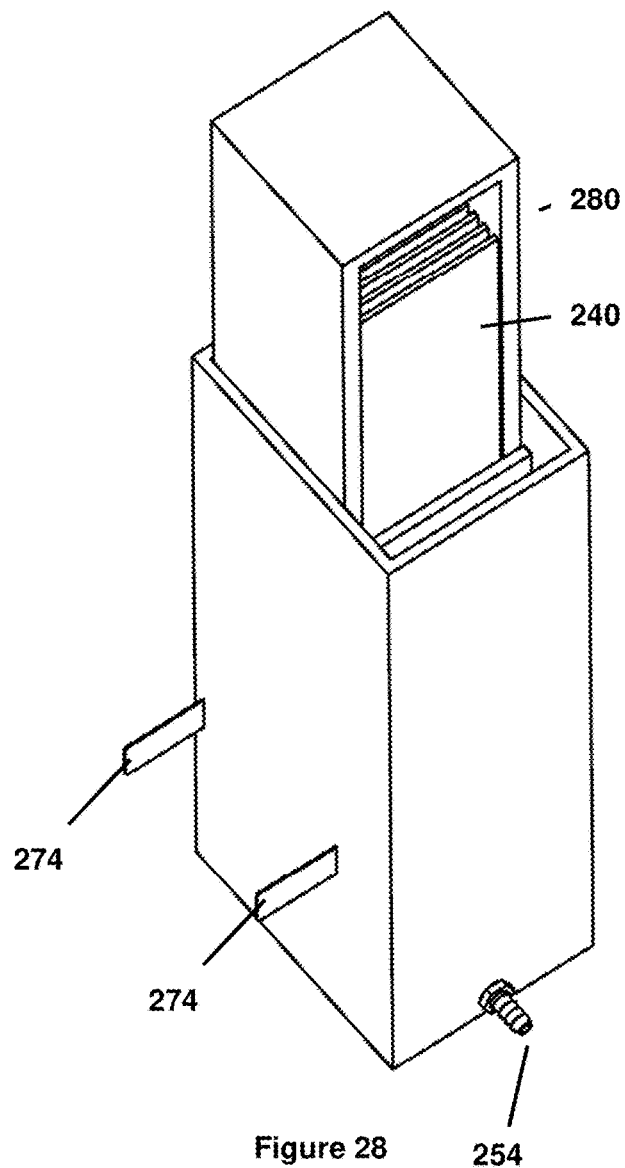
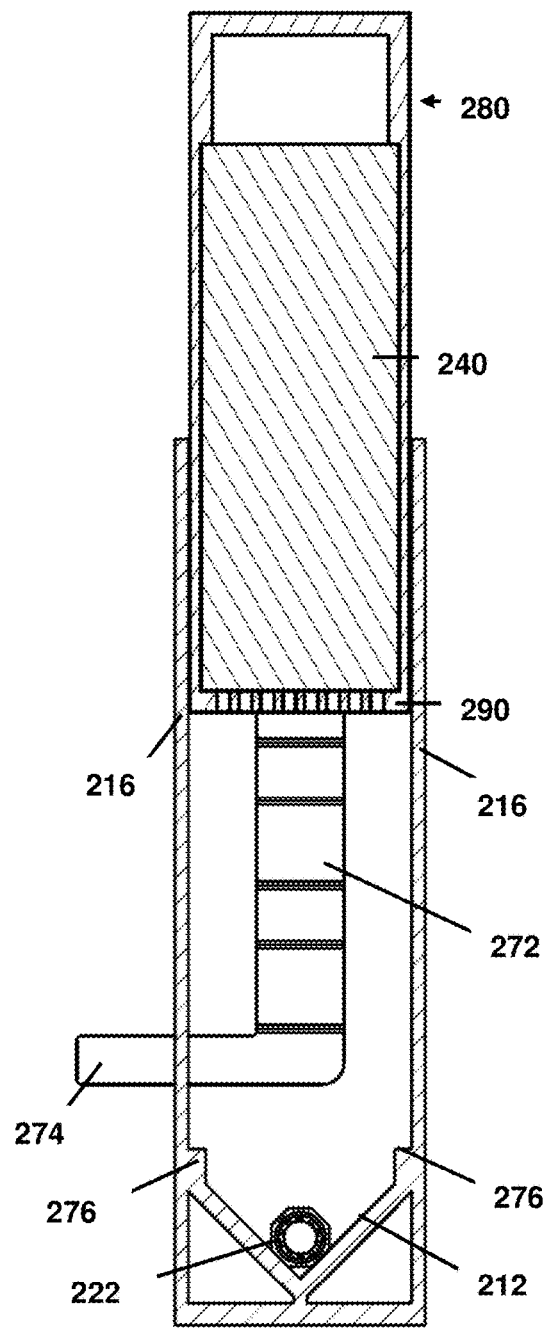
Figure 28
Figure 29

ELECTROCHEMICAL PROCESS FOR IMPROVING THE GRADE OF IRON

TECHNICAL FIELD

The present invention relates, inter alia, to processes for improving the grade of iron or for producing at least one iron oxide (or magnetic iron mineral), and to iron or iron minerals improved or produced by such processes.

BACKGROUND ART

It will be clearly understood that, if a prior art publication is referred to herein, this reference does not constitute an admission that the publication forms part of the common general knowledge in the art in Australia or in any other country.

Global trade in iron ore in 2011 was of the order of 2,800 million metric tonnes. This included 1,200 Mt from China, followed by Australia (480 Mt), Brazil (390 Mt) and India (240 Mt). Some iron ores are of a high grade when mined and can be fed directly into blast furnaces (these are so-called direct shipping ores). However, many iron ores are of a significantly lower grade, and may be subjected to multiple processing or beneficiation steps to obtain a high grade of iron for bulk export. For example, an iron ore may be subjected to crushing and particle size separation as a component of several steps in the ore beneficiation process.

Both dry and wet iron ore beneficiation processes can be used, although wet beneficiation is increasingly used to circumvent challenges associated with dust emissions. In the wet process, some or all of the crushed iron ore is first treated with water to form a slurry which is then pumped through other process stages. The slurry may be further processed before being fed into a hydrocyclone to further separate the larger iron ore particles, and the overflow of the hydrocyclone typically is destined for disposal. The overflow is typically classified as slimes, thickener overflow, process reject or tailings waste. The amount of tailings waste can be significant, and one mine alone, for example, can easily produce 12 megalitres or more of iron containing waste water per day, carrying many thousands of tonnes of fine particulates of mixed iron oxides, hydroxides and carbonates.

In a typical wet beneficiation plant, the thickener overflow or slimes from the hydrocyclone often includes a significant proportion of iron and other solids, such as 90-100 g/L (10%) of iron oxyhydroxide particles and 90% water. However, removing the iron minerals from the waste water is complicated by a range of factors. First, the waste water often includes particles having a small to extremely small particle size and such very small particles may be very difficult to separate. Secondly, the waste water will usually include low grade iron which may be significantly oxidised, and whose crystal lattice may include hydroxyl and carbonate groups and/or water. Thirdly, the iron may be present in the waste water in agglomerations including non-iron substances (such as clays) resulting in levels of impurities such as attached silica and alumina which are unacceptable if present in significant quantity as well as being difficult or costly to separate.

Similarly, mineral treatment processes for other metals may also provide iron mineral-containing slurries which are generally disposed of as waste. For example, the major mineral used to produce aluminium is bauxite which typically includes iron minerals such as ferrihydrite, goethite and hematite. Bauxite is usually first converted to alumina (aluminium oxide, $Al_2O_3$), by the Bayer process and a by-product of this conversion is so-called "red-mud", which includes the iron minerals (at concentrations of up to 60% of the mass of the red-mud). Red mud cannot be disposed of easily and can be a significant disposal problem. However, the red mud may also be a potentially valuable source of iron minerals.

Consequently, a significant quantity of iron-containing minerals is currently disposed of, due to difficulties in processing iron ore-containing wastes. Furthermore, the nature of an iron mineral can be altered by thermal and chemical processing. However, this has not been adopted within the industry, principally because of the very high cost associated with heating an ore to a minimum temperature of 200 degrees Celsius. In fact, often significantly higher temperatures are required to alter the nature of the iron mineral.

Furthermore, apart from the obvious metallic products such as iron castings and more valuable steel alloys such as stainless steel, there are numerous other higher-value products that can be manufactured from iron containing minerals, particularly magnetic materials.

Specialised materials can also be manufactured from iron containing minerals. These products can be used as coagulants and ballast for clarification of water in wastewater treatment, magnetic recording media, heavy media for improving grades of metallurgical and thermal coal, photocatalytic oxidants and filter media for removing contaminants from water and wastewater, pigments for paints and plastic products. More recently there has been a rapid acceleration in the use of iron in biomedical applications with advanced magnetic nanoparticles now being designed for biocompatible drug delivery, magnetic resonance imaging (MRI), hyperthermia and cell separation since they can be targeted, located, activated and observed whilst retaining excellent biodegradability.

Many of the advanced applications requiring magnetic nanoparticles require custom manufacture of these particles and this comes at significant cost. Just as in many other areas of materials science and technology, there is need for an intermediate process to produce less specialised magnetic nano-particles for refinement by other specialist refiners.

The relatively high cost of such magnetic nanoparticles has also precluded the widespread uptake of applications where magnetic nanoparticles can be used advantageously to improve efficiency, for example in clarification processes or contaminant removal within wastewater treatment. For example, fine particulate iron hydroxides marketed as granular ferric hydroxides (GFH) have demonstrated capability in removing contaminants from both potable and wastewater sources and their broader use has been restricted to some extent by the high cost of preparing the materials. With the exponential growth in global demand for clean, potable water, there is a growing demand for new and emerging technologies to deliver the water as well as raw materials and inputs, such as granular ferric hydroxides, to the required water treatment processes.

There is therefore a need to provide a process for the production of iron-containing particles, especially magnetic particles.

SUMMARY OF INVENTION

The present invention is directed to a process for improving the grade of iron or for producing at least one iron oxide, or to iron or iron minerals produced by such a process, which may at least partially overcome at least one of the above-mentioned disadvantages or provide the consumer with a useful or commercial choice. Accordingly, in one embodiment the present invention provides a process to improve the grade of iron obtainable from a slurry, especially from a waste water slurry.

In a first aspect, the present invention relates to a process for improving the grade of iron, the process including the step of electrochemically treating a slurry including at least one iron mineral to thereby improve the grade of the iron in the slurry.

Advantageously, the step of electrochemically treating the slurry changes the type or crystal lattice of at least one iron mineral in the slurry (for example, amorphous iron oxide hydroxides such as ferrihydrite may be converted to hematite or maghemite; and goethite may be converted to hematite, maghemite or magnetite). This may subsequently allow for separation of these iron minerals from the gangue by a magnetic field or by virtue of their increased specific gravity. This separation in turn results in an improvement in the grade of the iron. In one embodiment, the iron minerals separated after electrochemical treatment may be suitable for either direct shipping ore or for higher value uses such as the removal of contaminants from water and wastewater streams. Accordingly, the present invention advantageously may improve the recovery of iron minerals from the tailings of the wet beneficiation processes of traditional iron ore mining.

Furthermore, the process of the present invention advantageously may allow for the cost-effective production of iron oxides with very high surface areas per gram, for example from the tailings of the wet beneficiation process. Such iron oxides may be advantageously used in, for example, removing contaminants from drinking water and processing potable water in the developing world, for example by adsorption processes. Such iron oxides may also represent intermediate, unrefined or less specialised magnetic nanoparticles as a precursor for more advanced applications. Magnetic iron nanoparticles can provide an intermediate material for further refinement for a wide range of other known and emerging market opportunities. The process of the present invention also may be used to improve the recovery of minerals such as coal from coal containing slurries by so-called dense media separation, where the required dense iron containing mineral (comprising principally magnetite), is prepared or purified or separated from the other iron components.

In a preferred embodiment of the present invention, magnetic iron micro or nanoparticles can be created more cost-effectively than by prior art processes known to the inventors.

Any of the features described herein can be combined in any combination with any one or more of the other features described herein within the scope of the invention.

The Slurry Including Iron Minerals

The "slurry" may be a sludge, slime, paste, or tailing, or may be derived from a waste ore. Such slurries are often regarded as worthless or of limited commercial value. The slurry may be a liquid including particles of iron minerals. The liquid may be an aqueous solution, including a saline aqueous solution.

The slurry may include a liquid and a solid, and the liquid is especially water. The slurry may be saline water or water which includes dissolved solids or salts (such as water including relatively high levels of dissolved solids or salts which make the interstitial water substantially more electrically conductive). The slurry may include solids with a particle size below 1 mm (especially a particle size below a screen size of 1 mm). The slurry may include solids with a particle size of: less than 500 µm, less than 400 µm, less than 300 µm, less than 200 µm, less than 175 µm, less than 150 µm, less than 125 µm, less than 100 µm, less than 80 µm, less than 60 µm, less than 40 µm or less than 20 µm. The slurry may include solids with a particle size from 1 µm to 200 µm, more especially from 1 µm to 100 µm or from 4 µm to 80 µm. The slurry may include solids with a particle size from 0.1 µm to 100 µm, more especially from 0.1 µm to 100 µm or from 0.5 µm to 30 µm. The solids may be finely dispersed within the liquid.

The at least one iron mineral (including at least one iron hydroxide, at least one iron oxide hydroxide, non-magnetic iron mineral or iron mineral having a crystal lattice including at least one hydroxide and/or at least one water) may have a particle size as provided in the preceding paragraph. As used herein, the term "iron mineral" refers to iron compositions which are naturally occurring.

In one embodiment, more than 50% of the solids in the slurry (or iron minerals) prior to electrochemical treatment (by weight) (especially more than 55%, 60%, 65%, 70%, 75%, 80%, 85%, 90% or 95% of the solids in the slurry (or iron minerals), or about 100% of the solids in the slurry (or iron minerals)) have a particle size of less than 300 µm, less than 250 µm, less than 200 µm, less than 175 µm, less than 150 µm, less than 125 µm, less than 100 µm, less than 80 µm, less than 60 µm, less than 40 µm or less than 20 µm. In another embodiment, more than 50% of the solids in the slurry (or iron minerals) (by weight) (especially more than 55%, 60%, 65%, 70%, 75%, 80%, 85%, 90% or 95% of the solids in the slurry (or iron minerals), or about 100% of the solids in the slurry (or iron minerals)) have a particle size of greater than 0.5 µm, especially greater than 1 µm, more especially greater than 2 µm, most especially greater than 3 µm, or 4 µm or 5 µm. In a further embodiment, more than 50% of the solids in the slurry (or iron minerals) (by weight) (especially more than 55%, 60%, 65%, 70%, 75%, 80%, 85%, 90% or 95% of the solids in the slurry, or about 100% of the solids in the slurry (or iron minerals)) have a particle size of from 1 µm to 200 µm, especially from 2 µm to 60 µm, most especially from 5 µm to 20 µm. Without wishing to be bound by theory, it is believed that the small size of the particles assists in keeping the solids of the slurry in suspension by virtue of the Van der Waals forces or Brownian motion of the particles.

The slurry may include less than 50% solids (by weight), especially less than 45% solids, or less than 40% solids, more especially less than 35% solids, or 30% solids, most especially less than 25% solids. In some embodiments, the slurry includes less than 20% solids (by weight), or less than 19%, 18%, 17%, 16%, 15%, 14%, 13%, 12%, 11% or 10% solids, or less than 9%, 8%, 7%, 6%, 5%, 4%, or 3% solids (by weight). In other embodiments, the slurry includes more than 1% solids (by weight), especially more than 2% solids or more than 3% solids (by weight), especially more than 4%, 5%, 6%, 7%, 8%, 9%, 10% or 11% solids. In a further embodiment, the slurry includes about 12% solids (by weight). In a further embodiment, the slurry includes about 2.5% solids (by weight).

The solids in the slurry may include at least one iron mineral and at least one non-iron substance. The slurry may include at least one iron mineral selected from the group consisting of: an iron hydroxide, an iron oxide hydroxide, an iron oxide, a magnetic iron mineral, a non-magnetic iron mineral, bauxite, siderite ($FeCO_3$), and jarosite. The at least one iron mineral may be especially selected from the group consisting of ferrihydrite, goethite, hematite, bauxite, iron (III) hydroxide and limonite; more especially selected from the group consisting of ferrihydrite, goethite and hematite. The at least one non-iron substance may include kaolinite, illite or other alumina clay, zircon, rutile or ilmenite, a silicate such as quartz or chert, a sulfate such as alunite or any suitable impurity.

The iron hydroxide may be or include an iron (III) hydroxide, for example, $Fe(OH)_3$. The iron oxide hydroxide may be an iron (III) oxide hydroxide, more especially goethite ($\alpha$-FeO(OH)), proto-goethite, limonite, akaganeite, lepidocrocite ($\gamma$-FeO(OH)), $Fe_2O_3$—$Fe_2(OH)$, $Fe_2O_3$—$Fe(OH)_2$ or ferrihydrite; most especially ferrihydrite, or goethite. In another embodiment, the iron hydroxide may be a mixture, such as a goethite mixture including aluminium and silica substitutions.

The iron oxide may be or include hematite ($Fe_2O_3$), magnetite ($Fe_3O_4$), maghemite or proto-magnetite. As used herein, the term "iron oxide" does not encompass iron oxide hydroxides, such as goethite, limonite and ferrihydrite. Similarly, as used herein the term "iron hydroxide" does not encompass iron oxide hydroxides, such as goethite, limonite and ferrihydrite. The magnetic iron mineral may include magnetite ($Fe_3O_4$), maghemite, pyrrhotite, greigite, or proto-magnetite (to the inventors' knowledge these are the main magnetic iron minerals). As used herein the term "non-magnetic iron mineral" may include, for example, an iron (III) hydroxide or hematite.

Ferrihydrite is considered to be the most bio-available Fe(III)-containing oxide present in the subsurface, and it has only short-range structural order and a small particle size compared to other more crystalline Fe(III)-oxides. The degree of isomorphous substitution of Fe by other cations can be determined by chemical analysis provided that the sample consists only of one phase and that all of the foreign cations are incorporated into the structure. However because of its small to very small particle size, ferrihydrite has long been regarded as being amorphous whereas in fact its structure consists, in ideal form, of 20 vv % $FeO_4$ tetrahedra and 80 vv % $FeO_6$ octahedra. Furthermore ferrihydrite, intimately mixed with goethite, is a dominant feature of iron ore tailings, particularly of the Banded Iron Formation (BIF) mode of genesis and may make up more than 20% of the total Fe in sediments.

In one embodiment, the ferrihydrite is two-line or six-line ferrihydrite. Crystalline six-line ferrihydrite may have an average composition of $FeOOH \cdot 0.2H_2O$ to $FeOOH \cdot 0.4H_2O$ (where the $H_2O$ represents chemically absorbed water). Crystalline two-line ferrihydrite may be more amorphous than 6-line ferrihydrite and may have an average composition of $Fe_{8.2}O_{8.5}(OH)_{7.4} \cdot 3(H_2O)$ to $FeO_{1.04}(OH)^{0.9} \cdot 0.36H_2O$ (where the $H_2O$ represents chemically absorbed water). In another embodiment, the ferrihydrite is of the general form $Fe_{10}O_{14}(OH)_2$. In a further embodiment, the ferrihydrite includes about 20 vv % $FeO_4$ tetrahedra and/or about 80 vv % $FeO_6$ octahedra.

Goethite may be similarly considered to be a multilayered ferric oxide hydroxide mineral with the lowest energy state coinciding with a double $H_2O$ layer bonded in turn to a single $OH_2$—OH hydroxide layer being finally bonded to an inner $Fe^{3+}$ ion bonded to O at the centre. The opposite face may consist of essentially the same crystal geometry in mirror opposite such that it can be described chemically as an $FeOH_2$—$Fe_2OH$ layered structure with an alpha-FeOOH-1.0.0 surface. In these example cases, a dominant feature is the separate bonding to what is chemically attached water.

The term "proto-goethite" refers to an intermediate between 2- or 6-line ferrihydrite and goethite, and the intermediate may be a transient mineral. The proto-goethite may be structurally similar to goethite, but proto-goethite may have a shorter c-axis [4.467(20) Å] than crystalline goethite, a function of size (<2 nm) where quantum properties prevail.

In general hematite is considered to be a high grade iron ore and may result from localised geochemical concentration or meta-somatism. Hematite may carry directly reducible iron content in the range 45-68% Fe and for direct shipping, preferably in the range 62-64% Fe. As used herein, the term "hematite" encompasses "haematite" in accordance with emerging practice and recent scientific documents. By contrast, magnetite can be found in much larger reserves, but usually at significantly lower grades—typically grading 10-40% total Fe. However, magnetite, once liberated from gangue minerals with which it is intimately associated, is favourably susceptible to concentration by magnetic separation. One of the major challenges to the further development of very large magnetite deposits is the relatively high cost of milling the ore to release the magnetite component from the gangue, the so-called "liberation" size. If the particle size required to liberate the contained magnetite is too small, and depending on the value of the recovered magnetite in international markets, commercial recovery may not be commercially viable.

The term "proto-magnetite" refers to an intermediate between goethite and magnetite, and the intermediate may be a transient mineral. The proto-magnetite may be an iron mineral having the formula (repeating unit) $Fe_xO_y$ where x is a number from 2 to 3.5 (especially from 2.4 to 3.0, more especially from 2.75 to 2.9) and y is a number from 3.5 to 4.5 (especially from 3.55 to 4.3, more especially from 3.8 to 4.2). Proto-magnetite may be identified by long tetrahedral (2.113 Å) and short octahedral (1.943 Å) Fe—O bonds compared to stoichiometric magnetite, possibly indicative of a coordination crossover caused by charge density [Fe(II)] migration to tetrahedral sites. However proto-magnetite may possess many of the characteristics of conventional or mineralogical magnetite, especially the ease of separation from tailings streams (through application of a magnetic field).

X-ray diffraction patterns are the principal mechanism used to determine the mineralogy associated with the global trade in iron ore. The X-ray diffraction pattern of a particle held within a powdered ore sample is a plot of the observed diffracted intensity of the X-rays against the Bragg angle, i.e. the angle at which the X-rays strike the mineral crystal and for which the maximum interference is observed. An XRD pattern of a crystalline phase, therefore, consists of a number of reflections (peaks) of different intensities which provide a fingerprint of the atomic structure. From these patterns the mineral-specific distances between the atomic layers (d-values) can be calculated using the Bragg equation and from the set of d-values the mineral(s) can be identified. The d-values for each mineral are recorded and collated in what is referred to as the Powder Diffraction File or PDF which is administered by the International Centre for Diffraction Data in Pennsylvania, USA.

The highly weathered iron oxide and hydroxide minerals found in banded iron formations or BIF, generally have a layered structure, which provides them with the ability to allow isomorphous substitution of Fe by other cations with a similar inter-atomic distance. The degree of substitution can be determined by chemical analysis provided that the sample consists only of one phase and that all of the foreign cations are incorporated into the structure. A definite proof of structural incorporation, however, only can be deduced from a shift in the position of the XRD peaks. However one of the failures of the instrumental method, is that a shift only occurs if the replacing cation is sufficiently different in size from that of the $Fe^{3+}$ ion it replaced or substituted. Another disadvantage of the XRD method is the general inability to resolve non-crystalline (or 'amorphous') particles of typically less than 30 micron particle size. This is a major limitation when dealing with slurries of very fine particles.

Since the relative change in cell edge lengths depends on the way in which the samples are synthesized, the degree of cation substitution within an unknown sample can only be obtained from relationships between the chemical composition and the crystallographic data for mono-mineralic phases which have been synthesized in the same or similar way. This limitation of the industry's preferred instrumental method has hindered progress in this specialised area.

The solids in the slurry may include (% by weight) more than 40% of the at least one iron mineral; especially more than 45% or more than 50% or more than 55% of the at least one iron mineral; more especially more than 60% or more than 65% or more than 70% of the at least one iron mineral; most especially more than 75% or more than 80% or more than 85% or more than 90% of the at least one iron mineral. The solids in the slurry may include (% by weight) more than 30% goethite or more than 35% goethite; especially more than 40% goethite or more than 45% goethite; most especially more than 50% goethite. The solids in the slurry may include (% by weight) less than 60% goethite, more especially less than 55% goethite, most especially less than 52.5% goethite. The solids in the slurry may include (% by weight) less than 35% hematite or less than 30% hematite, more especially less than 25% hematite, most especially less than 20% hematite.

The slurry (or solids in the slurry) may be less than 55% grade iron; especially less than 54% grade iron, or less than 52.5% grade iron or less than 50% grade iron; more especially less than 47.5% grade iron or less than 45% grade iron. The slurry (or solids in the slurry) may be more than 30% grade iron; especially more than 32.5% grade iron or more than 35% grade iron; more especially more than 37.5% grade iron or more than 40% grade iron; most especially more than 42.5% grade iron or more than 44% grade iron.

In a first exemplary embodiment, the slurry is derived from iron mineral processing. The slurry may be the overflow (or reject) of a hydrocyclone; especially the overflow (or slimes) of a hydrocyclone from the wet beneficiation of iron mineral processing; more especially the overflow of a hydrocyclone from processing banded iron or banded ironstone formations (BIF). BIF typically includes repeated, thin layers ranging from several millimetres to a few centimetres in thickness and includes either magnetite ($Fe_3O_4$) or hematite ($Fe_2O_3$) alternating with bands of predominantly amorphous materials (which include 2 and 6 line ferrihydrite) as well as iron poor shales and cherts of similar thickness and colour containing micro bands (sub-millimetre) of hydrated iron oxides and hydroxides as well as carbonates and oxy-hydroxides. In North America, Banded Iron Formations are known as Taconite. Notably, a hydrocyclone typically has difficultly separating wanted material having a particle size of less than 40 µm from gangue, as a consequence of which the hydrocyclone overflow may include, for example, hematite having a particle size of less than 40 µm.

In a second exemplary embodiment, the slurry is derived from mineral processing of an ore including iron. One example type of ore including iron is bauxite. Bauxite is a mixture of aluminium and iron minerals (especially iron oxide hydroxides and iron oxides such as ferrihydrite, goethite and hematite). Without wishing to be bound by theory, bauxite is believed to include largely boehmite, goethite and ferrihydrite with aluminium occupying vacancies in the atomic lattice structure. Again, without wishing to be bound by theory, in the goethite structure aluminium may occupy up to 33% by weight, and in the 2 line ferrihydrite structure aluminium may occupy up to 25% of the atomic lattice. Bauxite is used in the preparation of aluminium oxide (alumina) via the Bayer process with a by-product of so-called 'red mud' which includes residual iron minerals such as iron oxide hydroxides and iron oxides including goethite, ferrihydrite and hematite (the iron oxide hydroxides and iron oxides especially may correspond generally to the formula $Fe_2O_3$—$Fe\_(OH)$ or $Fe_2O_3$—$Fe(OH)_2$ where the Fe and $Fe_2O_3$ correspond to the more valuable hematite component and the $Fe_2OH$ or $Fe(OH)_2$ correspond to the more highly weathered (hydrated and oxidised) components which include the minerals ferrihydrite and goethite). The red colour is caused by the oxidised iron present and may make up to 60% of the mass of the red mud. As discussed above, red mud cannot be disposed of easily and presents one of the aluminium industry's most important disposal problems.

Electrochemical Treatment Methods

The step of electrochemically treating the slurry may include passing the slurry between at least two electrodes, especially between a plurality of electrodes. Features of the apparatus which may be used in the process may be as described below.

In the first aspect, the step of electrochemically treating the slurry thereby improves the grade of the iron. As used herein, the term "grade of iron" refers to the percentage of iron (Fe) in the solids of the slurry. The grade of iron is typically the percentage (by weight) of iron (Fe) in a solid. For example, neat hematite ($Fe_2O_3$) could achieve a 70% grade iron. Similarly, neat magnetite ($Fe_3O_4$) could achieve a 72% grade iron. The balance of the solid minerals in the slurry may typically consist of alumina, silica, other metallic cations, as well as chemically combined water and hydroxyl, sulfate, carbonate and chloride ions.

Improvements (or increases) in the grade of iron may be achieved by changes in the crystal structure of an iron mineral or by removal or separation of components of the slurry. Changes in the crystal structure of an iron mineral may include one or more of the group consisting of: loss of bound chemicals (such as water, or ions such as hydroxide, carbonate, sulfate or chloride); reduction of iron; changes in the ligands; and insertion of an iron ion into the crystal lattice (especially substitution of an iron ion in the crystal lattice). For example, loss of water may occur if limonite ($FeO(OH).nH_2O$) is converted to hematite ($Fe_2O_3$). Reduction of iron may occur if hematite ($Fe_2O_3$— iron is $Fe^{3+}$) is converted to magnetite ($Fe_3O_4$— iron is $Fe^{2+}$ and $Fe^{3+}$). Changes in the ligands of an iron mineral may occur if goethite (FeO(OH)) is converted to hematite ($Fe_2O_3$). Insertion of an iron ion into a vacant or previously occupied position within the crystal lattice may occur if $Fe^{2+}$ is inserted into a crystal lattice to form maghemite or magnetite. In this case it is believed that the change occurs as a result of the shared electron in the outer atomic orbitals. The $Fe^{2+}$ may be at least partly derived from either the use of a high intensity electrical field generated by a sacrificial anode or other source (the choice of current intensity and source of iron may be selected with some trial and error by a skilled person). Removal or separation of components of the slurry may be achieved (especially more cost effectively) if, for example, ferrihydrite is converted to a magnetic mineral such as proto-magnetite, magnetite or maghemite, and then one or a series of magnets (such as fixed or rotating magnets) or other magnetic apparatus are used to separate the magnetic minerals from the gangue, whether wet or dry.

Without wishing to be bound by theory, the lattice structure of many of the above-mentioned iron minerals may be considered to lie on a spectrum having varying contents of water, hydroxyl and carbonate groups and vacancy substitutions that affect the magnetic and crystal chemical properties of the mineral. Advantageously, the step of electrochemically treating the slurry may result in dissociation of hydroxyl ligands or bound-hydroxyl ions and bound-water (especially surface water which is typically weakly bonded) from an iron mineral. When the iron mineral is largely ferrihydrite and/or goethite, the electrochemical treatment may enable formation of transitional proto-magnetite and/or proto-goethite and subsequently magnetite mineral assemblages. In turn, this may allow for separation by combinations of gravity and/or a magnetic field. The electrochemical treatment may involve, for example, modification of oxidation reduction (REDOX) potentials, pH and/or specific dissolved components in the matrix either sourced from a sacrificial anode or added to the mixture.

Without wishing to be bound by theory, even ignoring the chemically combined water, the electrochemical treatment may convert iron minerals towards the right in the spectrum provided below, simply by eliminating the weak hydroxyl bonds since on a formula weight basis alone, this increases iron content from 68.4% to 71.4% to 72.4% as shown in the table below.

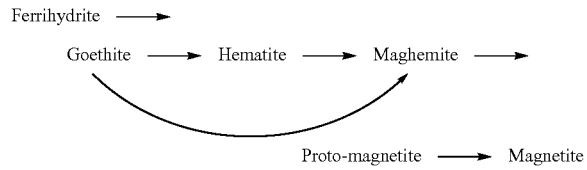

TABLE 1

Percentage of iron (by weight) in various iron minerals

| Example Formula | Type of Mineral[1] | Iron atoms | Oxygen atoms | Hydroxyl groups | Formula weight | % iron (by weight) |
|---|---|---|---|---|---|---|
| $Fe_{10}O_{14}(OH)_2$ | Ferrihydrite | 10 | 14 | 2 | 816.45 | 68.4% |
| FeO(OH) | Goethite | 1 | 1 | 1 | 88.85 | 62.9% |
| $\alpha\text{-}Fe_2O_3$ | Hematite | 2 | 3 | 0 | 159.69 | 69.9% |
| $\gamma\text{-}Fe_2O_3$ | Maghemite | 2 | 3 | 0 | 159.69 | 69.9% |
| $Fe_{2.87}O_4$ | Protomagnetite | 2.87 | 4 | 0 | 223.55 | 71.4% |
| $Fe_3O_4$ | Magnetite | 3 | 4 | 0 | 231.53 | 72.4% |

[1]There may be other forms of these minerals with different formulae

However, the electrochemical treatment may not convert the iron minerals fully to magnetite or proto-magnetite; hematite or proto-magnetite may be end-products of the electrochemical treatment, as well as magnetite. It may be advantageous for the electrochemical treatment to provide proto-magnetite or magnetite, as in water suspension hematite may rapidly convert back to goethite once the electrochemical treatment is complete. Furthermore, proto-magnetite and magnetite are magnetic, which simplifies separation of these iron minerals from the gangue.

In one embodiment, the electrochemical treatment converts at least one of an iron hydroxide or iron oxide hydroxide (especially goethite or ferrihydrite) to an iron oxide (especially at least one of hematite, proto-magnetite, maghemite and magnetite; more especially hematite or proto-magnetite).

Accordingly, in a second aspect the present invention relates to a process for producing at least one iron oxide, the process including the step of electrochemically treating at least one iron hydroxide and/or at least one iron oxide hydroxide, to thereby produce the at least one iron oxide. In one embodiment, the at least one iron oxide is at least one magnetic iron mineral.

Furthermore, in a third aspect the present invention relates to a process for removing hydroxide and/or water from at least one iron mineral having a crystal lattice including at least one hydroxide and/or at least one water, the process including the step of electrochemically treating said at least one iron mineral to thereby remove hydroxide and/or water from said at least one iron mineral.

In one embodiment, the step of electrochemically treating said at least one iron mineral is a step of electrochemically treating a slurry or liquid including said at least one iron mineral.

In a fourth aspect, the present invention relates to a process for producing a magnetic iron mineral, the process including the step of electrochemically treating at least one non-magnetic iron mineral to thereby produce the magnetic iron mineral.

In one embodiment, the step of electrochemically treating at least one non-magnetic iron mineral is a step of electrochemically treating a slurry including at least one non-magnetic iron mineral.

A slurry including iron minerals may include the iron mineral of the third aspect and/or the iron hydroxide and/or iron oxide hydroxide of the second aspect. Features of the first, second, third and fourth aspects of the present invention may be as described above and below.

In one embodiment, the processes of the present invention may include the step of adjusting the pH of the slurry (or liquid) for (or prior to) electrochemical treatment. The pH may be adjusted to a pH of from 4 to 10, especially from 5 to 9, more especially from 6 to 8.5, most especially from 6.5 to 8.5 or from 7 to 8. The step of adjusting the pH of the slurry may include the step of adding a base to the slurry, especially adding an alkali hydroxide, more especially sodium hydroxide. The step of adjusting the pH of the slurry (or liquid) may include acidifying the slurry, and then basifying the slurry. The step of adjusting the pH of the slurry (or liquid) may include reducing the pH of the slurry to below 6, especially below 5 or below 4 or below 3 or below 2. The step of adjusting the pH of the slurry may further include the step of increasing the pH of the slurry to more than 6, especially more than 7, or more than 8 or more than 9.

In another embodiment, the processes of the present invention may include the step of adding a carboxylic acid to the slurry, especially a carboxylic acid of the formula R—COOH or R-COOM. R may be an alkyl (especially $C_{1-12}$alkyl or $C_{1-6}$alkyl), an alkylene (especially $C_{1-12}$alkylene or $C_{1-6}$alkylene), or an aromatic group (such as phenyl or naphthyl), wherein the alkyl, alkylene and aromatic group may be optionally substituted with one or more $C_{1-6}$alkyl, hydroxyl, —O—$C_{1-6}$alkyl, —O—CO—$C_{1-6}$alkyl, —CO—O—$C_{1-6}$alkyl, halo (such as fluoro, iodo, bromo or chloro), halo$C_{1-6}$alkyl, or nitro. M may be any suitable cation, such as sodium or potassium. In one embodiment, the carboxylic acid is especially a $C_{1-6}$alkyl carboxylic acid, most especially acetic acid. Any suitable amount of carboxylic acid may be added to the slurry. In one embodiment, about from 0.2:14 to 4:1 of carboxylic acid:solids in slurry may be added to the slurry, especially from 0.5:1 to 3.5:1 of carboxylic acid:solids in slurry may be added to the slurry, more especially from 0.8:1 to 3:1, or 1:1 to 3:1 of carboxylic acid:solids in slurry may be added to the slurry, most especially from 1.5:1 to 2.5:1 or about 1.9:1 of carboxylic acid:solids in slurry may be added to the slurry (on a weight:weight basis).

In one embodiment, the electrochemical treatment is performed in the presence of a carboxylic acid, as defined in the preceding paragraph. In one embodiment, the electrochemical treatment is performed in the presence of about from 0.2:1 to 4:1 of carboxylic acid:iron mineral, especially from 0.5:1 to 3.5:1 of carboxylic acid:iron mineral, more especially from 0.8:1 to 3:1, or 1:1 to 3:1 of carboxylic acid:iron mineral, most especially from 1.5:1 to 2.5:1 or about 1.9:1 of carboxylic acid:iron mineral (on a weight:weight basis).

In one embodiment, the electrochemical treatment produces a slurry including proto-magnetite, especially an aqueous slurry including proto-magnetite. Proto-magnetite may be a preferred end-product of the electrochemical conversion. For example, a slurry including a low grade ferrihydrite and/or goethite may be electrochemically treated to dissociate water and hydroxyl ligands and then an additional $Fe_2$ ion may be introduced within the molecular lattice structure to transition to hematite and then form proto-magnetite.

Without wishing to be bound by theory, exemplary electrochemical reactions relating to the conversion of iron (III) hydroxide (Fe(OH)$_3$) to magnetite (Fe$_3$O$_4$) are provided below. By mimicking the reaction found in nature, as shown in reaction [1], Fe$^{3+}$ is first reduced to Fe$^{2+}$ along with production of hydroxide (contributing to a high pH which is favourable for magnetite formation). It is believed that the Fe$^{2+}$ (Fe(II)) that forms in reaction [1] then adsorbs onto other ferric hydroxide particles, which is then transformed into magnetite (reaction [2]). It is believed that the combination of a high Fe(II) concentration and high pH at the contact of the Fe(III) solid coupled with the energy intensity associated with a simultaneous electrical and magnetic field (derived from electrodes within the electrochemical apparatus the subject of this invention), provides a suitable interface for secondary magnetite formation.

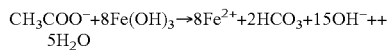

$$CH_3COO^- + 8Fe(OH)_3 \rightarrow 8Fe^{2+} + 2HCO_3^- + 15OH^- + 5H_2O \quad [1]$$

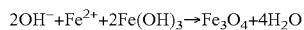

$$2OH^- + Fe^{2+} + 2Fe(OH)_3 \rightarrow Fe_3O_4 + 4H_2O \quad [2]$$

Magnetite may also electrochemically form by reduction of green-blue iron hydroxide compounds under reducing and weakly acid to weakly alkaline conditions as intermediate phases in the formation of iron oxides (such as goethite, lepidocrocite and magnetite). It is believed that lepidocrocite (γ-FeOOH), a polymorph of goethite, proceeds inorganically to magnetite via a ferrous hydroxide intermediate as illustrated in reaction [3].

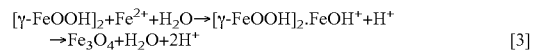

$$[\gamma\text{-FeOOH}]_2 + Fe^{2+} + H_2O \rightarrow [\gamma\text{-FeOOH}]_2\cdot FeOH^+ + H^+ \rightarrow Fe_3O_4 + H_2O + 2H^+ \quad [3]$$

Notably, the reactions above involve Fe$^{2+}$ (or Fe(II)). The Fe(II) (which may be in solution or sorbed on a mineral surface) may act as a catalyst in the mineral conversions to magnetite. Fe(II) may be formed from the reductive dissolution of an iron(II) mineral (such as ferrihydrite or iron(III) hydroxide), or may be introduced by the use of a sacrificial anode including iron or steel or an alloy thereof or by the partial acidulation of a component of the slurry (such as an iron oxide hydroxide, such as goethite or lepidocrocite), possibly by the localised dissolution of nano-particulate by a carboxylic acid (such as acetic acid). Alternatively, and with greater process complexity, the Fe(II) may be formed in the above way, but also with the addition of a ferrous salt (especially a water soluble ferrous salt), such as jarosite or ferrous sulphate.

The solids in the slurry after electrochemical treatment may include at least one iron mineral and at least one non-iron substance. The solids in the slurry after electrochemical treatment may include at least one iron oxide. In one embodiment, the at least one iron mineral after electrochemical treatment may be selected from the group consisting of: goethite, hematite (Fe$_2$O), maghemite (gamma-Fe$_2$O$_3$), magnetite (Fe$_3$O$_4$), proto-magnetite, siderite (FeCO$_3$), and jarosite; especially hematite, magnetite and proto-magnetite. The at least one non-iron substance after electrochemical treatment may include a clay mineral, illite or kaolinite, a silicate such as quartz, any titanium mineral or any suitable impurity.

The proportion of the at least one iron mineral in the solids of the slurry relative to the at least one non-iron substance after the electrochemical treatment may be as described above for before the electrochemical treatment. The solids in the slurry after the electrochemical treatment may include (% by weight) less than 10% goethite or less than 8% goethite or less than 6% goethite; especially less than 4% goethite or less than 2% goethite; most especially less than 1% goethite. The solids in the slurry after the electrochemical treatment may include (% by weight) more than 40% hematite, magnetite and proto-magnetite or more than 45% hematite, magnetite and proto-magnetite; especially more than 50% hematite, magnetite and proto-magnetite or more than 55% hematite, magnetite and proto-magnetite; more especially more than 60% hematite, magnetite and proto-magnetite; most especially more than 65% hematite, magnetite and proto-magnetite. The solids in the slurry after the electrochemical treatment may include (% by weight) more than 40%, hematite or more than 45% hematite; especially more than 50% hematite or more than 55% hematite; more especially more than 60% hematite; most especially more than 65% hematite. The solids in the slurry after the electrochemical treatment may include (% by weight) more than 40% magnetite or proto-magnetite or more than 45% magnetite or proto-magnetite; especially more than 50% magnetite or proto-magnetite or more than 55% magnetite or proto-magnetite; more especially more than 60% magnetite or proto-magnetite; most especially more than 65% or more than 70%, more than 75%, more than 85% or more than 90% magnetite or proto-magnetite. The solids in the slurry after the electrochemical treatment may include (% by weight) more than 40%, more than 45%, more than 50%, or more than 55% of magnetic iron mineral; especially more than 60%, more than 65%, more than 70%, more than 75%, more than 80% of a magnetic iron mineral; most especially more than 85% or more than 90% of a magnetic iron mineral.

The slurry after electrochemical treatment may be more than 35% grade iron; especially more than 40% grade iron or more than 45% grade iron; most especially more than 47% grade iron. The slurry after electrochemical treatment may be less than 73% grade iron; especially less than 70% grade iron or less than 65% grade iron; more especially less than 60% grade iron or less than 55% grade iron; most especially less than 50% grade iron.

In one embodiment, the electrochemical treatment increases the specific gravity or density of the iron minerals in the slurry, for example as a result of removing hydroxyl ions and adsorbed water from the lattice of the iron minerals. In a further embodiment, the electrochemical treatment increases the magnetic field strength of the solids in the slurry, especially by ordering the electron spins into a transient, temporary or more permanently parallel configuration. After the electrochemical treatment the iron minerals in the solids of the slurry may have one or more of: greater particle density, a low variability as to specific gravity, a low variability as to magnetic field strength, a relatively uniformly high magnetic field strength and a higher degree of uniformity; especially all of: a low variability as to specific gravity, a low variability as to magnetic field strength, a relatively uniformly high magnetic field strength and a higher degree of uniformity.

The slurry after electrochemical treatment may include solids with a particle size below 1 mm (especially a particle size below a screen size of 1 mm). The slurry after electrochemical treatment may include solids with a particle size of: less than 500 µm, less than 400 µm, less than 300 µm, less than 200 µm, less than 175 µm, less than 150 µm, less than 125 µm, less than 100 µm, less than 80 µm, less than 60 µm, less than 40 µm or less than 20 µm. The slurry after electrochemical treatment may include solids with a particle size from 0.5 or 1 µm to 200 µm, more especially from 0.5 or 1 µm to 100 µm or from 0.5 or 4 µm to 80 µm, or from 4 µm to 30 µm. The solids may be finely dispersed within the liquid.

In one embodiment, the at least one iron mineral after electrochemical treatment (including the at least one iron oxide, magnetic iron mineral or iron mineral having a crystal lattice from which hydroxide and/or water has been removed) may have a particle size as described in the preceding paragraph.

In one embodiment, more than 50% of the solids (or iron minerals) in the slurry after electrochemical treatment (by weight) (especially more than 55%, 60%, 65%, 70%, 75%, 80%, 85%, 90% or 95% of the solids (or iron minerals) in the slurry, or about 100% of the solids (or iron minerals) in the slurry) have a particle size of less than 300 µm, less than 250 µm, less than 200 µm, less than 175 µm, less than 150 µm, less than 125 µm, less than 100 µm, less than 80 µm, less than 60 µm, less than 40 µm, less than 30 µm or less than 20 µm. In another embodiment, more than 50% of the solids (or iron minerals) in the slurry after electrochemical treatment (by weight) (especially more than 55%, 60%, 65%, 70%, 75%, 80%, 85%, 90% or 95% of the solids (or iron minerals) in the slurry, or about 100% of the solids (or iron minerals) in the slurry) have a particle size of greater than 0.5 µm, especially greater than 1 µm, more especially greater than 2 µm, most especially greater than 3 µm, or 4 µm or 5 µm. In a further embodiment, more than 50% of the solids (or iron minerals) in the slurry after electrochemical treatment (by weight) (especially more than 55%, 60%, 65%, 70%, 75%, 80%, 85%, 90% or 95% of the solids (or iron minerals) in the slurry, or about 100% of the solids (or iron minerals) in the slurry) have a particle size of from 1 µm to 200 µm, especially from 2 µm to 60 µm, most especially from 5 µm to 40 µm, or from 5 µm to 30 µm.

The step of electrochemically treating the slurry may be performed using an electrochemical treatment apparatus. In one embodiment, the electrochemical treatment apparatus includes a plurality of electrodes. The apparatus may further include a treatment chamber (or a treatment vessel which defines a treatment chamber). In one embodiment, the apparatus includes a treatment chamber within which said plurality of electrodes are positioned for electrochemical treatment of the slurry. The treatment chamber may include at least one inlet for entry of the slurry and at least one outlet for exit of treated slurry. In one embodiment, the electrochemical treatment is performed using an electrochemical treatment apparatus including a treatment chamber within which a plurality of electrodes are positioned for electrochemical treatment, the treatment chamber including at least one inlet and at least one outlet. The at least one inlet may be positioned at the lower portion of the treatment chamber; and the at least one outlet may be positioned at the upper portion of the treatment chamber. However, the precise position of inlet and outlet may not be critical to the operation of the said apparatus.

In one embodiment, the step of electrochemically treating the slurry includes the steps of: introducing the slurry into the apparatus; applying a voltage to at least two of said plurality of electrodes to provide at least one cathode and at least one anode to thereby electrochemically treat the slurry; and removing electrochemically treated slurry from the apparatus. In this embodiment, the iron minerals may be separated from the electrochemically treated slurry either before or after the electrochemically treated slurry is removed from the apparatus. In another embodiment, the step of electrochemically treating the slurry includes the steps of: introducing the slurry into the apparatus; applying a voltage/current to at least two of said plurality of electrodes to provide at least one cathode and at least one anode to thereby electrochemically treat the slurry; and separating iron minerals from the electrochemically treated slurry; optionally further including removing electrochemically treated slurry from the apparatus.

In one embodiment, the voltage applied to the electrodes is less than 240 V, especially less than 150 V, more especially less than 120 V or less than 80 V, most especially less than 55 V or less than 40 V or less than 24 V. In another embodiment, the voltage applied to the electrodes is from 1 V to 150 V, especially from 5 V to 120 V or from 10 V to 80V, more especially from 15 V to 55 V or from 15 V to 40 V, most especially from 16 V to 24 V or from 20 V to 35 V.

In a further embodiment, the cell voltage in the apparatus is from 1 to 5 V, especially from 2 to 4 V.

In a further embodiment, the current applied to the electrodes is less than 40 A or less than 30 A, especially less than 20 A or less than 10 A, more especially less than 7.5 A or less than 5 A. In another embodiment, the current applied to the electrodes is less than 1 A. In a further embodiment, the current applied to the electrodes is from 0.25 A to 40 A or from 0.5 A to 30 A, especially from 0.5 A to 20 A or from 1 A to 10 A, more especially from 1.5 A to 7.5 A or from 2 A to 5 A. The current applied to the electrodes may be from 3 A to 8 A, or from 4 A to 7 A, or from 5 A to 6 A. The current applied to the electrodes may be direct or alternating current. The electrical field in the electrochemical treatment may be generated by an alternating current of frequency from 60 cycles per second to 2 cycles per minute; more especially 50 cycles per second to 0.1 cycles per second; or from 1 to 4 cycles per minute. An electrical field in the electrochemical treatment of from 1 to 4 cycles per minute may be effective for highly conductive waters, as in the examples herein. The production of an electric field within the treatment chamber may also result in the production of a magnetic field within the treatment chamber.

The polarity of the at least one cathode and the at least one anode may be reversed during the electrochemical treatment. For example, the polarity of the at least one cathode and the at least one anode may be reversed at any time during the electrochemical treatment depending on the degree of cathode passivation and the need to achieve uniform anode consumption in accord with good economic practice, known to those skilled in the art.

The treatment chamber may be of any suitable size. In one embodiment, the treatment chamber 10 is a large industrial unit. For example, the treatment chamber 10 may accommodate from 60 kL to 1,000 kL of liquid (slurry); especially from 80 kL to 750 kL or from 100 kL to 600 kL; more especially from 125 kL to 500 kL or from 180 kL to 400 kL; most especially from 200 kL to 300 kL or about 250 kL of liquid (slurry).

The treatment chamber in another embodiment is portable. For example, the treatment chamber may accommodate less than 50 kL, 40 kL, 30 kL, 20 kL, 10 kL, 1 kL, 900 L, 800 L, 700 L, 600 L, 500 L, 400 L, 300 L, 200 L, 100 L, 80 L, 60 L, 40 L, 20 L or 10 L liquid (slurry). In another example the treatment chamber may accommodate greater than 40 kL, 30 kL, 20 kL, 10 kL, 1 kL, 900 L, 800 L, 700 L, 600 L, 500 L, 400 L, 300 L, 200 L, 100 L, 80 L, 60 L, 40 L, 20 L 10 L or 5 L liquid (slurry). In a further example, the treatment chamber may accommodate a range in which the upper and lower limits are as previously described.

Any suitable flow rate of slurry may flow through the at least one inlet, and thereby the treatment chamber. The optimal flow rate will depend on the size of the apparatus, the capacity of the treatment chamber and electrical conductivity (EC) of the liquid, which is typically a function of the total dissolved solids (TDS). In one embodiment, the apparatus is configured for a liquid (slurry) flow rate of at least 500 mL/s; especially at least 1, 3, 5, 7, 10 or 13 Us; more especially at least 15, 18 or 20 L/s; most especially about 23 L/s. In another embodiment, the apparatus is configured for a liquid flow rate of less than 100 Us; especially less than 90, 80, 70, 60, 50 or 40 Us; more especially less than 30 L/s; most especially about 23 L/s.

The residence time of the liquid (slurry) within the treatment chamber may be controlled or varied, depending on the size of the treatment chamber, the surface area of the electrodes and/or the flow rate of the liquid (slurry). In some embodiments, the residence time is less than 10 minutes in the treatment chamber, especially less than 9, 8, 7, 6, 5, 4, 3, 2 or 1 minute in the treatment chamber, more especially about 30 seconds in the treatment chamber. In other embodiments, the residence time is from 5 seconds to 5 minutes in the treatment chamber, especially from 10 seconds to 2 minutes in the treatment chamber, more especially from 20 to 55 seconds in the treatment chamber, most especially from 30-45 seconds in the treatment chamber. However, the residence time may vary as the residence time and percentage recovery may be assessed on a continuous basis to reflect costs of energy, feed volumes and grades and percentage recovery, as is common in this and similar primary metallurgical processes. In practice, the slurry may also be recycled to some extent to recover as much as possible of the contained iron minerals prior to discharge to tailings.

The treatment chamber may be configured for use at atmospheric pressure. The treatment chamber may be configured for use at greater than atmospheric pressure, for example at from greater than 1 atmosphere to 10, 9, 8, 7, 6, 5, 4, 3 or 2 atmospheres (especially from 1-3 atmospheres). The treatment chamber may be configured for use at less than atmospheric pressure, for example at from less than 1 atmosphere to 0.1, 0.2, 0.3, 0.4, 0.5, 0.6, 0.7, 0.8 or 0.9 atmospheres. Gases may also be removed from the treatment chamber by use of a membrane system within the treatment chamber which operates at such reduced pressure so as to preferentially degas the liquid being treated.

The treatment chamber may be made of any suitable material. In one embodiment, the treatment chamber may be made of a polymer such as a polymer plastic (examples include high density polyethylene (HDPE), acrylonitrile butadiene styrene (ABS), polyvinyl chloride (PVC), polyethylene terephthalate (PET), a phenolic polymer plastic, polypropylene or polyethylene (PE)); a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a rubber, a metal such as steel, steel alloy, aluminium, or stainless steel (especially a metal insulated using a polymer plastic or composite material); a carbon fibre insulated using a polymer plastic or a composite material; or an insulating plastic (such as a phenolic insulating plastic) bonded (especially thermally) to a substrate such as a metal, concrete or compressed cement sheet. The treatment chamber may be machine finished. The treatment chamber may be partially or completely transparent (for example, the treatment chamber may be made of glass or a transparent plastic). A transparent treatment chamber may be advantageous for use with some treatment enhancers (such as UV light).

In a first exemplary embodiment, the treatment chamber is open to the atmosphere. However, in a second exemplary embodiment the treatment chamber is fully or partially closed or closeable (for example with a lid). In this second exemplary embodiment, the top or lid of the treatment chamber may include a vent or other outlet for exit of any gases used or produced in the electrochemical treatment. This second exemplary embodiment may be advantageous if the electrochemical treatment is to be performed under reducing or oxygen scavenging conditions (as discussed further below).

In one embodiment, the treatment chamber is configured so that the plurality of electrodes are positioned (or configured to be positioned) intermediate the at least one inlet and at least one outlet. In this embodiment liquid (slurry) may enter the treatment chamber via the at least one inlet, pass between the plurality of electrodes, and then exit the treatment chamber via the at least one outlet. In a first example, the treatment chamber is configured so that the liquid flows substantially vertically through the treatment chamber. In this example, the at least one inlet may be positioned at the lower portion of the treatment chamber; and the at least one outlet may be positioned at the upper portion of the treatment chamber (i.e. the liquid substantially ascends through the chamber). Alternatively, the at least one inlet may be positioned at the upper portion of the treatment chamber; and the at least one outlet may be positioned at the lower portion of the treatment chamber (i.e. the liquid substantially descends through the chamber). In a second example, the treatment chamber is configured so that the liquid flows substantially horizontally through the treatment chamber. In this example the at least one inlet may be positioned at or adjacent to one side wall of the treatment chamber, and the at least one outlet may be positioned at or adjacent to an opposite side wall of the treatment chamber. In a third example, the treatment chamber is configured so that the liquid flows obliquely through the treatment chamber.

The treatment chamber may be a plurality of treatment chambers arranged in parallel. It may be advantageous to use a plurality of parallel treatment chambers in order to increase the external surface area of the treatment chamber during the electrochemical treatment. This may allow for greater exposure to, or penetration of, treatment enhancers (such as ultraviolet light, microwaves or ultrasonic waves) during the electrochemical treatment.

The treatment chamber may be of any suitable shape or dimensions. The treatment chamber may have a square, circular, ovoid, elliptical, polygonal or rectangular cross-section. In one embodiment, the treatment chamber has a first wall, and one or more side walls. The first wall may include or be adjacent to the at least one inlet. The first wall may be distal to the electrodes and proximate to the at least one inlet. In this embodiment, the treatment chamber may include a second wall opposite to the first wall. The second wall may be distal to the electrodes and proximate to the at least one outlet. The second wall may be removable (such as if the second wall forms the lid of the chamber). The second wall may include or be adjacent to the at least one outlet. A side wall may also include or be adjacent to the at least one outlet. In another embodiment, the treatment chamber may include a base (first wall), a top or lid (second wall), and one or more side walls (especially if the treatment chamber is configured so that the liquid flows substantially vertically through the treatment chamber). It may be advantageous for the treatment chamber to include a lid so that pressure in the treatment chamber may accumulate as the electrochemical treatment progresses. If the liquid flows substantially vertically through the treatment chamber, then the at least one outlet may be positioned in the upper portion of the treatment chamber, and the at least one inlet may be positioned in the lower portion of the treatment chamber. A wall or panel of the treatment chamber may be at least partially removed or opened. In one embodiment, the treatment chamber may be cylindrical, especially a pipe.

The one or more side walls may be planar, circular or ovoid. The second wall may include a vent or gas outlet for gases which evolve during the electrochemical process.

The inner surface of the first wall may be planar. The inner surface of the first wall may also be configured to direct the flow of liquid towards the electrodes. The inner surface of the first wall may include at least one (especially one) trough or channel which narrows to its base. The trough or channel may be substantially V-shaped. The trough or channel may be for directing the flow of water towards the electrodes. The first wall (especially the trough or channel) may include the at least one inlet, or the at least one inlet may be located within the trough or channel.

The apparatus may include any suitable number of treatment chambers (and optionally any number of defoaming chambers). The apparatus may include a plurality of treatment chambers. In one embodiment, the apparatus includes at least a first and a second treatment chamber (each of which may be as herein described), wherein the apparatus is configured so that treated slurry from said at least one outlet of the first treatment chamber flows into said at least one inlet of the second treatment chamber. This configuration may be useful if some or all of the moveable electrical conductors are transported with the electrochemically treated slurry since they may be separable with a coarse screen and returned to the first treatment chamber, thereby avoiding the need to regularly shut down the process to change electrodes. The second reaction chamber may also advantageously assist in the recovery of viscosity modifier (especially guar or xanthate gum), especially when a cross-linker such as a boron salt has been used to cross link the viscosity modifier. By acidulating the slurry before or within the second treatment chamber, the viscosity may be substantially reduced resulting in the sinking of those heaver fractions of the electrochemically treated slurry as a sludge to the bottom of the treatment chamber. Both the sludge and supporting liquor may be fully or partially returned to the head of the process (the first treatment chamber), whereby the viscosity modifier may again be cross linked using cross linkers such as boron salts and be re-used within the process. The suspended slurry may also be filtered at this stage to recover material that would otherwise be discarded as gangue or tailings.

In another embodiment, the apparatus includes at least a first and a second treatment chamber and a first and a second defoaming chamber (each of these may be as described herein), wherein the apparatus is configured so that liquid (slurry) passes through the first treatment chamber, the first defoaming chamber, the second treatment chamber and the second defoaming chamber; especially wherein the liquid passes sequentially through the aforementioned chambers.

In one embodiment, the treatment chamber may include a plurality of inlets for entry of the slurry. In one embodiment, the at least one inlet is a plurality of inlets for entry of a liquid (slurry) to be treated. The treatment chamber may include at least 10 inlets, especially at least 15 inlets, more especially at least 20 inlets and most especially at least 30 inlets. The plurality of inlets may be for dispersing the liquid (slurry) to be treated into the treatment chamber, especially for evenly dispersing the liquid to be treated throughout the treatment chamber.

Advantageously, by using a plurality of inlets the slurry may evenly enter the treatment chamber. This may improve even, or so-called laminar, fluid flow throughout the treatment chamber and said flow may maximise uniform and efficient contact between the electrodes positioned within the treatment chamber and the liquid being treated (the slurry). Without wishing to be bound by theory, the benefits of encouraging such laminar or uniform flow may include some or all of reduced electrode and power consumption, improved transfer of electrical charge to the liquid to be treated (the slurry) and reduced electrode passivation.

The treatment chamber may include at least 15 slurry inlets. However, the treatment chamber may include at least one, or any practical number of slurry inlets, depending on the configuration of the electrodes, especially those that are sacrificial anodes, within the apparatus.

The slurry may be dispersed into the treatment chamber by way of at least one slurry disperser, especially one slurry disperser. The slurry disperser may be separate to, or integral with, the first wall. The slurry disperser may include a plurality of liquid inlets into the treatment chamber (these would be outlets from the disperser). Said slurry disperser may be for evenly dispersing the liquid to be treated throughout the treatment chamber or relative to the electrodes in the treatment chamber, and may especially be a slurry manifold. In one embodiment, the treatment chamber includes a slurry disperser for dispersing the liquid to be treated into the treatment chamber, wherein said slurry disperser includes a plurality of inlets within the treatment chamber for entry of a liquid to be treated. Any suitable type of slurry disperser may be used.

In a first example, the disperser is a tube, especially a tube perforated along its length to provide a plurality of inlets into the treatment chamber. The tube may be of circular, ovoid, square, rectangular or triangular cross section. The tube may be perforated on all sides, or on all sides except for a side opposite to the electrodes. Advantageously, the disperser in this embodiment may be positioned within the at least one (especially one) trough or channel which narrows to its base in the first wall. If the first wall includes multiple troughs or channels, then a disperser may be positioned within each trough or channel. In one embodiment, the treatment chamber includes at least one liquid disperser for dispersing the liquid to be treated into the treatment chamber, wherein said liquid disperser includes a plurality of inlets within the treatment chamber for entry of a liquid to be treated, and wherein within each said at least one channel is positioned one said liquid disperser.

In a second example, the treatment chamber may further include a slurry disperser having a plurality of slurry passageways, wherein each said slurry passageway includes at least one inlet to the treatment chamber for entry of the slurry. The disperser in this example may be a manifold. Said plurality of slurry passageways may include at least one longitudinal slurry passageway and/or at least one transverse slurry passageway. Said passageways may be in fluid communication with each other. For example, the disperser may include at least one slurry entry point, at least one longitudinal slurry passageway and/or at least one transverse slurry passageway. At least one or each of the slurry passageways may include at least one and preferably a plurality of inlets to the treatment chamber. The slurry passageways may be arranged in any suitable way. Advantageously, computational fluid dynamic (CFD) modelling may be used to provide for laminar flow across the surface of the electrodes within the treatment chamber. Typically, the at least one transverse slurry passageway may be in liquid communication with the at least one longitudinal slurry passageway. The at least one slurry entry point may be in liquid communication with or abut either the at least one longitudinal slurry passageway, or the at least one transverse slurry passageway. The at least one longitudinal slurry passageway may be in fluid communication with, and extend from (especially at from 30 to 150 degrees to; more especially at from 60 to 120 degrees to; most especially at about 90 degrees to) the at least one transverse liquid passageway. The inlets to the treatment chamber may be provided by the outlets of the slurry disperser.

When the treatment chamber includes a slurry disperser, the disperser (especially manifold) may include at least one longitudinal slurry passageway in fluid communication with at least one transverse slurry passageway, wherein the at least one longitudinal slurry passageway and/or the at least one transverse slurry passageway include at least one inlet to the treatment chamber for entry of the slurry. The disperser may also include a diffuser for evenly distributing the slurry exiting the disperser (and entering the treatment chamber). The at least one inlet and/or disperser may be positioned beneath the plurality of electrodes (especially if the liquid substantially ascends as is passes through the treatment chamber). In one embodiment, the at least one inlet is positioned beneath the plurality of electrodes, and the at least one outlet is positioned above the plurality of electrodes.

The disperser may include a diffuser for evenly distributing the liquid exiting the disperser. However, depending on the results of the aforementioned CFD modelling or other factors, the diffuser may not be necessary.

The disperser may be made of any suitable material. In one embodiment, the disperser may be made of the same types of materials as previously described for the treatment chamber. In one embodiment, the disperser is made from welded polypropylene or polyethylene, polyester or epoxy resin fibreglass, a polymer, rubber, or cast or extruded components based on polymer plastic materials.

The apparatus may be configured to electrochemically treat the liquid in the presence of at least one treatment enhancer or at least one treatment agent. The step of electrochemically treating the slurry may include treating the slurry with at least one treatment agent. The at least one treatment agent may be a fluid (including a gas or a liquid) or a solid. The at least one treatment agent may be a plurality of treatment agents. The at least one treatment agent may act as a reactant or a catalyst during the electrochemical treatment, or it may modify or adjust the properties of the reactants, the liquid (slurry) or the products of the electrochemical treatment, or it may be inert during the electrochemical treatment. The at least one treatment agent may be used to form a reactant or catalyst in situ during the electrochemical treatment. Each said at least one treatment agent may also perform multiple functions. For the avoidance of doubt, the term "treatment agent" does not include chemicals produced in the course of an electrochemical treatment (such as hydrogen gas, metal ions generated by a sacrificial anode, and hydroxyl ions and hydroxyl radicals produced at the cathode); the term "treatment agent" refers to chemical matter deliberately added to the liquid (slurry) to be treated by an operator during, prior to or after the electrochemical treatment. Electrodes per se, for example, are not treatment agents, although an electrode may be doped with a treatment agent so that the treatment agent is released, or acts as a catalyst, during the electrochemical treatment as the anode corrodes. In one embodiment, an organic acid, especially an organic carboxylic acid (for example as defined above), most especially acetic acid, may act as a catalyst during the electrochemical treatment.

In a first exemplary embodiment, the at least one treatment agent may be an oxidant or reductant. The at least one treatment agent may form an oxidant or reductant in situ in the treatment chamber during the electrochemical treatment. Exemplary oxidants may include permanganate (such as potassium permanganate), hydrogen peroxide (which may result in Fenton reactions), an inorganic peroxide, a peroxysulfates, a disulfate, a peracid (such as an organic or inorganic peracid—an exemplary example is meta-chloroperoxybenzoic acid), oxygen gas, ozone, a halogen gas (such as fluorine or chlorine), nitric acid, sulfuric acid, a chlorite, a chlorate, a perchlorate, hypochlorite, and salts of the aforementioned oxidants. Exemplary reductants may include carbon monoxide, iron (II) and iron (0) compounds, hydrogen sulfide, disulfide, formic acid, sulfite compounds, boron reducing agents and hydrogen gas. Other oxidants and reductants would be known to a skilled person. The at least one treatment agent may especially be a reductant as reducing conditions may assist in the conversion to an iron oxide (especially proto-magnetite and/or magnetite). The reductant may lower the concentration of oxygen in the slurry being electrochemically treated; for example the slurry in the treatment chamber may include less than 5 mg/L oxygen, especially less than 3 mg/L oxygen, more especially less than 2 mg/L oxygen. The electrochemical reaction described above also may reduce the dissolved oxygen within the slurry.

In a second exemplary embodiment, the at least one treatment agent may be an oxygen scavenger. The oxygen scavenger may be or include an iron (II) compound; especially a ferrous salt (or $Fe^2$ component; especially a water soluble ferrous salt, more especially ferrous chloride or ferrous sulphate), a sulphite (more especially ferric sulphite or sodium sulphite), or a nitrite (such as sodium nitrite). In one embodiment, the oxygen scavenger is jarosite or guar gum. In one example, the ferrous salt may be derived (especially periodically) from acidic rinsing of the plurality of electrodes (such as an electrode that includes iron).

In a third exemplary embodiment, the at least one treatment agent may adjust the properties of the slurry (for example adjust the pH, the agglomeration or flowability of the slurry). The at least one treatment agent may be a pH adjuster. The pH adjuster may be an alkaline pH adjuster for producing an alkaline pH. Exemplary alkaline pH adjusters may include, for example, sodium hydroxide or sodium bicarbonate. The pH adjuster may be an acidic pH adjuster for producing an acidic pH. Exemplary acidic pH adjusters may include, for example, a carboxylic acid (especially acetic or citric acid), or hydrochloric, sulphuric or nitric acid. The electrochemical treatment may be performed at alkaline or acidic pH. In one embodiment, the electrochemical treatment involves generation of hydroxyl ions in the slurry, producing an alkaline environment. In one embodiment, the electrochemically treated slurry is acidic, especially at a pH at or greater than 6, or greater than 5. In another embodiment, the electrochemically treated slurry is alkaline, especially at a pH of at or less than 12. In a further embodiment, the electrochemically treated slurry is at a pH of from 6-12, or from 3.5 to 10. In a further embodiment, the slurry for electrochemical treatment is at a pH of from 4 to 10, especially from 5 to 9, more especially from 6 to 8.5, most especially from 6.5 to 8.5 or from 7 to 8. The processes of the present invention may include the step of adjusting the pH of the slurry (or liquid) for electrochemical treatment to a pH of from 4 to 10, especially from 5 to 9, more especially from 6 to 8.5, most especially from 6.5 to 8.5 or from 7 to 8. The pH of the slurry (or liquid) after electrochemical treatment may be from 4 to 10, especially from 6 to 10, more especially from 7 to 9, most especially about 8. In a further embodiment, the electrochemical treatment is performed at a pH of from 4 to 10, especially from 5 to 10, more especially from 6 to 9, most especially from 6.5 to 8.5 or from 7 to 8.

In a fourth exemplary embodiment, the at least one treatment agent may be a gas (which may be inert, an oxidant or a reductant, for example). The gas may be advantageously used to improve or increase the liquid (slurry) flow velocity between the electrodes and/or to increase or improve the reaction of components within the slurry. The gas may, in particular, create favourable conditions at the face of the electrodes wherein reduction or oxidation processes can be better controlled by the presence of gaseous reactants, which can include either reactive or inert gaseous reactants. The gas may be selected from one or more of the group consisting of: air, hydrogen, oxygen, ozone, nitrogen, carbon monoxide, carbon dioxide, sulphur dioxide, hydrogen sulfide, nitrogen, chlorine, fluorine, chlorine dioxide, ammonia, or a combination thereof; especially hydrogen, hydrogen sulphide, carbon monoxide, air, nitrogen, carbon dioxide, or a combination thereof; more especially a reducing gas such as hydrogen, carbon monoxide or hydrogen sulphide. A plurality of treatment agents may be used, such as an inert gas and a reductant.

In a fifth exemplary embodiment, the at least one treatment agent may be a microorganism. The microorganism may be an iron (III) reducing bacteria. Exemplary microorganisms may include at least one of the group consisting of: *Shewanella* spp. (especially *Shewanella putrefaciens*, more especially *Shewanella putrefaciens* CN32), and Geobacter spp. (especially Geobacter sulfurreducens). Such microorganisms may assist in or catalyse the production of an iron oxide, and thereby enhance yields.

In a sixth exemplary embodiment, the at least one treatment agent may be a viscosity modifier, for example a guar or xanthan based gum or a carrageenan. Advantageously, the viscosity modifier may adjust the viscosity of the slurry and thereby allow for the suspension of higher density materials than would be possible with a conventional water based slurry. For example, the density of the slurry may be modified to suspend electrical conductors which are freely moveable within the treatment chamber (as discussed below), and/or suspended iron oxide particles. This may enhance the conditions for production of iron oxides. An exemplary viscosity modifier is an aqueous solution of guar gum (especially a dilute solution) which acts thixotropically when cross-linked by a cross-linker, especially a cross linker which is reversible by modification of the slurry pH (an exemplary cross linker includes borax salt (sodium tetraborate decahydrate)). Such cross-linking may be reversed by the addition of an acid (especially an organic or inorganic acid; more especially at least one acid selected from the group consisting of: acetic acid, citric acid, hydrochloric acid, sulphuric acid or nitric acid; only a small quantity of acid may be needed) to thereby free, for example, the electrical conductors from the thixotropic slurry for further use.

In one example, the viscosity modifier is an allowed food additive (such as guar or xanthan gums). In this example, the viscosity modifier may provide no toxicity, although the cross linked slurry may have a high biological and chemical oxygen demand (BOD/COD). This oxygen scavenging may be advantageous for the conversions to proto-magnetite and magnetite (especially the conversion of micro or nano-particulate iron to proto-magnetite and magnetite) since dissolved oxygen may not be available for the reverse transition back to the more oxidised iron forms (which may be less valuable).

During the electrochemical treatment, hydroxyl ions may be produced at the cathode by the electrochemical splitting of water molecules. This may incrementally increase the pH and thereby increasingly crosslink the viscosity modifier (which especially may be a guar or xanthan gum) thereby increasing the viscosity and hence carrying capacity of the slurry. In this manner, higher density iron minerals may be brought closer to an outlet positioned towards the top of the treatment chamber (this may bring the higher density iron minerals to an adjacent holding tank or to a separator for separating the iron oxide minerals from the slurry; an exemplary separator is a rotating magnetic drum, as discussed below, which may remove magnetic materials from the slurry and deliver them to a receiving (product) hopper).

In another example, the increased density of the supporting slurry may enable the suspended particles to attach to a separator such as a rotating drum vacuum filter whereby they can be removed from the suspending slurry. This example may enable significant improvement in the recovery of denser mineral particles from gangue, since it also allows for that portion of very fine gangue or waste minerals to be conveniently overflowed by means of a weir.

The step of treating the slurry with the at least one treatment agent may include contacting the slurry with the at least one treatment agent in the treatment chamber. The at least one treatment agent may be provided within the treatment chamber in any suitable way.

In a first example, the at least one treatment agent may be mixed with the slurry before the slurry enters the treatment chamber. The apparatus may include a mixer in fluid communication with the at least one slurry inlet, wherein the mixer is for mixing at least one treatment agent (which may be a liquid, gas or solid) with the liquid to be treated, before the liquid to be treated passes through the at least one inlet. Alternatively, the treatment agent may be provided on a liquid conduit to the treatment chamber, such as a pipe or manifold for transferring the liquid to be treated to the treatment chamber.

In a second example, a said at least one treatment agent may be provided on a surface within the treatment chamber. For example, a catalyst may be provided on an inner side wall of the treatment chamber, on the walls at which the electrodes are held (e.g. on an electrode holder), or within at least one of the electrodes (such as via a doped-electrode), in which the treatment agent may be chemically alloyed within or physically attached, laminated or layered to the electrode materials. Said treatment agent may be released from the doped electrode when the electrode functions as an anode (at which time the anode releases metal ions into the liquid)). An exemplary doped electrode is a cerium doped electrode, although several other rare earth or precious metals when coated onto inert electrodes such as titanium, will be known to those skilled in the art.

In a third example, a said at least one treatment agent may be provided following electrochemical treatment.

In a fourth example, the at least one treatment agent may enter the treatment chamber through at least one treatment inlet. The treatment chamber may include at least one treatment inlet (or a plurality of treatment inlets, especially in fluid communication with each other) for each or each mixture of treatment agents. The treatment chamber may include at least 10 treatment inlets, especially at least 15 inlets, more especially at least 20 inlets, and most especially at least 30 inlets.

The at least one treatment inlet may be at least one fluid treatment inlet (the fluid may include gases and liquids, and for example, liquids including suspended solids). For avoidance of doubt, the term "fluid treatment inlet" does not mean that the treatment agent is in fluid form (although it may be), only that a fluid at least including the treatment agent passes through the fluid treatment inlet. The at least one fluid treatment inlet may be in the form of a fluid treatment disperser. The at least one fluid treatment inlet may be at least one liquid treatment inlet (again, the term "liquid treatment inlet" means that a liquid at least including the treatment agent passes through the liquid treatment inlet). The at least one liquid treatment inlet may be in the form of a liquid treatment disperser. The liquid treatment disperser may be as described above for the slurry disperser.

The at least one treatment inlet may be an inlet for a gas treatment agent (i.e. a gas inlet). The treatment chamber may further include a gas treatment disperser having a plurality of gas inlets to the treatment chamber. Said gas treatment disperser may be for evenly dispersing the gas relative to the electrodes in the treatment chamber, and may especially be a gas manifold. The treatment chamber may include at least 20 gas inlets. The at least one gas inlet may be positioned beneath the plurality of electrodes.

The gas disperser may include a plurality of gas passageways, wherein each said gas passageway includes at least one inlet for entry of a gas. Said plurality of gas passageways may include at least one longitudinal gas passageway and/or at least one transverse gas passageway. Any suitable type of gas disperser may be used. For example, the gas disperser may include at least one gas entry point, and at least one longitudinal gas passageway and/or at least one transverse gas passageway. Each of the gas passageways may include at least one and preferably a plurality of gas inlets. The gas passageways may be arranged in any suitable way. Typically, the at least one transverse gas passageway may be in gaseous communication with the at least one longitudinal gas passageway. The at least one gas entry point may be in gaseous communication with or abut either the at least one longitudinal gas passageway, or the at least one transverse gas passageway. The at least one longitudinal gas passageway may be in gaseous communication with, and extend from (especially at from 30 to 150 degrees to; more especially at from 60 to 120 degrees to; most especially at about 90 degrees to) the at least one transverse gas passageway. The at least one gas inlet to the treatment chamber may be provided by outlets of the gas disperser. The treatment chamber may include at least 20 gas inlets.

The at least one treatment inlet may be positioned at any suitable point or points in the treatment chamber. In one embodiment, the at least one treatment inlet is positioned between the electrodes and the first wall (especially between the flow aligner and the first wall). If the liquid substantially ascends as it passes through the treatment chamber, then the at least one treatment inlet may be positioned beneath the electrodes (especially so that the treatment agent substantially rises as it travels through the treatment chamber). In one embodiment, the at least one treatment inlet (including a fluid treatment disperser) is integral with the first wall (or base) of the treatment chamber. In another embodiment, the at least one treatment inlet (including a fluid treatment disperser) is removable from the treatment chamber.

The treatment chamber may include at least one treatment inlet (or a plurality of treatment inlets in fluid communication with each other) for each or each mixture of treatment agents. When the treatment chamber includes treatment inlets for different types of treatment agents (for example, a liquid treatment disperser and a gas disperser), these may be positioned relative to each other and to the at least one liquid inlet in any suitable way. For example, if the apparatus includes a liquid (slurry) disperser and a gas disperser, the liquid (slurry) disperser may be adjacent or proximate to the gas disperser (for example, the liquid (slurry) disperser may be on top of, beneath, or beside the gas disperser). Similarly, if the apparatus includes a liquid treatment disperser and a liquid (slurry) disperser, the liquid treatment disperser may be adjacent or proximate to the liquid disperser (for example, the liquid disperser may be on top of, beneath, or beside the liquid treatment disperser).

The at least one slurry outlet may be located in any suitable position in the treatment chamber. However, the at least one outlet especially may be located such that the electrodes are positioned intermediate the at least one outlet and the at least one inlet. In one embodiment, the at least one outlet is located in or is positioned adjacent the second wall of the treatment chamber.

The at least one outlet may be positioned above the plurality of electrodes. In this case, the separation of the iron minerals from the gangue of the electrochemically treated slurry may occur in a separate tank or at another stage of the process. The at least one outlet may be at least one slurry outlet for exit of electrochemically treated slurry. The slurry outlet may be in the form of an aperture or passageway extending from the side wall of the treatment chamber, and may be positioned at any level with reference to the level of liquid in the treatment chamber. Depending on the primary ore type, its density and other unique characteristics, the slurry outlet may be a spillway and may include an adjustable baffle which may form the lower lip of the spillway. The adjustable baffle may be raised or lowered to adjust the flow rate of electrochemically treated slurry exiting the treatment chamber (for example, the flow rate of thixotropically suspended gangue minerals exiting the treatment chamber may be adjusted). A benefit of adjusting the viscosity of the slurry may be the ease with which gangue minerals may be 'floated' from the treatment chamber enabling those minerals with either higher specific gravity or with greater magnetic susceptibility to be recovered at, just below or below the surface of the treatment chamber. In another embodiment, the treatment chamber may include a closeable lid or top wall, in which the closeable lid or top wall includes an orifice, such that the orifice forms the at least one outlet.

Advantageously, the combination of at least one slurry inlet being positioned beneath the plurality of electrodes, the flow and/or viscosity of the slurry through the treatment chamber, and/or the at least one gas inlet being positioned beneath the plurality of electrodes may prevent any solids in the slurry from settling in the treatment chamber and may drive the solids out of the at least one outlet. However, any solids in the slurry may settle from the liquid on standing. Further the choice of gas may enable the precise setting of the apparatus, as electrochemical treatment of the slurry may make the slurry more alkaline, and a reductant gas may both scavenge oxygen and incrementally acidify the slurry, thereby maintaining the pH in the optimal or preferred range for production of higher density and higher iron content minerals.

In a further embodiment, the plurality of electrodes may be selected from the group consisting of an anode, a cathode and an electrical conductor; the plurality of electrodes especially may include at least one anode, at least one cathode and at least one electrical conductor. Said at least one electrical conductor may be positioned intermediate said at least one cathode and said at least one anode. As used herein, the term "electrical conductor" refers to an electrode which is not intended to accept power from a power source external to the treatment chamber. The electrical conductor may obtain an electrochemical charge from an electric field contained within the vessel in which it resides.

In one embodiment, when in use the apparatus includes at least one anode and at least one cathode, and the electrodes may all be of similar structure and only become an anode, a cathode or an electrical conductor by virtue of the power connected to the electrode (or lack thereof in the case of an electrical conductor). The plurality of electrodes may be replaceable and/or removable. In this embodiment, the apparatus may include a plurality of electrical conductors which have a fixed position within the treatment chamber.

In another embodiment, the plurality of electrodes may include a plurality of electrical conductors which may be moveable (especially freely moveable) within the treatment chamber. The plurality of electrical conductors may be configured to circulate within the treatment chamber during the electrochemical treatment. These electrical conductors may develop an electric charge and effectively act as sacrificial anodes whilst within the electric field, especially when they come into proximity to the at least one anode; and they may lose their charge and any attached particles as they come into proximity to the at least one cathode. These electrical conductors may enter the treatment chamber via the at least one inlet for entry of the slurry, and this especially may allow the electrical conductors to become suspended in the travelling, fluid bed of the slurry. The moveable electrical conductors may be of any suitable shape, but especially may be substantially spherical. The surface area of such substantially spherical electrical conductors may be considerable, and this may result in improved efficiency of the process in terms of daily production or throughput. The moveable electrical conductors may be made of any suitable material (as discussed below), but the moveable electrical conductors especially may be made of or include iron or steel. In another example, the moveable electrical conductors may be made of an alloy of 5% magnesium and 95% aluminium (such as may be found in soft-drink cans), although such an alloy may contribute $Al^{3+}$ and $Mg^{2+}$ ions to the iron oxide containing slurry, rather than the preferred $Fe^2$.

If moveable electrical conductors are used, as discussed in the preceding paragraph, then it may be advantageous for the treatment chamber to include a closeable lid or top wall, in which the closeable lid or top wall includes an orifice, such that the orifice forms the at least one outlet. In this circumstance, the orifice may be sized to be of smaller diameter than the diameter of the moveable electrical conductors, which thereby retains the electrical conductors within the treatment chamber.

Each electrode may be made of any suitable material. Exemplary materials include aluminium, iron, steel, stainless steel, steel alloy (including mild carbon steel), magnesium, titanium and carbon. In another embodiment, each electrode may be made of an alloy of or include a material selected from the group consisting of: aluminium, iron, steel, magnesium, titanium and carbon. Each said electrode may especially be made of iron, carbon, steel, aluminium or an alloy thereof; especially of iron, cast iron, malleable iron, iron alloy, high carbon or mild or rolled steel; especially cast iron or malleable iron or any iron alloy including several of the varieties of steel including mild steel. The use of an electrode including iron may advantageously introduce iron ions into the treatment chamber during the electrochemical treatment, and these iron ions may be involved in the production of magnetite, proto-magnetite or maghemite (for example by substitution of empty lattice positions within the iron-oxide-hydroxide lattice structure). Each said electrode may be the same or different, and may include the same metal or different metals (for example depending on the desired performance).

The electrodes (or the at least one anode and the at least one cathode) may be positioned substantially vertically or be angled from a vertical plane. The electrodes (or the at least one anode and the at least one cathode) may be positioned at an angle of from 10 to 30 degrees from the vertical, especially at an angle of 10 to 15 degrees or about 15 degrees from the vertical. The electrodes (or the at least one anode and the at least one cathode) may be from 1 mm to 10 mm thick, especially about 3 mm thick. The electrodes (or the at least one anode and the at least one cathode) may be from 1 mm to 10 mm apart, depending on for example the electrical conductivity or Total Dissolved Solids (TDS) of the slurry. For TDS in the range 10,000 to 20,000 mg/L the electrodes may especially be about 3 to 6 mm apart. The electrodes may have a tapered lower edge or be otherwise modified so as to improve or modify either maintenance time (i.e. time taken to change electrodes) and/or surface area, reactivity, resistance to passivation or other characteristics.

The apparatus may further include a flow aligner (or flow distributor) for aligning the flow of the liquid (slurry) between the electrodes. The flow aligner may also be for distributing the liquid between the electrodes. The apparatus maybe configured to provide a laminar flow through the treatment chamber.

The flow aligner may be positionable between the at least one inlet and the electrodes. A flow aligner may be advantageous as the liquid between the electrodes and the at least one inlet (or if the liquid substantially ascends through the treatment chamber, beneath the electrodes) may especially be turbulent. The flow aligner may assist the liquid in moving substantially or uniformly along the same longitudinal axis as the plurality of electrodes, which in turn may improve the contact time and hence electrochemical reaction between the liquid to be treated (or slurry or iron minerals) and the electrodes.

In a first example, the flow aligner may be in the form of at least one (especially a plurality of) baffles or baffle walls extending beneath the electrodes (or between the electrodes and the at least one inlet). The at least one baffle or baffle wall may extend substantially vertically beneath the electrodes (or in a plane perpendicular to the first wall of the treatment chamber). The at least one baffle or baffle wall may extend along substantially the same longitudinal axis as the electrodes. The at least one baffle or baffle wall may be positioned transversely or substantially perpendicularly to the electrodes. The flow aligner may integrally formed with the treatment chamber, or may be removable and/or replaceable. Each baffle or baffle wall may be in the form of a plate. Each baffle or baffle wall may be from 20 mm to 500 mm long, especially from 50 mm to 250 mm long or from 60 mm to 150 mm long, more especially from 80 mm to 120 mm long, most especially about 100 mm long.

In a second example, the flow aligner may be a partition (or wall or barrier) (especially a removable partition) defining a plurality of apertures for passage of the liquid. The apertures defined by the removable partition may be consistently spaced and sized so that liquid flows evenly through the partition. The flow aligner may extend between the side walls of the treatment chamber. The apparatus may be configured so that when in use, the liquid pressure on the side of the partition proximate to the at least one inlet is greater than the liquid pressure on the side of the partition proximate to the electrodes. In one embodiment, the partition is configured to provide a greater liquid pressure on the side of the partition proximate to the at least one inlet than on the side of the partition proximate to the electrodes when the apparatus is in use. Advantageously, this may assist the even, uniform or laminar flow of liquid between the electrodes. In an alternative embodiment, the treatment chamber may have only one inlet. In this embodiment the volume of liquid beneath the flow aligner may be sufficiently large so that turbulence in the liquid is ameliorated after the liquid passes through the flow aligner. Depending on a range of fluid, electrode and cell design parameters, such further design refinement could be influenced or determined by the CFD modelling as described above.

In the second example, the flow aligner (or removable partition or wall) may be in the form of a plurality of segments, such that any one segment may be removed independently of the others. Each said segment may abut the adjoining segment, or each said segment may be in close proximity with the adjoining segment. In one embodiment, the apparatus includes a plurality of electrode holders and each said electrode holder includes a segment of the flow aligner. The flow aligner may be in the form of at least one plate (or panel) (especially a plurality of plates), wherein each said plate defines a plurality of apertures for passage of the liquid. The flow aligner may define a plurality of apertures each having a polygonal (especially hexagonal), circular or ovoid shape.

The combination of a disperser and a flow aligner (especially a disperser in the form of a perforated tube positioned within a trough or channel in the first wall, and a flow aligner in the form of a partition (or wall) defining a plurality of apertures for passage of the liquid) may promote the even, uniform or laminar flow of liquid between the electrodes, to thereby maximise the transfer of electrical charge and the efficiency of the electrochemical reaction. In this way, so-called "deadspots" in the flow of liquid through the reaction chamber can be minimised and the electrodes can furthermore be abrasively cleaned whilst in operation.

The flow aligner may be made of any suitable material, but especially may be made of a non-conductive material. The flow aligner may be made of the materials discussed above for the treatment chamber. The flow aligner may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a polymer plastic such as high density polyethylene (HDPE), polyethylene (PE), polyethylene terephthalate (PET), polyvinyl chloride (PVC); a phenolic polymer plastic; or be fabricated from a number of composite materials including carbon fibre (for example a carbon fibre insulated using a polymer plastic or a composite material) and variations thereof.

The inventors have performed computational fluid flow simulations on various treatment chamber configurations. The inventors have also studied fluid flow and pH variations within the treatment chamber during electrochemical treatments using pH sensitive indicators, and by inclusion of synthetic resin beads (of size less than 0.5 mm) in the fluid flow within the treatment chamber. These techniques were used to identify preferential channelling of the fluid flow. Advantageously, the inventors have found that inclusion of a flow aligner intermediate the at least one inlet and the electrodes, especially a flow aligner in the form of a partition defining a plurality of apertures provides decreased preferential channelling of the fluid flow, and increased uniformity of the fluid flow through the treatment chamber.

The apparatus may also include a slurry mover for moving slurry, especially on the surface of the liquid in the treatment chamber (or alternatively on the surface of the vessel in fluid communication with the at least one outlet). The slurry mover may be configured for moving the slurry towards the at least one outlet, and may assist in providing a horizontal flow for the slurry at the top of the treatment chamber, especially on the surface of the liquid in the treatment chamber (or at the top of the vessel). The slurry mover may be a slurry skimmer. The slurry mover may be positioned substantially above or below the surface of the liquid in the treatment chamber.

The slurry mover may include at least one slurry driver for driving the slurry towards the at least one outlet, and especially a plurality of slurry drivers (these may be in the form of a paddle or projection). The at least one slurry driver may be mounted to or mounted relative to a belt, strap, chain or cable. The belt, strap, chain or cable may be turned by a belt drive. The belt drive may be partly flexible. The belt drive may include at least one wheel, especially at least two wheels, more especially two wheels. The at least one wheel may include teeth, and may be in the form of a cog or sprocket. In another embodiment, the apparatus does not include a slurry mover.

The apparatus may also include a defoamer. The defoamer may be for decreasing the volume of foam (or bubbles) after the electrochemical treatment. During electrochemical treatment foam is frequently generated from, for example, gas bubbles generated at the cathode. As these bubbles pass through the liquid they can generate foam which can be difficult to manage and can cause overflowing in liquids high in organic compounds (such as carrageenan, xanthate or guar derived vegetable gums). The defoamer may include one or more nozzles for spraying liquid onto the foam. As the liquid is sprayed onto the foam, the liquid droplets pierce the foam, releasing the trapped gas and decreasing the foam volume. The nozzle may be adjustable to modify the velocity of the sprayed liquid and the size of the sprayed liquid droplets. Advantageously, the properties of the foam produced in the electrochemical treatment may vary depending on the composition of the liquid, and an adjustable nozzle may allow for effective defoaming for a variety of liquid types. For example, if guar gum is present in the liquid during electrochemical treatment then the foam created may have very elastic bubbles, which requires larger droplets and/or a higher velocity to penetrate. The apparatus may include one, or a plurality of defoamers. The nozzle may produce a jet, or produce a mist. The liquid sprayed by the nozzle may be electrochemically treated liquid from the treatment chamber. The defoamer may include a pump for pumping the liquid through the nozzles.

The defoamer may be positioned above the surface of the treatment chamber (or vessel) to defoam floc on the surface of the liquid. The defoamer may also be present in a defoaming chamber (the apparatus may include a defoaming chamber which includes a defoamer). In one embodiment, the apparatus may further include a defoaming chamber (or a defoaming vessel which defines a defoaming chamber). Liquid exiting the treatment chamber through the at least one outlet may flow to the defoaming chamber. The liquid exiting the treatment chamber may pass through the defoaming chamber to an outlet at the base of the defoaming chamber. One, or a plurality of defoamers may be positioned (especially vertically positioned) within the defoaming chamber to spray liquid on foam passing (or falling) through the chamber. The defoaming chamber may also include one or more (especially one or two) flow diverters. The flow diverters may be positioned within the defoaming chamber to divert the flow of liquid to thereby increase the liberation of gas from the liquid. The flow diverters may be a plate, especially a substantially vertically mounted plate within the defoaming chamber.

At least a first flow diverter may provide a weir inside the defoaming chamber. A second flow diverter may be positioned intermediate said first flow diverter and the inlet to the defoaming chamber (which may be the outlet of the treatment chamber). The second flow diverter may provide an underflow weir (under which the fluid passing through the defoaming chamber passes). The bottom of the second flow diverter may extend lower than the top of the first flow diverter. The first and/or second flow diverter may be substantially vertical. The first and/or second flow diverter may be a wall or plate. Advantageously, the first and second flow diverters may trap foam entering the defoaming chamber between the second flow diverter and the defoaming chamber inlet. Fluid entering the defoaming chamber may fall onto the trapped foam to assist in decomposing the foam.

The defoaming chamber may include an outlet for exit of defoamed liquid. Said defoaming chamber outlet may be located at the base of the defoaming chamber.

Advantageously, during an electrochemical treatment gases such as hydrogen may evolve at the electrodes, with the amount observed depending on the liquid composition. These gases have the potential to produce foams which (in the case of a treatment chamber without a lid) has the potential to overflow. Furthermore, if foam is present in the fluid introduced into a pump it can create difficulties due to the trapped gas within the foam (for example creating air locks). The use of a defoaming chamber may ameliorate these possibilities.

The plurality of electrodes may be selected from the group consisting of an anode, a cathode and an electrical conductor. In use, the apparatus includes at least one anode and at least one cathode. However, the electrodes may all be of similar structure and only become an anode, a cathode or an electrical conductor by virtue of the power connected to the electrode (or lack thereof in the case of an electrical conductor). Each said at least one electrical conductor may be positioned between or intermediate at least one anode and at least one cathode. In one embodiment, the plurality of electrodes includes at least one anode, at least one cathode and at least one electrical conductor, wherein said at least one electrical conductor is positioned intermediate said at least one cathode and said at least one anode.

The apparatus may include from 10 to 1000 electrodes; especially from 20 to 500 electrodes; more especially from 30 to 250 electrodes; most especially from 40 to 100 electrodes.

In one embodiment, from 2 to 12 electrodes in the apparatus are connected to a power source; especially from 2 to 10 or from 2 to 8 electrodes in the apparatus are connected to a power source; more especially from 2 to 6 or from 2 to 4 electrodes in the apparatus are connected to a power source; most especially three electrodes in the apparatus are connected to a power source. If three electrodes in the apparatus are connected to a power source, the two terminal electrodes (i.e. at each end of the plurality of electrodes) will have the same polarity (i.e. either an anode or a cathode) and an electrode intermediate the terminal electrodes (especially substantially equidistant between the terminal electrodes) will have the opposite polarity (i.e. either an anode or a cathode). The remaining electrodes in the plurality of electrodes will be electrical conductors. In one embodiment, the apparatus is configured so that from 5% to 25% of the electrodes in the apparatus are anodes or cathodes; especially from 8% to 20% of the electrodes in the apparatus are anodes or cathodes; more especially from 10% to 20% of the electrodes in the apparatus are anodes or cathodes or from 10% to 15% of the electrodes in the apparatus are anodes or cathodes. In another embodiment, the apparatus is configured so that from 0.5% to 25% of the electrodes in the apparatus are anodes or cathodes; especially from 0.5% to 15% of the electrodes in the apparatus are anodes or cathodes; more especially from 0.5% to 10% of the electrodes in the apparatus are anodes or cathodes or from 0.5% to 5% of the electrodes in the apparatus are anodes or cathodes. In one embodiment, about 2.5% of the electrodes in the apparatus are anodes or cathodes.

Each electrode, a set of electrodes, or the plurality of electrodes may be replaceable and/or removable. For example, the electrodes may be removable from the treatment chamber by means of an overhead gantry. The electrodes may be removed for temporary storage as a set (for example in horizontal racks above the unit), or can be replaced individually such as when an electrode loses its anodic potential through diminished surface area, for example by corrosion.

Each electrode may be of any suitable shape, although certain shapes facilitate easy removal from the treatment chamber. For example, each electrode may be curved or planar, especially planar. Each electrode may also be, for example, of square, rectangular, trapezoidal, rhomboid, or polygonal shape; especially of rectangular or square shape. Each electrode may also be of solid construction, or may include a plurality of apertures. Each electrode may be especially of solid construction. In one embodiment, each electrode is a plate. In another embodiment, a said electrode or a portion of the plurality of electrodes may be of circular, ovoid, or elliptical cross section. In this embodiment, the electrodes in the portion of the plurality of electrodes may be positioned so that one electrode is inside the adjacent electrode. For example, a portion of the plurality of electrodes may be concentrically positioned (especially when said electrodes are cylindrical in shape).

Each electrode may be made of any suitable material. Exemplary materials are discussed above, and may also include aluminium, iron, steel, stainless steel, steel alloy (including mild carbon steel), magnesium, titanium and carbon. In another embodiment, each electrode may be made of an alloy of or containing a material selected from the group consisting of: aluminium, iron, steel, magnesium, titanium and carbon. Each electrode may be selected depending upon the liquid (slurry) to be treated, and the relative cost of the various metallic electrodes at the time. Each said electrode may especially be made of iron, carbon, steel, aluminium or an alloy thereof; especially of iron, cast iron, high carbon or mild or rolled steel. The use of an electrode including iron may advantageously introduce iron ions into the treatment chamber during the electrochemical treatment, and these iron ions may be involved in the production of magnetite, maghemite or proto-magnetite. Each said electrode within the apparatus may be the same or different, and may include the same metal or different metals (for example depending on the desired performance). A said or each electrode may also include one or more treatment agents for release during the electrochemical treatment. A said or each electrode may also include one or more treatment agents to catalyse specific reactions during the electrochemical treatment.

The electrodes may be positionable above or below the level of the liquid in the treatment chamber. However, the electrodes are especially positionable below the level of the liquid in the treatment chamber. If the liquid substantially ascends as it passes through the treatment chamber, this arrangement may advantageously not impede liquid (slurry) horizontal flow at the surface of the liquid in the treatment chamber.

The electrodes may be positionable within the reaction chamber at any suitable angle. For example, the electrodes or a portion of the electrodes (such as an upper portion) may be angled from a vertical plane (obliquely configured) or a plane perpendicular to the first wall of the treatment chamber. The electrodes may be positioned substantially vertically or at an angle of from 10 to 30 degrees from the vertical or a plane perpendicular to the first wall of the treatment chamber, especially at an angle of 10 to 15 degrees or about 15 degrees from the vertical or a plane perpendicular to the first wall of the treatment chamber. In one example, the electrodes or a portion of the electrodes (such as an upper portion or portion proximate to the at least one outlet) may be positioned at an angle of from 5 to 40 degrees from the vertical or a plane perpendicular to the first wall of the treatment chamber, especially from 5 to 35 degrees from the vertical or a plane perpendicular to the first wall of the treatment chamber, more especially from 10 to 30, 10 to 15 or 15 to 30 degrees from the vertical or a plane perpendicular to the first wall of the treatment chamber. In other examples, the electrodes or a portion of the electrodes (such as an upper portion or portion proximate to the at least one outlet) may be positioned at less than 40 degrees from the vertical or a plane perpendicular to the first wall of the treatment chamber, more especially less than 35, 30, 25, 20, 15, 10 or 5 degrees from the vertical or a plane perpendicular to the first wall of the treatment chamber. In further examples, the electrodes or a portion of the electrodes (such as an upper portion or portion proximate to the at least one outlet) may be positioned at greater than 5, 10, 15, 20, 25, 30 and 35 degrees from the vertical or a plane perpendicular to the first wall of the treatment chamber. In other embodiments, the electrodes may be substantially vertical (or in a vertical plane) or substantially in a plane perpendicular to the first wall of the treatment chamber. The inventors have found that different liquids react differently to different electrode angles. For the avoidance of doubt, as used herein if the first wall includes a trough or a channel then the phrase "a plane perpendicular to the first wall of the treatment chamber" refers to a plane perpendicular to the base of the trough or channel.

When the liquid substantially ascends through the treatment chamber, positioning the electrodes within the treatment chamber at an angle may result in a number of advantages. First, positioning the electrodes at an angle may mean that the slurry flows against the electrodes as it rises through the treatment chamber (also gases may travel against the electrode as the gas rises through the treatment chamber). This may assist, for example, in preventing build-up of passivating material (such as a magnetite or similar coating) on the electrodes.

Secondly, positioning the electrodes at an angle results in a horizontal movement being applied to the slurry as it travels through the treatment chamber. This may assist in directing the slurry through the at least one outlet. In one example, the horizontal or essentially tangential movement applied to the slurry drives solids in the slurry through the at least one outlet.

Each electrode may be of any suitable thickness, for example from 1 mm to 20 mm thick, especially from 1 mm to 10 mm thick, more especially from 1 mm to 5 mm thick, most especially about 3 mm thick. In some embodiments, each electrode is less than 20 mm thick, especially less than 19, 18, 17, 16, 15, 14, 13, 12, 11, 10, 9, 8, 7, 6, 5, 4, 3 or 2 mm thick. In other embodiments, each electrode is greater than 0.5 mm thick, especially greater than 1, 2, 3, 4, 5, 6, 7, 8, 9, 10, 11, 12, 13, 14, 15, 16, 17, 18 or 19 mm thick. In a further embodiment, thickness of the electrode may be a range in which the upper and lower limits are as previously described. In one embodiment, the electrodes are from 1 mm to 10 mm thick, especially about 3 mm thick.

The or each of the plurality of electrodes may be spaced at any suitable distance. For example, the electrodes may be (especially on average) from 0.5 or 1 mm to 150 mm apart, especially from 0.5 or 1 mm to 100 mm apart or from 0.5 or 1 mm to 50 mm apart, more especially from 0.5 or 1 mm to 10 mm apart. The electrodes may be (especially on average) from 0.5 or 1 mm to 5 mm apart, or from 3 to 6 mm apart, or from 1.5 mm to 4.5 mm apart or from 1.5 to 4.0 mm apart; more especially from 1.5 mm to 3 mm apart or about 3 mm apart. In some embodiments, the electrodes are (especially on average) less than 150 mm apart, especially less than 140, 130, 120, 110, 100, 90, 80, 70, 60, 50, 40, 30, 25, 20, 15, 10, 9, 8, 7, 6, 5, 4 or 3 mm apart. In other embodiments, the electrodes are (especially on average) greater than 0.5, 1, 2, 3, 4, 5, 6, 7, 8, 9, 10, 15, 20, 25, 30, 40, 50, 60, 70, 80, 90, 100, 110, 120, 130 or 150 mm apart. The electrodes may also be a range apart in which the upper and lower limits are as previously described. When the treatment chamber includes more than 2 electrodes, each electrode may be the same distance apart or different distances apart. The optimum distance or spacing between the electrodes may depend on, for example, the electrical conductivity of the interstitial water, a feature of the total dissolved solids (TDS) of the water used in the wet beneficiation process. The electrode spacing may also be changed to suit the particular flow characteristics required of the slurry as well as the required effectiveness of the treatment and the number of times the ore within the slurry will be recirculated. The spacing of the electrodes is a consideration in developing the electrical field strength required to 'flip' or realign the outer electrons contributing to the covalent bonding of the iron containing minerals which can hold hydroxyl, chloride, bicarbonate, carbonate and/or sulfate anions and other cationic metals as described, within the layered iron oxide hydroxide lattice. In a preferred embodiment of the invention, the yield of magnetic products can be improved if some or all of the outer electrons align in parallel.

The electrodes may be held apart in any suitable way. For example, the treatment chamber may include guides for holding the electrodes in position. In one embodiment, the guides may be grooves or slots positioned in opposite walls of the treatment chamber. The guides may be made from a high-density, electrically insulating polymeric material, such as HDPE or PVC, or a material as discussed below for the electrode holder.

In one embodiment, the electrodes are from 1 mm to 10 mm thick, more especially from 1 mm to 5 mm thick; and the electrodes are from 1 mm to 10 mm apart, more especially from 1 mm to 5 mm apart. Using thinner electrodes positioned close together enables a greater number of electrodes to be positioned within the treatment chamber. This increases the surface area of the electrodes in contact with the liquid, which may enhance the electrochemical treatment of the liquid (slurry) and yield of beneficiated product.

To improve fluid flow, the electrodes may have a tapered lower edge or edge proximate to the at least one inlet. The lower edge (or edge proximate to the at least one inlet) of the electrodes may be tapered to an angle of about 4, 5, 6, 7, 8, 9, 10, 11, 12, 13, 14, 15, 16, 17, 18, 19 or 20 degrees relative to the longitudinal axis of the electrode. The taper may extend less than 40%, 30%, 20%, 15%, 10%, 9%, 8%, 7%, 6%, 5%, 4% or 3% of the length of the electrode. The lower edge of the electrode or edge proximate to the at least one inlet may be tapered on one or more sides, such as two opposed longitudinal sides, more especially one longitudinal side. If the lower edge of the electrode or edge proximate to the at least one inlet is tapered on more than one side, then the taper on each side may be the same or different.

The apparatus may also include at least one non-conductive element positioned within the treatment chamber. The non-conductive element may alter the electrical field (amperage and voltage) within the treatment chamber. The position, shape and configuration of the non-conductive element may be as described above for the electrodes. However, the non-conductive element is made of a material that does not conduct electricity, such as, for example, a material selected from the group consisting of: a polymer plastic (such as polyvinyl chloride (PVC), high density polyethylene (HDPE), low density polyethylene (LDPE), acrylonitrile butadiene styrene (ABS), polypropylene (PP)), a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix, or a combination of the aforementioned materials. In one embodiment the apparatus does not include any non-conductive elements.

In another embodiment, the treatment chamber is configured to accommodate a plurality of electrodes. The plurality of electrodes may be removable from the treatment chamber. For example, the treatment chamber may be configured to releasably engage with at least one electrode holder holding a plurality of electrodes for electrochemical treatment of the slurry. The treatment chamber may include at least one (or a plurality of) grooves for slidable engagement of the electrode holder in the treatment chamber. The treatment chamber may include at least one power connector for connecting power to the electrode holder, to thereby power at least one of the electrodes held by the electrode holder.

The apparatus may further include at least one electrode holder holding a plurality of electrodes, especially such that the plurality of electrodes are positionable or positioned (especially releasably engaged or releasably engageable) within the treatment chamber. The at least one electrode holder may be configured to engage (especially releasably engage) with the treatment chamber. The electrode holder may be in the form of a cartridge. The electrode holder may be slidably engageable with the treatment chamber. The electrode holder may be configured to accept power from the wall of the treatment chamber, especially beneath the surface of the liquid (or beneath the water surface). The electrode holder may be configured to supply power along a longitudinal edge of at least one electrode held by the electrode holder.

The electrode holder may further include a flow aligner, for aligning the flow of the slurry between the electrodes. The flow aligner may be in the form of at least one (especially a plurality of) baffles or baffle walls extending beneath the electrodes. The at least one baffle or baffle wall may extend substantially vertically beneath the electrodes. The at least one baffle or baffle wall may extend along substantially the same longitudinal axis as the electrodes. The at least one baffle or baffle wall may be positioned transversely or substantially perpendicularly to the electrodes.

The treatment chamber may be configured to engage (especially releasably engage) with the at least one electrode holder, especially with at least one electrode holder holding a plurality of electrodes for electrochemical treatment of the liquid. The treatment chamber may include at least one guide for guiding the electrode holder into position. The treatment chamber may include at least one (or a plurality of) grooves for slidable engagement of the electrode holder in the treatment chamber. The treatment chamber may include at least one power connector for connecting power to the electrode holder or to at least one electrode held by the electrode holder. The treatment chamber may include a plurality of power connectors (for example of the same or different polarity) for connecting power to each electrode holder or to electrodes held by the electrode holder.

The treatment chamber may include at least one power connector for connecting power to the electrode holder, to thereby power at least one of the electrodes held by the electrode holder. For each electrode holder, the treatment chamber may include at least one power connector for connecting power to at least one anode in the electrode holder (especially one or two power connectors) and at least one power connector for connecting power to at least one cathode (especially one or two power connectors) in the electrode holder.

In a first exemplary embodiment, the at least one power connector may be located on a wall of the treatment chamber (especially a side wall or the first wall), especially in a groove in which the electrode holder may be slideably engaged. Only one wall of the treatment chamber may include a power connector for each electrode holder. The at least one power connector may be made of a metal, especially bronze, titanium, stainless steel or any alloy of these metals.

In a second exemplary embodiment, the treatment chamber includes at least one power connector that is adapted to contact the working face of at least one (for example one or two) electrodes. As used herein, the term "working face" refers to the surface of the electrode that contacts the liquid during the electrochemical treatment. In this embodiment, at least one (especially one or two) power connectors may be positioned adjacent one or more side walls of the treatment chamber, especially one or more side walls parallel to the working face of the electrodes. At least one power connector may be positioned between electrode holders in the treatment chamber. At least one power connector may be positioned intermediate two electrode holders, and the at least one power connector may be positioned intermediate to the working face of a terminal electrode of each electrode holder (in this case, one power connector may power one electrode in each electrode holder. In this case, the at least one power connector may be housed within a power connector housing located intermediate two electrode holders). In this embodiment, the at least one power connector may include a biasing mechanism for biasing the power connector against an electrode. The biasing mechanism may include a compression spring. The at least one power connector may be made of a metal, especially a resilient metal, such as titanium or steel, more especially stainless steel, most especially spring steel. Advantageously, the use of a biasing mechanism in the power connector may improve the contact between the electrode and the power connector, assist in holding the electrode holder in place, and avoid the need for screwed connectors when replacing electrode holders. In one embodiment, the power connector may traverse a wall of the treatment chamber (especially a side wall) to provide a tab for connection to a power source (possibly via the current controller, as described further below). The at least one power connector may have or include a corrugated shape.

The treatment chamber may be configured to releasably engage with from 1 to 100 electrode holders, especially from 2 to 50 electrode holders, more especially from 2 to 40, from 2 to 30, from 2 to 20, or from 2 to 10 electrode holders.

Each said electrode holder may include a frame, and the frame may include a handle and at least two side walls. The handles of the electrode holders, once placed in the treatment chamber, may form the lid of the treatment chamber. The electrode holder handles may sealingly abut each other in the treatment chamber. The frame may also include a flow aligner (or a segment of a flow aligner). In one embodiment, the flow aligner is a wall defining a plurality of apertures for passage of the liquid, and wherein the treatment chamber includes a shelf upon which the electrode holder rests when the electrode holder is releasably engaged with the treatment chamber. The frame may be substantially U-shaped, with the base of the "U" forming the handle and the sides of the "U" forming the side walls. Alternatively, the frame may be of substantially square or rectangular-shaped, with two opposite side walls of the square/rectangle forming the side walls of the frame, and the other opposed sides forming a flow aligner and a handle. The electrode holder may be in the form of a cartridge. Accordingly, each said electrode holder (or at least one said electrode holder) may include a flow aligner, as described above. The flow aligner may be positioned between the electrodes and the at least one inlet. The electrode holder handle may include an electrode holder remover (such as a strap (or webbing strap or strap loop), especially a cable, string or thread) to assist in removing the electrode holder from the treatment chamber.

The electrode holder, especially the at least two side walls of the electrode holder may be configured to releasably engage with the treatment chamber. The electrode holder may be engageable with the treatment chamber (especially such that the plurality of electrodes are positioned or releasably engaged within the treatment chamber). The electrode holder (especially the at least two side walls) may be slideably engageable with the treatment chamber. The electrode holder (especially the at least two side walls) may be releasably engageable in the treatment chamber by friction, by a clamp, or by another suitable fastener. In another embodiment, the treatment chamber may include a shelf upon which the electrode holder rests when in position.

In one embodiment, the treatment chamber or the electrode holder may include a clamp for releasably clamping the electrode holder in position. The electrode holder (especially at least one of the at least two side walls or the side of the holder proximate to the first wall of the treatment chamber) may be configured to accept power, especially from a wall of the treatment chamber. The electrode holder (especially at least one of the at least two side walls) may be configured to supply power along a longitudinal edge of at least one electrode held by the electrode holder. The treatment chamber may also be configured to provide power longitudinally along the working face of at least one electrode. Providing power along a longitudinal edge of at least one electrode, or longitudinally along the working face of at least one electrode, may provide superior flow of power than if power was only supplied to the at least one electrode at a single point.

The electrode holder may include a power connector for connecting with a power connector from the treatment chamber. If present, power connectors in the electrode holder and the treatment chamber may connect in any suitable way. For example, the two power connectors may connect by way of abutting surfaces or projections, or by way of a male-female connection.

The electrode holder may hold a plurality of electrodes. The electrodes within the electrode holder may be replaceable and/or removable. In one embodiment, the electrodes within the electrode holder may not be replaceable and/or removable. The electrode holder may include slots machined to enable the electrodes to slide in and out of the electrode holder as required. This may enable replacement of the electrodes within the electrode holder whilst the apparatus is in operation. The electrodes, properties of the electrodes, orientation of the electrodes, and the relationship between two electrodes (e.g. the distance between electrodes) in the electrode holder may be as described above. For the avoidance of doubt, the electrode holder may also include at least one non-conductive element. Therefore, the electrode holder may hold one or more electrodes and one or more non-conductive elements.

Any suitable number of electrodes may be held by the electrode holder. In one embodiment, the electrode holder may hold from 3 to 100 electrodes; especially from 3 to 50 electrodes; more especially from 3 to 25 electrodes; most especially from 5 to 15 electrodes or from 8 to 15 electrodes, about 10 electrodes or about 13 electrodes. In one embodiment, the electrode holder holds at least 3, 4, 5, 6, 7, 8, 9 or 10 electrodes. In another embodiment, the electrode holder holds less than 100, 90, 80, 70, 60, 50, 40, 30, 20 or 15 electrodes.

The electrode holder or the electrodes within the electrode holder may be positionable within the treatment chamber at any suitable angle, especially at an angle of from 10 to 30 degrees from the vertical, more especially at an angle of 10 to 15 degrees or about 15 degrees from the vertical. The electrodes within the electrode holder may be from 1 mm to 10 mm apart, especially about 3 to 6 mm apart, or about 3 mm apart. The electrodes within the electrode holder may be replaceable and/or removable. The orientation of the electrode holder may be as described above for the angle of electrodes within the treatment chamber.

In one embodiment, the electrode holder may be positionable substantially vertically within the treatment chamber. This may be particularly advantageous if the liquid substantially ascends through the treatment chamber. In this embodiment, the electrodes may be held substantially vertically by the electrode holder, or the electrodes may be held at an angle from the vertical by the electrode holder. In another embodiment, the electrode holder is positionable at an angle within the treatment chamber.

The electrodes within the electrode holder may be positionable in the same plane as the electrode holder, or the electrodes may be positionable at an angle relative to the longitudinal plane of the electrode holder. For example, the electrodes may be positionable at an angle of from 0-20 degrees from the longitudinal plane of the electrode holder, more especially from 0-15 degrees or from 0-10 degrees, most especially from 0-5 degrees or 0-3 degrees or 0 degrees from the longitudinal plane of the electrode holder.

The electrode holder advantageously may allow for the easy and rapid exchange of electrodes in the apparatus. The electrode holder may overcome the delays inherent in changing individual electrodes within the reaction chamber and may be particularly advantageous in areas of low head height.

The frame of the electrode holder may be made of any suitable material, but especially may be made of a non-conductive material. The frame of the electrode holder may be made of the materials discussed above for the treatment chamber. The frame of the electrode holder may be especially made (especially by any suitable means) from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; or a polymer plastic such as high density polyethylene (HDPE), polyethylene (PE), polyethylene terephthalate (PET) or polyvinyl chloride (PVC); a phenolic polymer plastic; or a carbon fibre insulated using a polymer plastic or a composite material.

The electrode holder may be removable from the treatment chamber by way of a removal device (especially a lifting device which lifts the electrode holder from the treatment chamber). In one example, the lifting device may lift the electrode holder substantially vertically before allowing for horizontal movement of the electrode holder above the apparatus. The lifting device may be slideably mounted on at least one (especially two) rails. In one embodiment, the electrode holder may be removable using an overhead gantry.

The apparatus may further include a slurry pump for pumping slurry through the at least one inlet for entry of a liquid to be treated (slurry inlet), and/or at least one treatment agent pump (which may be a liquid pump and/or a gas pump) for pumping the treatment agent through the at least one treatment inlet. Said pump may be a variable speed pump. Any suitable pump may be used. For example, the gas pump may be an entrained air pump or a centrifugal, diaphragm, peristaltic, geared or similar pump. A slurry pump may or may not be necessary, depending on the pressure and viscosity of the slurry delivered to the treatment chamber. However, a slurry pump may be advantageous as this may permit greater control over the liquid flow rates within the treatment chamber.

The apparatus may further include at least one separator for separating the at least one iron mineral that has been electrochemically treated from the liquid and gangue. In a first exemplary embodiment, the at least one separator may be positioned relative to the treatment chamber so that the at least one iron mineral is separated from the liquid during the electrochemical treatment. The separator may be or include a magnet. For example, the at least one separator may include at least one magnet positioned around the walls of the treatment chamber for separating magnetic iron minerals (such as magnetite, maghemite and proto-magnetite). The at least one separator may be at least one magnet positioned on at least one side wall of the treatment chamber, especially on the upper portion of the at least one side wall of the treatment chamber.

Alternatively, the at least one separator may include at least one magnet positioned within the treatment chamber for separating magnetic iron minerals. The separator may be a magnetic separator. The process may include the step of magnetically separating the magnetic iron particles (especially iron oxide particles) (or the electrochemically treated iron particles or iron oxyhydroxide particles). In one embodiment, the step of electrochemically treating at least one non-magnetic iron mineral is a step of electrochemically treating a liquid including at least one non-magnetic iron mineral, and wherein the process further includes the step of magnetically separating the magnetic iron particles (or iron oxide particles) from the liquid. The at least one magnet within the treatment chamber may rotate, and in one example, the at least one magnet may be a rotating magnetic drum within the treatment chamber. The magnet may be a high intensity magnet. The magnet may be a rare earth magnet. The magnet may be doped with neodymium.

The magnetic field applied by the at least one separator in this exemplary embodiment may be transient or permanent. The magnetic field may include or be applied by a high intensity magnet, such as a rare earth magnet. The magnetic field may include or be applied by a ferrite magnet. The magnetic field may include or be applied by an electromagnet.

The separator may also be a rotary vacuum filter, especially a rotating drum vacuum filter, which especially may be submerged within the top of the treatment chamber. This may advantageously remove iron oxide minerals whilst allowing lighter gangue minerals to be discharged to waste. However the stages may be separated, for example such that the vacuum filter is acting on material that has previously passed through a treatment chamber. Both the suspending slurry and the iron oxide particles once treated, may remain charged electrically for some time following the electrochemical treatment. Whilst so charged, the slurry and the iron oxide particles may be particularly susceptible to the additive and substitution reactions as herein described, whereby minerals of incrementally higher iron content are produced.

In a second exemplary embodiment, the at least one separator may be positioned in fluid communication with the outlet of the treatment chamber to separate the at least one iron mineral from the liquid after the electrochemical treatment. The separator may separate the at least one iron mineral based on properties of the at least one iron mineral such as magnetism, specific gravity or (net) density. Advantageously, due to changes in the properties of the at least one iron mineral as a result of the electrochemical treatment, the separation of the at least one iron mineral from the gangue typically becomes easier. The separator may also filter, drain or precipitate the solids from the liquid (such as by directing the electrochemically treated slurry to a stockpile where the liquid may drain away, especially so that the product can dry).

For example, the separator may be one or more of the group consisting of: a hydrocyclone, a gravity separator (including a gravity spiral and a gravity table), and a magnetic separator. An exemplary magnetic separator is a Wet High Intensity Magnetic Separator (WHIMS). The magnetic field applied during magnetic separation in this exemplary embodiment may be transient or permanent.

In one embodiment, after the separator has separated iron minerals from the electrochemically treated slurry, the remaining slurry may be further electrochemically treated. For example, the slurry including iron minerals may be electrochemically treated in a first electrochemical treatment chamber, and the electrochemically treated slurry may be processed by a separator to remove iron minerals from gangue. The gangue may then flow back to the first electrochemical treatment chamber, or may flow to a second electrochemical treatment chamber for production and then separation of further iron minerals.

The step of separating iron minerals from the electrochemically treated slurry may include the step of filtering the electrochemically treated slurry to provide liquid and solids. The step of separating iron minerals may further include the step of drying the filtered solids. The solids may be dried at any suitable temperature. In one embodiment, the solids are dried at from 80 to 130° C., especially from 90 to 120° C., more especially from 100 to 110° C. The solids may be dried at a temperature of less than 130° C., especially less than 120° C., more especially less than 110° C.

In one embodiment, the step of separating iron minerals from the electrochemically treated slurry may further include the step of performing sonification on the filtered solids, especially the dried filtered solids. The step of separating iron minerals from the electrochemically treated slurry may include the step of separating the magnetic dried iron solids (especially the magnetic sonicated dried iron solids) from the non-magnetic dried iron solids (especially the non-magnetic sonicated dried iron solids) with a magnet.

The apparatus may further include one or more sensors for sensing: flow velocity through the treatment chamber; volume of liquid in the treatment chamber (including the liquid height, especially when the liquid substantially ascends through the treatment chamber); formation of products in the treatment chamber or exiting the treatment chamber (including gases, especially explosive gases); passivating accumulations such as magnetite or other oxide coatings on one or more electrodes; and the pH and conductivity of the liquid in the treatment chamber.

In one embodiment, the apparatus includes a system for regulating the electrochemical treatment. The system may be automated and include one or more sensors as outlined in the preceding paragraph and one or more devices for regulating the electrochemical treatment, wherein the one or more devices are in communication with the one or more sensors to thereby automate the treatment. The system may be controlled by a controller (such as a programmable logic controller (PLC)). The one or more devices may include at least one selected from the group consisting of: a pump (especially a variable speed pump) for regulating the flow of liquid into the treatment chamber, a current controller for controlling the electrical current to the electrodes (especially for controlling the polarity of the current and its reversal to thereby provide cathodes and anodes, and/or the voltage of the current); treatment enhancer applicator for applying a treatment enhancer to the treatment chamber (for example, an electromagnetic radiation source or a sonic generator); a valve for draining the treatment chamber (and optionally a pump in fluid communication with the valve); a treatment agent applicator for applying one or more treatment agents to the treatment chamber (this may include a treatment agent pump); fluid jets (including liquid and gas jets) for reducing passivating accumulations on the electrodes (the fluid jets may be high-pressure fluid jets); an electrode holder remover and inserter; and an electrode plate remover and inserter.

As outlined above, the current controller may control the polarity of the current and its reversal to thereby provide cathodes and anodes. In one embodiment the polarity of the electrodes is reversed during the electrochemical treatment. Any suitable electrical current may be applied to the plurality of electrodes. The polarity of the electrodes may advantageously be alternated to thereby reduce passivating accumulations on the electrodes and create a reversible electrical field within the treatment chamber. The polarity switching of the electrodes may allow specific chemical reactions to be delayed or accelerated as required. During the electrochemical treatment the anodes typically are sacrificial and gradually reduce in size. In contrast the cathodes typically undergo passivation and accumulate matter on their surfaces. By regularly reversing the polarity of the current flowing to the electrodes the same electrode will successively function as a cathode and an anode. In this way the passivating surface of the cathode becomes the eroding surface of the anode, which may reduce or lessen passivating accumulations on the electrode and slow the reduction in size of the electrode (this may generally be ore and matrix water specific). In one embodiment, the current source applied to the apparatus is direct current, but due to the alternating polarity of the current by the current controller, the current applied to the electrodes is alternating current. In other words, the current applied to the plurality of electrodes may be a direct current of adjustable frequency of alternation. The current controller may also modify the sinewave ramping angles during the electrochemical treatment (which may reduce excessive wear by electrical arcing on contactors), and/or modify the rate of current application to the electrodes during the electrochemical treatment.

Accordingly, the current controller may control the frequency of current reversal to the electrodes. The current controller may also control the relative proportion of cathodes and anodes in the electrochemical apparatus. Control of the relative proportion and hence surface area of cathodes and anodes may be advantageous, as this will alter the chemistry of the electrochemical treatment. For example, if the total surface area of the anodes exceeds (especially by a significant degree) the surface area of the cathodes then an oxidising environment is created within the treatment chamber. Alternatively, if the total surface area of the cathodes exceeds (especially by a significant degree) the surface area of the anodes, then a reducing environment is created within the treatment chamber. The electrical current controller may apply a voltage to the treatment chamber to apply an effective voltage to each cell of from 0.1 to 50 V; especially from 0.1 to 40 V, from 0.5 to 30 V, or from 0.5 to 20 V; more especially from 1 to 10 V or from 1 to 5 V or from 2 to 4 V; most especially about 2-3 V or about 3 V (the "effective voltage to each cell" is the voltage between two adjacent electrodes in the treatment chamber). In one embodiment, the electrochemical treatment provides a voltage between two adjacent electrodes of from 0.1 to 50 V; especially from 0.1 to 40 V, from 0.5 to 30 V, or from 0.5 to 20 V; more especially from 1 to 10 V or from 1 to 5 V or from 2 to 4 V; most especially about 2-3 V or about 3 V.

The inventors have found that the effective voltage to each cell may be adjusted by adjusting the voltage applied to the electrodes by the electrical current controller, by adjusting the number of electrodes connected to an electrical current, by positioning a non-conductive element within the treatment chamber, and/or by altering the number or submerged surface area of electrodes in the treatment chamber (for example using an electrode holder remover and inserter, and/or an electrode plate remover and inserter). The electrical current may be provided by a voltage source. In one embodiment, the apparatus further includes a voltage source. The conductivity of the liquid in the treatment chamber may vary, and this conductivity may affect the extent and type of reactions occurring in the treatment chamber during the electrochemical treatment. For example, the electrochemical treatment may provide the same (or similar) effect when treating a highly conductive liquid with fewer electrodes, as when treating a poorly conductive liquid with a greater number of electrodes. A sensor for sensing the conductivity of the liquid in the treatment chamber may be in communication (such as via a PLC) with the current controller, an electrode holder remover and inserter, and/or an electrode plate remover and inserter to thereby control the effective voltage to each cell (this may occur in an automated manner).

In another embodiment, the present disclosure relates to an electrode holder for an electrochemical liquid treatment apparatus, wherein the electrode holder is configured for holding a plurality of electrodes and to engage (especially releasably engage) with an electrochemical treatment chamber. In one embodiment, there is provided an electrode holder for an electrochemical liquid treatment apparatus, the electrode holder holding a plurality of electrodes and being configured to releasably engage with a treatment chamber of the electrochemical liquid treatment apparatus, wherein said electrode holder includes a flow aligner for aligning the flow of the liquid between the electrodes. In one embodiment, the flow aligner is for distributing the liquid between the electrodes. In another embodiment, the flow aligner is a wall defining a plurality of apertures for passage of the liquid.

The electrode holder may include a plurality of electrodes. The electrode holder may be in the form of a cartridge. The electrode holder may be slideably engageable with the treatment chamber. The electrode holder may be configured to accept power from a wall of the treatment chamber. The electrode holder may be configured to supply power along a longitudinal edge of at least one electrode held by the electrode holder. The electrode holder may be configured so that power is applied to the working face of at least one electrode in the electrode holder. Features of the electrode holder of this embodiment of the present disclosure may be as described for the electrode holder above.

The electrode holder may further include a flow aligner, for aligning the flow of the liquid between the electrodes or distributing the flow of liquid between the electrodes. The flow aligner may be as described above. The flow aligner may be in the form of at least one (especially a plurality of) baffles or baffle walls extending beneath the electrodes. The at least one baffle or baffle wall may extend substantially vertically beneath the electrodes. The at least one baffle or baffle wall may extend along substantially the same longitudinal axis as the electrodes. The at least one baffle or baffle wall may be positioned transversely or substantially perpendicularly to the electrodes. The flow aligner may also be a wall or partition defining a plurality of apertures for passage of the liquid.

The electrode holder or the electrodes within the electrode holder may be positionable within the treatment chamber at any suitable angle, especially at an angle of from 10 to 30 degrees from the vertical, more especially at an angle of 10 to 15 degrees or about 15 degrees from the vertical. The electrodes within the electrode holder may be from 1 mm to 10 mm apart, especially about 3 mm apart. The electrodes within the electrode holder may be replaceable and/or removable. Features of the electrodes in the electrode holder may be as defined for the electrodes described above.

The process may be performed at any suitable temperature and pressure. However, in one embodiment, the process is performed at less than 100° C., especially less than 80° C., more especially less than 60° C., most especially less than 40° C. In another embodiment, the process is performed at above 0° C. In one exemplary embodiment, the process may be performed at atmospheric pressure and at room temperature.

In a fifth aspect, the present invention relates to at least one iron mineral in which the grade of iron has been improved by the process of the first aspect of the present invention.

In a sixth aspect, the present invention relates to an electrochemical treatment apparatus. Features of the electrochemical treatment apparatus may be as described for the first to third aspects of the present invention.

In a seventh aspect, the present invention relates to an iron oxide produced by the second aspect of the present invention.

In an eighth aspect, the present invention relates to an iron mineral having a crystal lattice from which hydroxide and/or water has been removed by the process of the third aspect of the present invention.

In a ninth aspect, the present invention relates to a magnetic or partially magnetic iron mineral produced by the process of the fourth aspect of the present invention.

Features of the fifth to ninth aspects of the invention may be as described for the first to fourth aspects of the present invention.

BRIEF DESCRIPTION OF DRAWINGS

Examples of the invention will now be described by way of example with reference to the accompanying figures, in which:

FIG. 14 is a top view of the electrochemical/electrolytic liquid treatment apparatus in the system of FIGS. 12 and 13;

FIG. 15 is a side view of the electrochemical/electrolytic liquid treatment apparatus of FIG. 14;

FIG. 16 is a perspective view of the electrochemical/electrolytic liquid treatment apparatus of FIG. 14;

FIG. 22 is a perspective view of the electrode holder in the apparatus of FIG. 19;

FIG. 23 is a bottom perspective view of the electrode holder of FIG. 22;

FIG. 24 is a cross sectional view through the electrode holder of FIG. 22;

FIG. 28 is a perspective view of the apparatus of FIG. 19 with the electrode holder partly removed;

FIG. 29 is a cross sectional view through the treatment chamber and electrode holder of FIG. 19 with the electrode holder partly removed;

Figure 1:
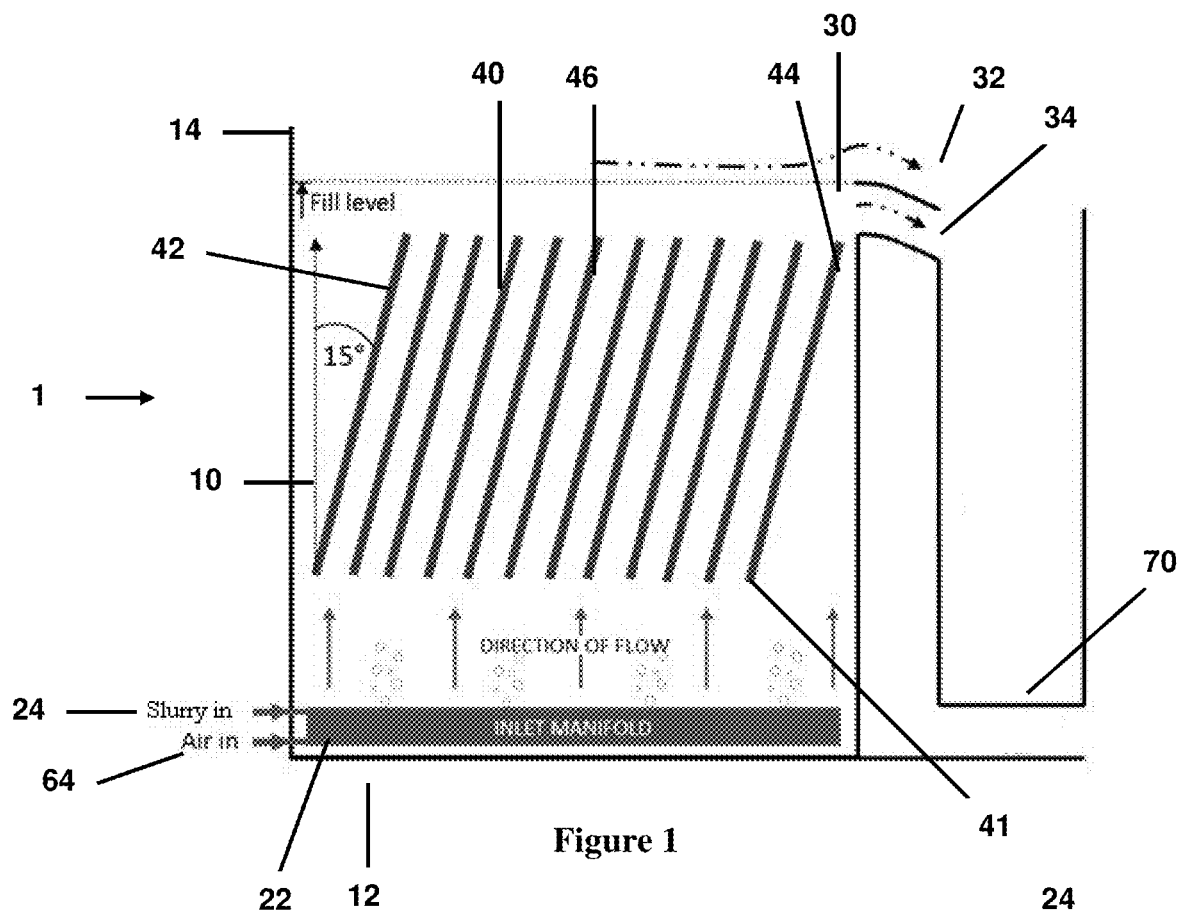
FIG. 1 is a side view of a first example electrochemical treatment apparatus.

Preferred features, embodiments and variations of the invention may be discerned from the following Description which provides sufficient information for those skilled in the art to perform the invention. The following Description is not to be regarded as limiting the scope of the preceding Summary of the Invention in any way.

DESCRIPTION OF EMBODIMENTS

Exemplary electrochemical treatment apparatuses, and the electrochemical treatment step are now described with reference to FIGS. 1 to 32. In the figures, like reference numerals refer to like features.

FIGS. 1 to 7 and 11 illustrate four different electrochemical liquid treatment apparatuses 1 for use in the present invention. Each apparatus 1 includes a treatment chamber 10 having at least one inlet 20 and at least one outlet 30. Positioned within the treatment chamber 10 are a plurality of electrodes 40. The plurality of electrodes include at least one cathode 42 and at least one anode 44.

The application of an electrical field between the electrodes 40 (between the at least one cathode 42 and the at least one anode 44) in the treatment chamber 10 may result in the creation of charged polymeric metal hydroxide species (these are typically created at the at least one anode 44). These species may assist in changing the crystal structure of an iron mineral, for example by removing hydroxyl bonded chemically combined water and releasing it to the surrounding slurry.

In one embodiment, the liquid rises as it travels through the treatment chamber 10. In a further embodiment, the liquid obliquely rises as it travels through the treatment chamber 10.

The treatment chamber 10 may be of any suitable shape. In FIGS. 1, 3 to 5, 7 and 11, the treatment chamber 10 has a square cross-section, but the chamber 10 also may be, for example, of circular, ovoid, elliptical, polygonal or rectangular cross-section. The treatment chamber 10 typically has a base 12, a top or lid 14 and one or more side walls.

The base 12 of the treatment chamber 10 illustrated in FIGS. 1, 3 to 5, 7 and 11 is flat or planar, but the base 12 may also be of any suitable shape, for example to accommodate other components of a mineral processing system. Similarly, the top 14 of the treatment chamber 10 illustrated in FIGS. 1, 3 to 5, 7 and 11 is open to the atmosphere, but the treatment chamber 10 may be fully or partially closed or be closeable with a lid (this may be advantageous if the electrochemical treatment is to be performed under reducing conditions). If the chamber 10 is closed or closeable, then the top 14 or lid of the chamber 10 may include a vent or other outlet for exit of gases used or produced in the electrochemical treatment. In a further embodiment, the top 14 of the treatment chamber 10 is of the same dimensions as the base 12.

The treatment chamber 10 may be of any suitable size. In one embodiment, the treatment chamber 10 is a large industrial unit. For example, the treatment chamber 10 may accommodate from 125 kL to 500 kL; most especially about 250 kL of liquid (slurry). The apparatus 1 may be configured for a liquid (slurry) flow rate of at least 10 L's, especially about 23 Us. The residence time of the liquid (slurry) in the treatment chamber 10 may be less than 2 minutes, especially from 30-60 seconds.

Figure 2:
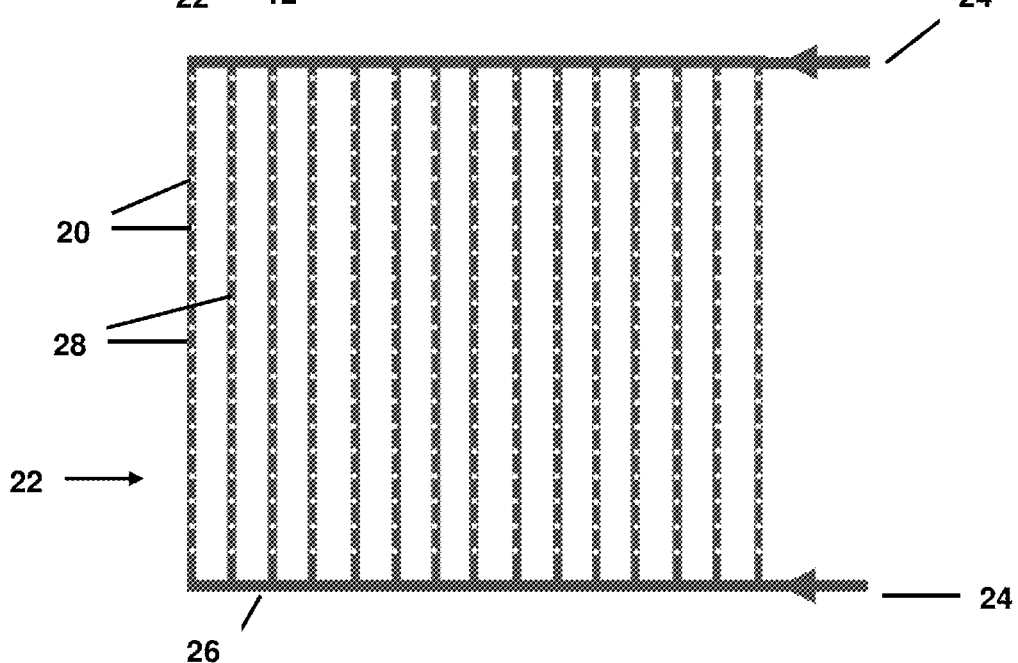
FIG. 2 is a top view of a slurry disperser for use in the first example apparatus.

An exemplary disperser 22 is illustrated in FIG. 2 (in the form of a slurry manifold). In this disperser there are two slurry entry points 24 in fluid communication with two longitudinal slurry passageways 26. Between the two longitudinal slurry passageways 26 extend a plurality of transverse slurry passageways 28. Each of the transverse slurry passageways include a plurality of inlets 20. In an alternative exemplary embodiment, the disperser may include one slurry entry point 24 in fluid communication with one transverse slurry passageway 28. A plurality of longitudinal slurry passageways 26 may then be in fluid communication with, and extend from the transverse slurry passageway 28. Each longitudinal slurry passageway 26 may include a plurality of inlets 20 to the treatment chamber 10. There may be one, two, three, four, five, six, seven, eight, nine, ten or more than ten longitudinal slurry passageways 26 and/or transverse slurry passageways 28.

The disperser 22 may further include a diffuser, for evenly distributing the slurry exiting the disperser 22. A diffuser may further improve the movement of the slurry into the treatment chamber 10. For example, when a slurry enters the disperser the pressure may be higher at the slurry entry point 24 than at a position on the disperser 22 furthest from the slurry entry point 24. To counter this, one solution may be to vary the size of the inlet 20 openings, so that the inlet 20 openings are larger at the slurry entry point 24 end of the disperser 22, and the inlet 20 openings are smaller at the position on the disperser 22 furthest from the slurry entry point 24.

The at least one inlet 20 and/or disperser 22 may be positioned at any suitable point or points in the treatment chamber 10. In one embodiment, the at least one inlet 20 and/or disperser 22 is positioned beneath the electrodes 40, especially so that the slurry substantially rises as it travels through the treatment chamber 10. In one embodiment, the disperser 22 is integral with the base 12 of the treatment chamber 10. In another embodiment, the disperser 22 is removable from the treatment chamber 10.

At least one treatment agent may be used to assist in the treatment of the liquid (the slurry). The at least one treatment agent may be a fluid (including a gas or a liquid) or a solid. In a first exemplary embodiment, the at least one treatment agent may be an oxidant or reductant.

In a second exemplary embodiment, the at least one treatment agent may be an oxygen scavenger.

In a third exemplary embodiment, the at least one treatment agent may adjust the properties of the slurry (for example to adjust the pH, the agglomeration, or flowability of the slurry). The at least one treatment agent may be a pH adjuster, such as an acidic pH adjuster (such as a carboxylic or other organic acid, such as acetic acid) for producing an acidic pH.

In a fourth exemplary embodiment, the at least one treatment agent may be a gas (which may be inert, an oxidant or a reductant, for example).

In a fifth exemplary embodiment, the at least one treatment agent may be a microorganism. The microorganism may act as a catalyst to enhance reaction kinetics.

In a sixth exemplary embodiment, the at least one treatment agent may be a viscosity modifier. These exemplary embodiments may be as discussed above.

Increasing the liquid flow velocity between the electrodes 40 may be advantageous for several reasons. First, increased liquid flow velocity between the electrodes 40 may reduce the accumulation of dangerous gases, such as hydrogen, chlorine and hydrogen sulphide at the electrodes 40. Although such gases may form in the electrochemical treatment, in the absence of high current densities the formation rate of such gases may be so low that poor clearance of these gases occurs. The addition of a buoyant gas to the treatment chamber 10 may improve the clearance of such dangerous gases.

A second and related advantage of increasing the liquid flow velocity between the electrodes 40 is that passivation of the at least one cathode 42 may be reduced, as higher liquid flow rates decreases the potential for passivating material build-up (such as magnetite or similar floc) on the at least one cathode 42.

A third advantage of increasing the liquid flow velocity between the electrodes 40 is that the liquid is more likely to push any solids in the slurry to the top 14 of the treatment chamber 10, especially for separation. This prevents the solids from settling on the base 12 of the treatment chamber 10.

The gas introduced to the treatment chamber 10 may also contribute to chemical reactions occurring within the treatment chamber 10, assisting in the electrochemical treatment of the slurry. For example, and as discussed above, the gas selected may be used as an oxidant or a reductant.

Examples of gases that may be used in the apparatus 1 include air, nitrogen, hydrogen, oxygen, ozone, carbon monoxide, carbon dioxide, sulphur dioxide, hydrogen sulfide, nitrogen, chlorine, fluorine, chlorine dioxide, ammonia, or a combination thereof; especially nitrogen, hydrogen, hydrogen sulphide, carbon monoxide, air, carbon dioxide, or a combination thereof; more especially a reducing gas such as hydrogen, carbon monoxide, or hydrogen sulphide. The gas may be a buoyant gas.

A plurality of treatment agents may enter the treatment chamber 10, such as an inert gas and an oxidant or reductant.

The step of treating the slurry with the at least one treatment agent may include contacting the slurry with the at least one treatment agent in the treatment chamber 10. For example, if the treatment agent is a solid, the solid may be added directly to the treatment chamber 10, such as by dropping the solid into the treatment chamber 10 at the top 14 of the treatment chamber 10.

In another example, the at least one treatment agent (which may be a solid, liquid or gas) may be mixed with the slurry before the slurry enters the treatment chamber 10. If the at least one treatment agent is a solid, the solid treatment agent may be dissolved or suspended in the slurry. If the at least one treatment agent is a gas, the gas treatment agent may be added to, or dissolved within, the slurry (for example this may be achieved under pressure). The added gas may form microbubbles in the treatment chamber 10 (for example in suspension as the pressure is progressively reduced), and these microbubbles may rise through the treatment chamber 10. As the microbubbles contact the electrodes 40, turbulent mixing conditions may be provided, along with a reducing or oxidative environment as required. The microbubbles may entrain materials forming at the electrodes 40 so as to keep the electrodes 40 clear of reaction products or may for example provide gases for reductive or oxidative processes at the face or reactive surface of the electrodes 40. In one embodiment, the apparatus 1 includes a mixer in fluid communication with the at least one slurry inlet 20, wherein the mixer is for mixing at least one treatment agent (which may be a liquid, gas or solid) with the slurry, before the slurry passes through the at least one slurry inlet 20.

The at least one treatment agent may enter the treatment chamber 10 through at least one treatment inlet for entry to the treatment chamber 10 of the at least one treatment agent. The treatment chamber 10 may include at least one treatment inlet (or a plurality of treatment inlets in fluid communication with each other) for each or each mixture of treatment agents. Advantageously, the at least one treatment inlet may allow for further control over the rate of addition or concentration of the at least one treatment agent within the treatment chamber 10 (and if the at least one treatment agent is an oxidant or reductant, for example, the at least one treatment inlet may allow control over the rate at which electrochemical oxidation or reduction reactions may occur). The at least one treatment agent may, for example, be mixed with a liquid (such as a portion of the slurry) before it passes through the at least one treatment inlet. The at least one treatment agent may be mixed with the slurry as discussed in the previous paragraph before it passes through the at least one treatment inlet.

In one embodiment, the at least one treatment inlet is a plurality of treatment inlets for dispersing the treatment agent into the treatment chamber 10, especially for evenly dispersing the treatment agent throughout the treatment chamber 10. The treatment chamber 10 may include at least 10 treatment inlets, especially at least 15 inlets, more especially at least 20 inlets, and most especially at least 30 inlets.

Advantageously, by using a plurality of inlets for entry of a treatment agent, the treatment agent may evenly enter the treatment chamber 10. This may permit a consistent concentration and/or distribution of the treatment agent in the liquid (slurry) below the electrodes 40, which in turn may allow for improved reaction of the slurry. When the treatment agent is a gas, a plurality of inlets for a gas treatment agent may improve even fluid (slurry) flow throughout the treatment chamber 10 and may maximise efficient contact between the electrodes 40 positioned within the treatment chamber 10 and the slurry. A plurality of inlets for a gas treatment agent may also improve the distribution of the gas within the slurry, which in turn may improve the effect of the gas in chemical/electrochemical reactions within the treatment chamber 10 (for example, when the gas is an oxidant or reductant, the performance of the apparatus 1 in treatment, separation or recovery of contaminants may be improved).

The at least one treatment inlet may be at least one fluid treatment inlet (the fluid may include gases and liquids, and for example, the liquids may include suspended solids). The at least one fluid treatment inlet may be in the form of a liquid (slurry) treatment disperser. The liquid (slurry) treatment disperser may be as described above for the liquid (slurry) disperser.

The at least one treatment inlet may be an inlet for a gas treatment agent (i.e. a gas inlet 60). The treatment chamber 10 may include a gas disperser 62, especially in the form of a gas manifold, the gas disperser 62 having a plurality of gas inlets 60 to the treatment chamber 10.

Figure 6:
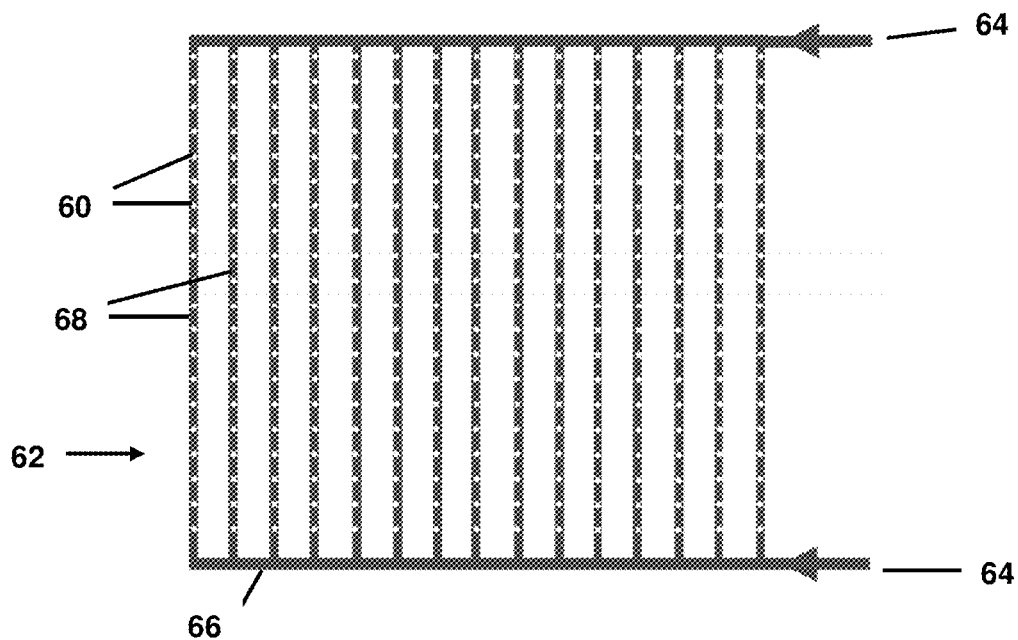
FIG. 6 is a top view of a gas disperser for use in the first example apparatus.

An exemplary gas disperser 62 is illustrated in FIG. 6, in the form of a gas manifold. In this disperser there are two gas entry points 64 in gaseous communication with two longitudinal gas passageways 66. Between the two longitudinal gas passageways 66 extend a plurality of transverse gas passageways 68. At least one or each of the transverse gas passageways include a plurality of gas inlets 60. In an alternative exemplary embodiment, the gas disperser 62 may include one gas entry point 64 in gaseous communication with one transverse gas passageway 68. A plurality of longitudinal gas passageways 66 may then be in gaseous communication with, and extend from the transverse gas passageway 68. Each longitudinal gas passageway 66 may include a plurality of gas inlets 60. There may be one, two, three, four, five, six, seven, eight, nine, ten or more than ten longitudinal gas passageways 66 and/or transverse gas passageways 68.

The at least one treatment inlet may be positioned at any suitable point or points in the treatment chamber 10. In one embodiment, the at least one treatment inlet is positioned beneath the electrodes 40 (especially so that the treatment agent substantially rises as it travels through the treatment chamber 10).

In further embodiments, the apparatus 1 may include a slurry pump for pumping slurry through the at least one slurry inlet 20, and/or at least one treatment agent pump (which may be a liquid pump and/or a gas pump) for pumping the treatment agent through the at least one treatment inlet.

The at least one outlet 30 may be positioned above the electrodes 40 (especially at the top 14 of the treatment chamber 10), especially so that the liquid (slurry) substantially rises as it travels through the treatment chamber 10. In one embodiment, the electrochemically treated slurry may exit the treatment chamber 10 through one outlet 30. The outlet 30 may be in the form of an aperture or passageway extending from the side of a wall of the treatment chamber 10 and may be positioned at, above or below the level of liquid in the treatment chamber 10. The outlet may be positioned below the level of liquid in the treatment chamber 10 (as illustrated at 34 in FIGS. 1, 3 to 5, 7, and 11, for example). Alternatively, the outlet 30 may be a weir or spillway above the electrodes (as illustrated at 32 in FIGS. 1, 3 to 5 and 7).

The treatment chamber 10 may include one, two, three, four or five outlets below the level of liquid in the treatment chamber 34. One or more valves may be associated with the outlets 34 so that each outlet 34 may be selectively closed or partially closed. This would allow for adjustment of the liquid flow rate through the treatment chamber 10.

The treatment chamber 10 may also include one, two, three or four weirs or spillways 32. The treatment chamber 10 may include a weir or spillway 32 on each side of the treatment chamber 10. Each said weir or spillway 32 may include an adjustable baffle, which may be in the form of a plate. The adjustable baffle may form the lower lip of a weir or spillway, and the baffle may be raised or lowered to adjust the liquid flow rate through the treatment chamber (or prevent liquid from exiting the treatment chamber 10 via the weir or spillway 32).

In the Figures, the at least one slurry inlet 20 is provided in a disperser 22 positioned beneath the electrodes 40. This arrangement results in the slurry rising past the plurality of electrodes 40 within the treatment chamber 10 when the apparatus 1 is in operation. Furthermore, the electrodes 40 are positioned beneath the liquid level within the treatment chamber 10. This means that once the slurry passes above the electrodes, the slurry may move horizontally in the direction of the at least one outlet 30. By virtue of the design of the apparatus 1 illustrated in the Figures, substantially all solids in the slurry may exit the treatment chamber 10 through the at least one outlet 30 (assuming that a separator for separating the at least one iron mineral that has been electrochemically treated from the liquid and gangue is not present within the treatment chamber 10). This is in marked difference to many existing electrochemical liquid treatment apparatuses, in which solids may settle on the bottom of the apparatus, for subsequent removal via a drain.

Therefore, in another embodiment, the at least one outlet 30 is positioned in the upper portion of the treatment chamber 10, and the at least one inlet 20 is positioned in the lower portion of the treatment chamber 10. In one embodiment, the at least one outlet 30 is positioned at a different height to the at least one inlet 20 in the treatment chamber 10 (this arrangement may avoid overly turbulent flow of the slurry through the apparatus).

Figure 7:
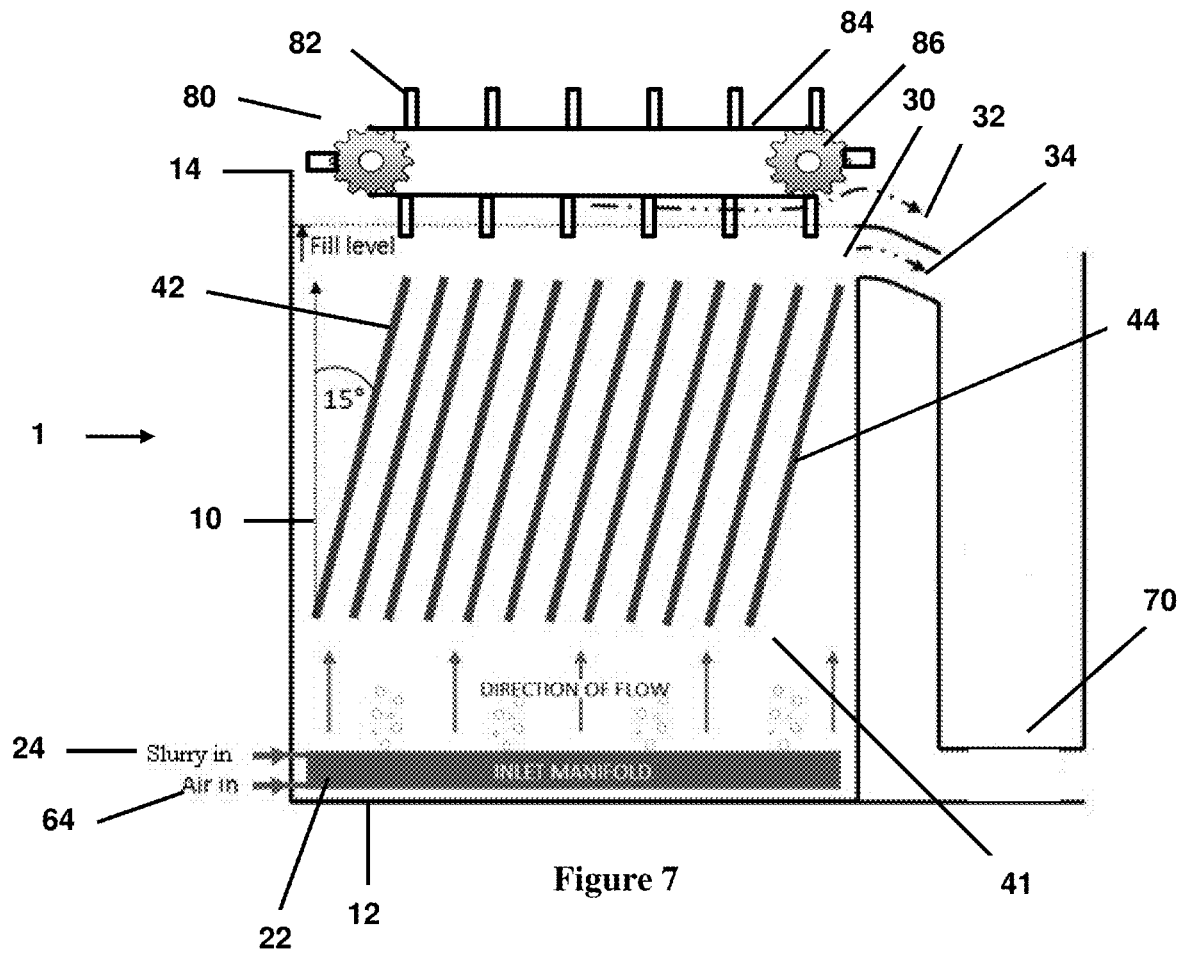
FIG. 7 is a side view of a third example electrochemical treatment apparatus.

The apparatus 1 may also include a slurry mover 80 (especially in the form of a slurry skimmer as illustrated in FIG. 7) for moving slurry at the surface of the liquid (slurry) in the treatment chamber 10. The slurry mover 80 may be configured to move slurry towards the at least one outlet 30, and may assist in providing a horizontal flow for the slurry at the top 14 of the treatment chamber 10, especially on the surface of the liquid in the treatment chamber 10. The slurry mover 80 may be positioned substantially above or below the surface of the liquid (slurry) in the treatment chamber 10, especially substantially above the surface of the liquid. An exemplary slurry mover 80 is illustrated in FIG. 7. This slurry mover 80 includes a plurality of slurry drivers 82 mounted to a belt, strap, chain or cable 84, which is turned by wheels 86. As the wheels 86 turn, slurry rising to the surface of the liquid is skimmed and moved towards and through the at least one outlet 30.

The outlet 32 may be especially at the top 14 of the treatment chamber 10, and may be especially positioned substantially at the intended height of the liquid within the treatment chamber 10.

The plurality of electrodes 40 may be selected from the group consisting of an anode 44, a cathode 42 and an electrical conductor 46; the plurality of electrodes 40 may include at least one anode 44, at least one cathode 42 and at least one electrical conductor 46. The at least one electrical conductor 46 may be positioned intermediate said at least one cathode 42 and said at least one anode 44.

In use, the apparatus 1 includes at least one anode 44 and at least one cathode 42. However, the electrodes 40 may all be of similar structure and only become an anode 44, a cathode 42 or an electrical conductor 46 by virtue of the power connected to the electrode 40 (or lack thereof in the case of an electrical conductor 46; the electrical conductor 46 is not intended to accept power from a power source external to the treatment chamber 10. However, due to the electrical current resulting from the application of power to the anode 44 and cathode 42 and the movement of ions in the liquid, when the apparatus 1 is in use the at least one electrical conductor 46 will carry charge). The at least one electrical conductor 46 is especially positioned between (or intermediate) at least one anode 44 and at least one cathode 42.

In one embodiment, from 2 to 12 electrodes 40 in the apparatus 1 are connected to a power source; especially from 2 to 10 or from 2 to 8 electrodes 40 in the apparatus 1 are connected to a power source; more especially from 2 to 6 or from 2 to 4 electrodes 40 in the apparatus 1 are connected to a power source; most especially three electrodes 40 in the apparatus 1 are connected to a power source. If three electrodes 40 in the apparatus 1 are connected to a power source, the two terminal electrodes (i.e. at each end of the plurality of electrodes 40) will have the same polarity (i.e. either an anode 44 or a cathode 42) and an electrode 40 intermediate the terminal electrodes 40 (especially substantially equidistant between the terminal electrodes 40) will have the opposite polarity (i.e. either an anode 44 or a cathode 42). The remaining electrodes 40 in the plurality of electrodes 40 will be electrical conductors 46. The apparatus 1 may include from 10 to 1000 electrodes 40; especially from 20 to 500 electrodes 40; more especially from 30 to 250 electrodes 40; most especially from 40 to 100 electrodes 40.

The electrodes 40 may be replaceable and/or removable. For example, the electrodes 40 may be removable from the treatment chamber 10 by means of an overhead gantry. The electrodes 40 may be removed for temporary storage as a set (for example in horizontal racks above the unit), or can be replaced individually such as when an electrode 40 loses its anodic potential through corrosion.

Each electrode 40 may be of any suitable shape, although certain shapes facilitate easy removal from the treatment chamber 10. For example, each electrode 40 may be curved or planar, especially planar (as in the embodiment exemplified in FIGS. 1, 3-5 and 7). Each electrode 40 may also be, for example, of square, rectangular, trapezoidal, rhomboid, or polygonal shape; especially of rectangular or square shape. Each electrode 40 may also be of solid construction, or may include a plurality of apertures. Each electrode 40 may be especially of solid construction. In one embodiment, each electrode 40 is a plate.

In another embodiment, the at least one anode 44 and at least one cathode 42 may be as described in the preceding paragraph. However, the at least one electrical conductor 46 may be a plurality of electrical conductors which may be moveable (especially freely moveable) within the treatment chamber 10 (not illustrated in the Figures). The plurality of electrical conductors may circulate within the treatment chamber 10 during the electrochemical treatment. The freely moveable electrical conductors may be of any suitable shape, but especially may be substantially cylindrical and/or spherical. The surface area of such substantially cylindrical and/or spherical electrical conductors may be considerable, and this may result in improved efficiency of the process.

Each electrode 40 may be made of any suitable material. Exemplary materials include aluminium, iron, steel, stainless steel, steel alloy (including mild carbon steel), magnesium, titanium and carbon. In another embodiment, each electrode may be made of an alloy of or include a material selected from the group consisting of: aluminium, iron, steel, magnesium, titanium and carbon. Each said electrode 40 may especially be made of iron, carbon, steel, aluminium or an alloy thereof; especially of iron, cast iron, high carbon or mild or rolled steel. The use of an electrode 40 including iron may advantageously introduce iron ions into the treatment chamber during the electrochemical treatment, and these iron ions may be involved in the production of magnetite, maghemite or proto-magnetite. Each said electrode 40 within the apparatus 1 may be the same or different, and may include the same metal or different metals (for example depending on the desired performance).

The electrodes 40 may be positionable above or below the level of the liquid in the treatment chamber 10. However, the electrodes 40 are especially positionable below the level of the liquid in the treatment chamber 10 so as not to impede any horizontal flow at the surface of the liquid (slurry) in the treatment chamber 10.

Figure 11:
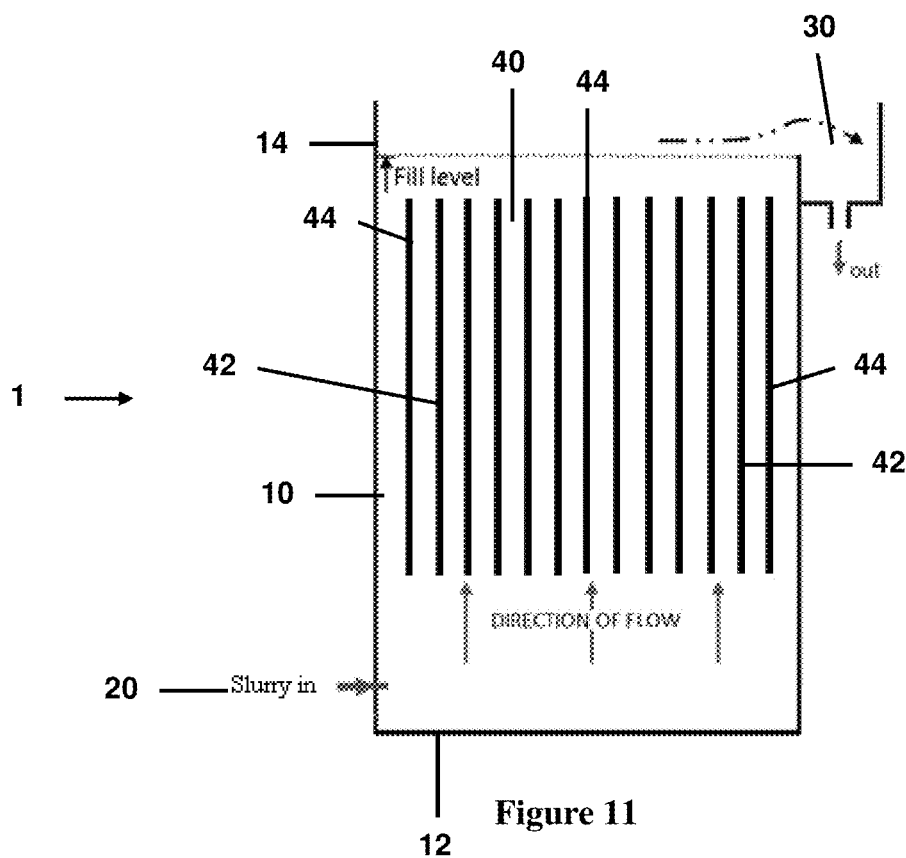
FIG. 11 is a side view of a fourth example electrochemical treatment apparatus.

The electrodes 40 (or the at least one anode 44 and at least one cathode 42) may be positionable within the reaction chamber at any suitable angle. For example, the electrodes 40 (or the at least one anode 44 and at least one cathode 42) or a portion of the electrodes 40 (such as an upper portion) may be angled from a vertical plane (obliquely configured). In the examples illustrated in FIGS. 1, 3, 4 and 7 the electrodes 40 are positioned at an angle of about 15 degrees to the vertical. In other examples, the electrodes 40 (or the at least one anode 44 and at least one cathode 42) or a portion of the electrodes 40 (such as an upper portion) may be positioned at an angle of from 5 to 40 degrees from the vertical, especially from 5 to 35 degrees from the vertical, more especially from 10 to 30, 10 to 15 or 15 to 30 degrees from the vertical. In other examples, the electrodes 40 (or the at least one anode 44 and at least one cathode 42) or a portion of the electrodes 40 (such as an upper portion) may be positioned at less than 40 degrees from the vertical, more especially less than 35, 30, 25, 20, 15, 10 or 5 degrees from the vertical. In further examples, the electrodes 40 (or the at least one anode 44 and at least one cathode 42) or a portion of the electrodes 40 (such as an upper portion) may be positioned at greater than 5, 10, 15, 20, 25, 30 and 35 degrees from the vertical. In other embodiments, the electrodes 40 (or the at least one anode 44 and at least one cathode 42) may be substantially vertical (or in a vertical plane) (as illustrated in FIG. 11). The inventors have found that different liquids react differently to different electrode angles 40.

Each electrode 40 (or the at least one anode 44 and at least one cathode 42) may also be of any suitable thickness, for example from 1 mm to 20 mm thick, especially from 1 mm to 10 mm thick, more especially from 1 mm to 5 mm thick, most especially about 3 mm thick.

The electrodes 40 may be spaced at any suitable distance. For example, the electrodes 40 may be from 1 mm to 150 mm apart, especially from 1 mm to 100 mm apart or from 1 mm to 50 mm apart, more especially from 1 mm to 10 mm apart. The electrodes 40 may be from 1 mm to 5 mm apart or from 3 to 6 mm apart, more especially about 3 mm apart. The electrodes 40 may be held apart in any suitable way. For example, the treatment chamber 10 may include guides for holding the electrodes 40 in position. In one embodiment, the guides may be grooves or slots positioned in opposite walls of the treatment chamber 10. The guides may be made from a high-density, electrically insulating polymeric material, such as HDPE or PVC, or a material as discussed below for the electrode holder 100.

To improve fluid flow, the electrodes 40 may have a tapered lower edge 41. The lower edge 41 of the electrodes 40 may be tapered to an angle of about 4, 5, 6, 7, 8, 9, 10, 11, 12, 13, 14, 15, 16, 17, 18, 19 or 20 degrees relative to the longitudinal axis of the electrode. The taper may extend less than 40%, 30%, 20%, 15%, 10%, 9%, 8%, 7%, 6%, 5%, 4% or 3% of the length of the electrode 40.

Any suitable electrical current may be applied to the plurality of electrodes 40. However, the current applied to the plurality of electrodes 40 may especially be a direct current of adjustable frequency of alternation. This means that the electrodes 40 functioning as the at least one cathode 42 and the at least one anode 44 may switch during the electrochemical treatment. This enables the electrodes 40 to create a reversible electrical field within the treatment chamber 10, which may assist the electrodes 40 in remaining clear of debris or reaction products that might otherwise inhibit the electrochemical treatment by electrode-passivation. The polarity switching of the electrodes 40 may allow specific chemical reactions to be delayed or accelerated as required. Therefore, in one embodiment the polarity of the electrodes 40 is reversed during the electrochemical treatment.

In a further embodiment, the voltage and amperage of the electrical field within the treatment chamber 10 may be adjusted as necessary by placing selected electrodes 40 in electrical contact with a voltage source. The voltage source may be a separate, proprietary manufactured transformer.

In one embodiment, the voltage applied to the electrodes 40 is from 1 V to 150 V, especially from 5 V to 120 V or from 10 V to 80V, more especially from 15 V to 55 V or from 15 V to 40 V, most especially from 20 V to 35 V or from 20 V to 28 V.

In another embodiment, the current applied to the electrodes 40 is from 0.25 A to 40 A or from 0.5 A to 30 A, especially from 0.5 A to 20 A or from 1 A to 10 A, more especially from 1.5 A to 7.5 A or from 2 A to 5 A.

The apparatus 1 may also include at least one non-conductive element positioned within the treatment chamber 10. This non-conductive element may be used to alter the electrical field (amperage and voltage) within the treatment chamber 10. The position, shape and configuration of the non-conductive element may be as described above for the electrodes 40. However, the non-conductive element is made of a material that does not conduct electricity.

The apparatus 1 may further include a flow aligner 90 for aligning the flow of the slurry between the electrodes 40, the flow aligner being positioned or positionable within the treatment chamber 10. A flow aligner 90 may be advantageous as the slurry beneath the electrodes 40 in the treatment chamber may especially be turbulent. The flow aligner 90 may assist the slurry in moving substantially along the same longitudinal axis as the plurality of electrodes 40, which in turn may improve the reaction between the slurry and the electrodes 40.

The flow aligner 90 may be in the form of at least one (especially a plurality of) baffles or baffle walls 92 extending beneath the electrodes 40. The at least one baffle or baffle wall 92 may extend substantially vertically beneath the electrodes 40. The at least one baffle or baffle wall 92 may extend along substantially the same longitudinal axis as the electrodes 40. The at least one baffle or baffle wall 92 may be positioned transversely or substantially perpendicularly to the electrodes 40. The flow aligner 90 may integrally formed with the treatment chamber 10, or may be removable and/or replaceable. Each baffle or baffle wall 92 may be in the form of a plate. Each baffle or baffle wall 92 may be from 20 mm to 500 mm long, especially from 50 mm to 250 mm long or from 60 mm to 150 mm long, more especially from 80 mm to 120 mm long, most especially about 100 mm long.

The flow aligner 90 may be made of any suitable material, but especially may be made of a non-conductive material. The flow aligner 90 may be made of the materials discussed above for the treatment chamber 10. The flow aligner 90 may be especially made from a composite material made with a non-conducting fibre or panel (such as fibreglass) mixed with a resin or resin solution (such as a polyester, vinyl ester, epoxy, phenolic, polyimide, polyamide, polypropylene or polyether ether ketone (PEEK)) to produce a polymer matrix; a polymer plastic such as high density polyethylene (HDPE), polyethylene (PE), polyethylene terephthalate (PET), polyvinyl chloride (PVC); a phenolic polymer plastic; or be fabricated from a number of composite materials including carbon fibre (for example a carbon fibre insulated using a polymer plastic or a composite material) and variations thereof.

The treatment chamber 10 may be configured to releasably engage with at least one electrode holder 100 holding a plurality of electrodes 40 for electrochemical treatment of the slurry. The treatment chamber 10 may include at least one guide for guiding the electrode holder 100 into position. The treatment chamber 10 may include at least one (or a plurality of) grooves for slidable engagement of the electrode holder 100 in the treatment chamber. The treatment chamber 10 may include at least one power connector for connecting power to the electrode holder, to thereby power at least one of the electrodes 40 held by the electrode holder. The treatment chamber 10 may include a plurality of power connectors (for example of different polarity) for connecting power to each electrode holder. For example, if the apparatus 1 includes one electrode holder 100, then the treatment chamber 10 may include at least one power connector for connecting power to at least one anode 44 (especially one or two power connectors) and at least one power connector for connecting power to at least one cathode 46 (especially one or two power connectors). The at least one power connector may be located on a wall of the treatment chamber, especially in a groove in which the electrode holder 100 may be slideably engaged. In one embodiment, only one wall of the treatment chamber 10 includes a power connector for each electrode holder 100.

The treatment chamber may be configured to releasably engage with from 1 to 100 electrode holders 100, especially from 2 to 50 electrode holders 100, more especially from 2 to 40, from 2 to 30, from 2 to 20, or from 2 to 10 electrode holders 100.

Figure 8:
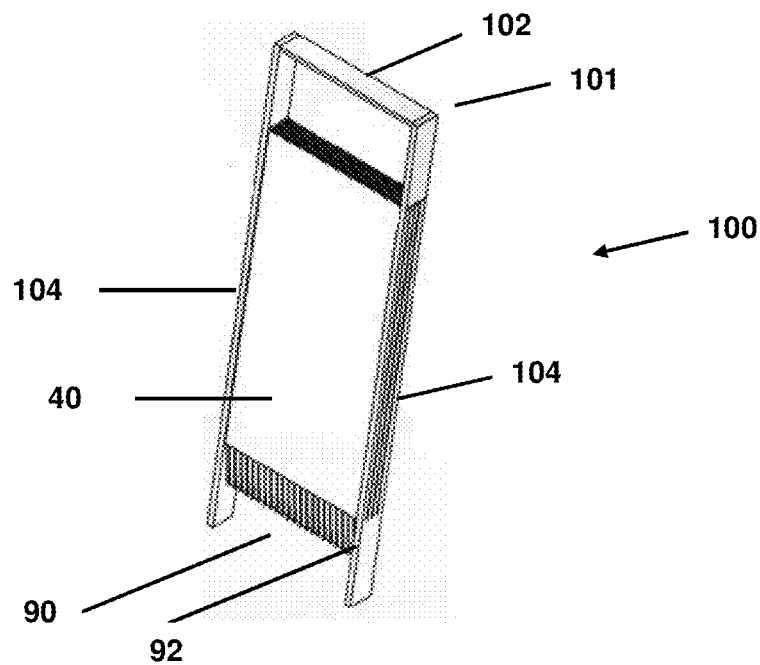
FIG. 8 is a perspective view of an example electrode holder.
Figure 9:
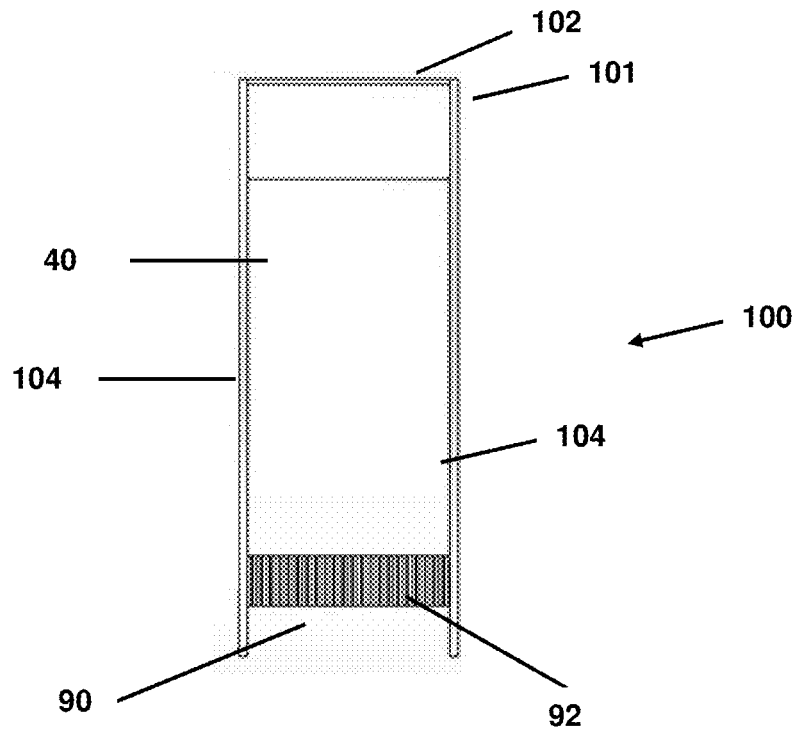
FIG. 9 is a front view of the example electrode holder of FIG. 8.
Figure 10:
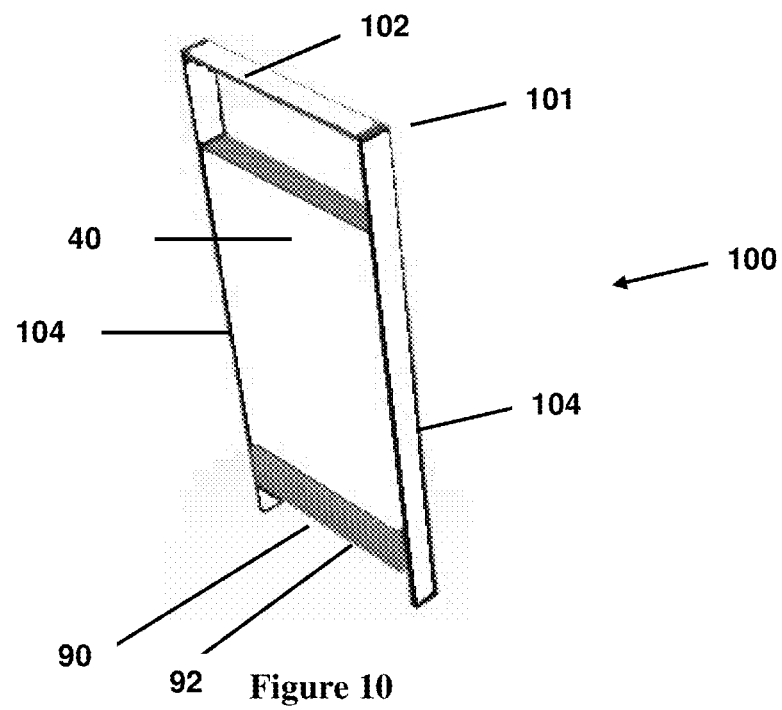
FIG. 10 is a perspective view of the example electrode holder of FIG. 8.

The apparatus 1 may further include an electrode holder 100 (an exemplary electrode holder 100 is illustrated in FIGS. 8 to 10). The electrode holder 100 may include a frame 101, and the frame 101 may include a handle 102 and at least two side walls 104. The frame 101 may be substantially U-shaped, with the base of the "U" forming the handle 102 and the sides of the "U" forming the side walls 104. The electrode holder 100 may be in the form of a cartridge.

The electrode holder 100, especially the at least two side walls 104 of the electrode holder 104 may be configured to releasably engage with the treatment chamber 10. The electrode holder 100 (especially the at least two side walls 104) may be slidably engageable with the treatment chamber 10. The electrode holder 100 (especially the at least two side walls 104) may be releasably engageable in the treatment chamber 10 by friction, by a clamp, or by another suitable fastener. In one example, the treatment chamber 10 or the electrode holder 100 may include a clamp for releasably clamping the electrode holder 100 in position. The electrode holder 100 (especially at least one of the at least two side walls 104) may be configured to accept power, especially from the wall of the treatment chamber 10, more especially by way of a power connector located in the electrode holder 100 (especially a side wall 104 of the electrode holder 100). The electrode holder 100 (especially at least one of the at least two side walls 104) may be configured to supply power along a longitudinal edge of at least one electrode 40 held by the electrode holder. Providing power along a longitudinal edge of at least one electrode 40 may provide superior flow of power than if power was only supplied to the at least one electrode 40 at a single point.

Power connectors in the electrode holder 100 and the treatment chamber 10 may connect in any suitable way. For example, the two power connectors may connect by way of abutting surfaces or projections, or by way of a male-female connection or similar.

The electrode holder 100 may hold a plurality of electrodes 40. The electrodes 40 within the electrode holder 100 may be replaceable and/or removable. In one embodiment, the electrodes 40 within the electrode holder 100 may not be replaceable and/or removable. The electrode holder 100 may include slots machined to enable the electrodes 40 to slide in and out of the electrode holder 100 as required. This may enable replacement of the electrodes 40 within the electrode holder 100 whilst the machine continues to operate with a prior electrode holder 100. The electrodes 40 may be as described above. Furthermore, the spacings between the electrodes in the electrode holder 100 may be as described above for the spacings for the electrodes 40 in the treatment chamber 10.

The electrode holder 100 may include a flow aligner 90, as described above. The flow aligner 90 may be positioned opposite to the handle 102, beneath the electrodes 40.

Any suitable number of electrodes 40 may be held by the electrode holder 100. In one embodiment, the electrode holder may hold from 3 to 100 electrodes 40; especially from 3 to 50 electrodes 40; more especially from 3 to 25 electrodes 40; most especially from 5 to 15 electrodes 40 or about 10 electrodes 40. In one embodiment, the electrode holder 100 holds at least 3, 4, 5, 6, 7, 8, 9 or 10 electrodes 40. In another embodiment, the electrode holder 100 holds less than 100, 90, 80, 70, 80, 70, 60, 50, 40, 30, 20 or 15 electrodes 40.

The electrode holder 100 or the electrodes 40 within the electrode holder 100 may be positionable within the treatment chamber 10 at any suitable angle. In one embodiment, the electrode holder 100 is positionable substantially vertically within the treatment chamber 10. In this embodiment, the electrodes 40 may be held substantially vertically by the electrode holder 100, or the electrodes 40 may be held at an angle from the vertical by the electrode holder 100. In another embodiment, the electrode holder is positionable at an angle within the treatment chamber 10. In this embodiment, the electrodes 40 may be held substantially vertically by the electrode holder 100 (i.e. the longitudinal axis of the electrodes 40 held by the electrode holder 100 may be substantially the same as the longitudinal axis of the electrode holder 100). Alternatively in this embodiment, the electrodes 40 may be held at angle within the electrode holder 100. The angle of the electrode holder 100, or the angle of the electrodes 40 within the electrode holder 100 may be as described above for the angle of the electrodes 40 within the treatment chamber 10. For example, the electrodes 40 within the electrode holder 100 may be held at an angle of from 10 to 30 degrees from the vertical, especially at an angle of 10 to 15 degrees or about 15 degrees from the vertical. In another example, the electrode holder 100 may be held at an angle of from 10 to 30 degrees from the vertical, especially at an angle of 10 to 15 degrees or about 15 degrees from the vertical. The electrodes 40 within the electrode holder 100 may be from 1 mm to 10 mm apart or from 3 to 6 mm apart, especially about 3 mm apart. The electrodes 40 within the electrode holder 100 may be replaceable and/or removable.

The electrode holder 100 advantageously may allow for the easy and rapid exchange of electrodes 40 in the apparatus 1. The electrode holder 100 may overcome the delays inherent in changing individual electrodes 40 within the reaction chamber and may be particularly advantageous in areas of low head height.

The frame of the electrode holder 100 may be made of any suitable material, but especially may be made of a non-conductive material. The frame of the electrode holder 100 may be made of the materials discussed above for the treatment chamber 10.

The electrode holder 100 may be removable by way of a lifting device which lifts the electrode holder 100 substantially vertically before allowing for horizontal movement of the electrode holder 100 above the apparatus 1. The lifting device may be slideably mounted on at least one (especially two) rails. In one embodiment, the electrode holder 100 may be removable using an overhead gantry.

In a further embodiment, the apparatus 1 may include a controller for controlling the amperage and voltage applied to the at least one anode 44 and the at least one cathode 42.

Figure 3:
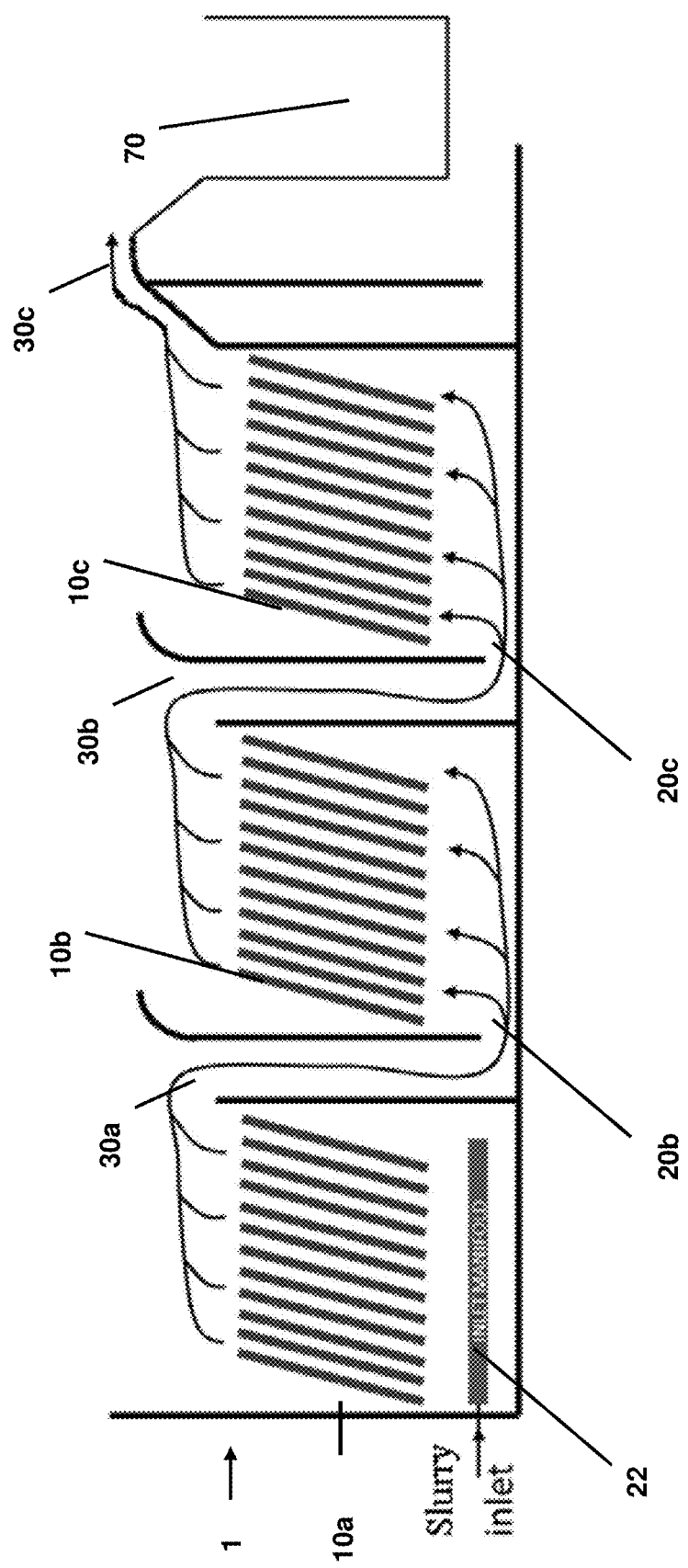
FIG. 3 is a side view of a second example electrochemical treatment apparatus.
Figure 4:
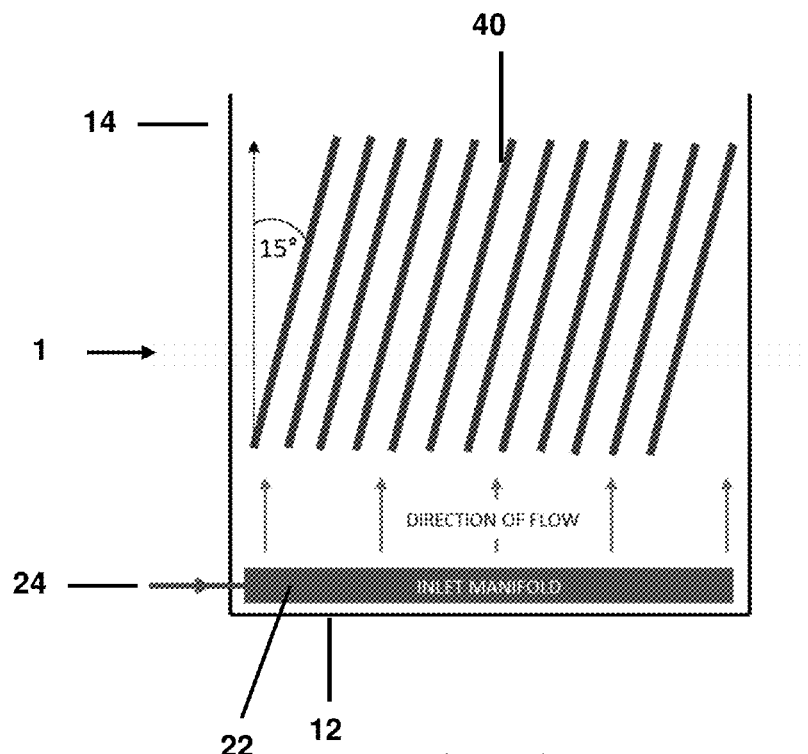
FIG. 4 is a side view of one treatment chamber in the second example apparatus.
Figure 5:
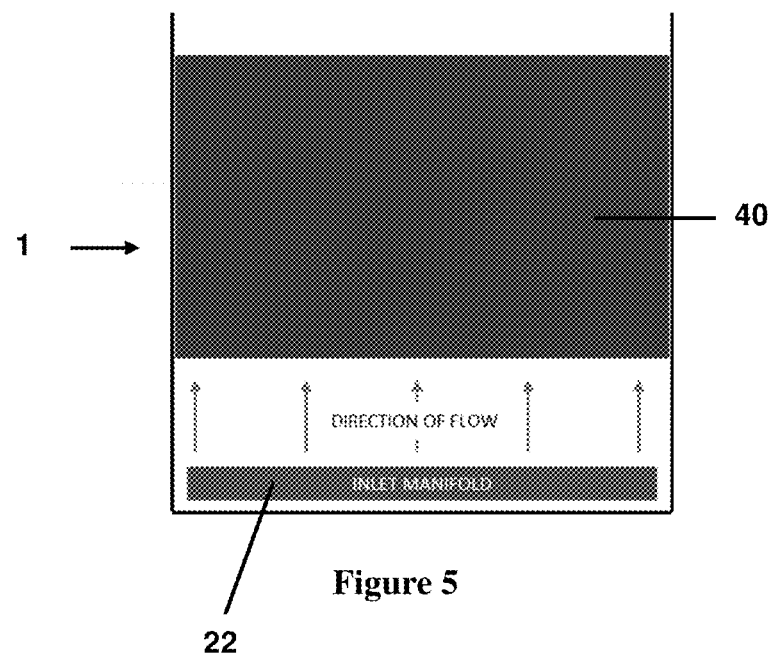
FIG. 5 is a front view of the second example apparatus.

In a further embodiment, the apparatus 1 may include a plurality of treatment chambers 10. This is illustrated in FIG. 3. The apparatus 1 of FIG. 3 is configured so that slurry from the outlet 30a of a first treatment chamber 10a flows into the inlet 20b of a second treatment chamber 10b. Following this, the slurry from the outlet 30b of the second treatment chamber 10b flows into the inlet 20c of a third treatment chamber 10. The electrochemically treated slurry then passes to separator 70.

The apparatus 1 may further include at least one separator 70 for separating the at least one iron mineral that has been electrochemically treated from the liquid and gangue. In a first exemplary embodiment, the at least one separator 70 may be positioned relative to the treatment chamber so that the at least one iron mineral is separated from the liquid during the electrochemical treatment (this embodiment is not shown in the Figures). For example, the at least one separator may include at least one magnet positioned around the walls of the treatment chamber 10 for separating magnetic iron minerals (such as magnetite and proto-magnetite) produced in the course of the electrochemical treatment. The at least one separator may be at least one magnet positioned on at least one side wall of the treatment chamber 10, especially on the upper portion of the at least one side wall of the treatment chamber 10.

Alternatively, the at least one separator may include at least one magnet positioned within the treatment chamber 10 for separating magnetic iron minerals (this embodiment is not shown in the Figures). The at least one magnet within the treatment chamber 10 may rotate, and in one example, the at least one magnet may be a rotating magnetic drum within the treatment chamber 10.

The magnetic field applied by the at least one separator in this exemplary embodiment may be transient or permanent.

In a second exemplary embodiment, the at least one separator 70 may be positioned in fluid communication with the outlet 30 of the treatment chamber 10 to separate the at least one iron mineral from the liquid after the electrochemical treatment (see FIGS. 1, 3 and 7). The separator 70 may separate the at least one iron mineral based on properties of the at least one iron mineral such as magnetic susceptibility, specific gravity or (net) density. Advantageously, due to changes in the properties of the at least one iron mineral as a result of the electrochemical treatment, the separation of the at least one iron mineral from the gangue typically becomes easier. The separator may also filter, drain or precipitate the solids from the liquid (such as by directing the electrochemically treated slurry to a drying stockpile where the liquid may drain away).

For example, the separator 70 may be one or more of the group consisting of: a hydrocyclone, a gravity separator (including a gravity spiral and a gravity table), and a magnetic separator. An exemplary magnetic separator is a Wet High Intensity Magnetic Separator (WHIMS). The magnetic field applied during magnetic separation in this exemplary embodiment may be transient or permanent.

The apparatus 1 of the present invention may form one component of a larger mineral processing system.

When the apparatus 1 is used, in one example the slurry enters the treatment chamber 10 through the at least one inlet 20 and a voltage is applied to the plurality of electrodes 40 (especially to provide at least one anode 44 and at least one cathode 42), to thereby electrochemically treat the slurry. As the slurry is electrochemically treated, iron minerals are altered (for example ferrihydrite or goethite is converted to a magnetic form such as maghemite, protomagnetite or magnetite), and the electrochemically treated slurry may exit the treatment chamber 10 at the outlet 30 for subsequent separation. A treatment agent may be introduced into the treatment chamber 10 during the electrochemical treatment.

The process may be performed at any suitable temperature and pressure. In one embodiment, the process may be performed at a temperature below 100° C. However, the process especially may be performed at atmospheric temperature and pressure.

Further examples of apparatuses for use in the present invention are illustrated with reference to FIGS. 12 to 32. FIGS. 12 to 16 describe a iron treatment system 200 and components thereof in the form of a trailer.

Figure 12:
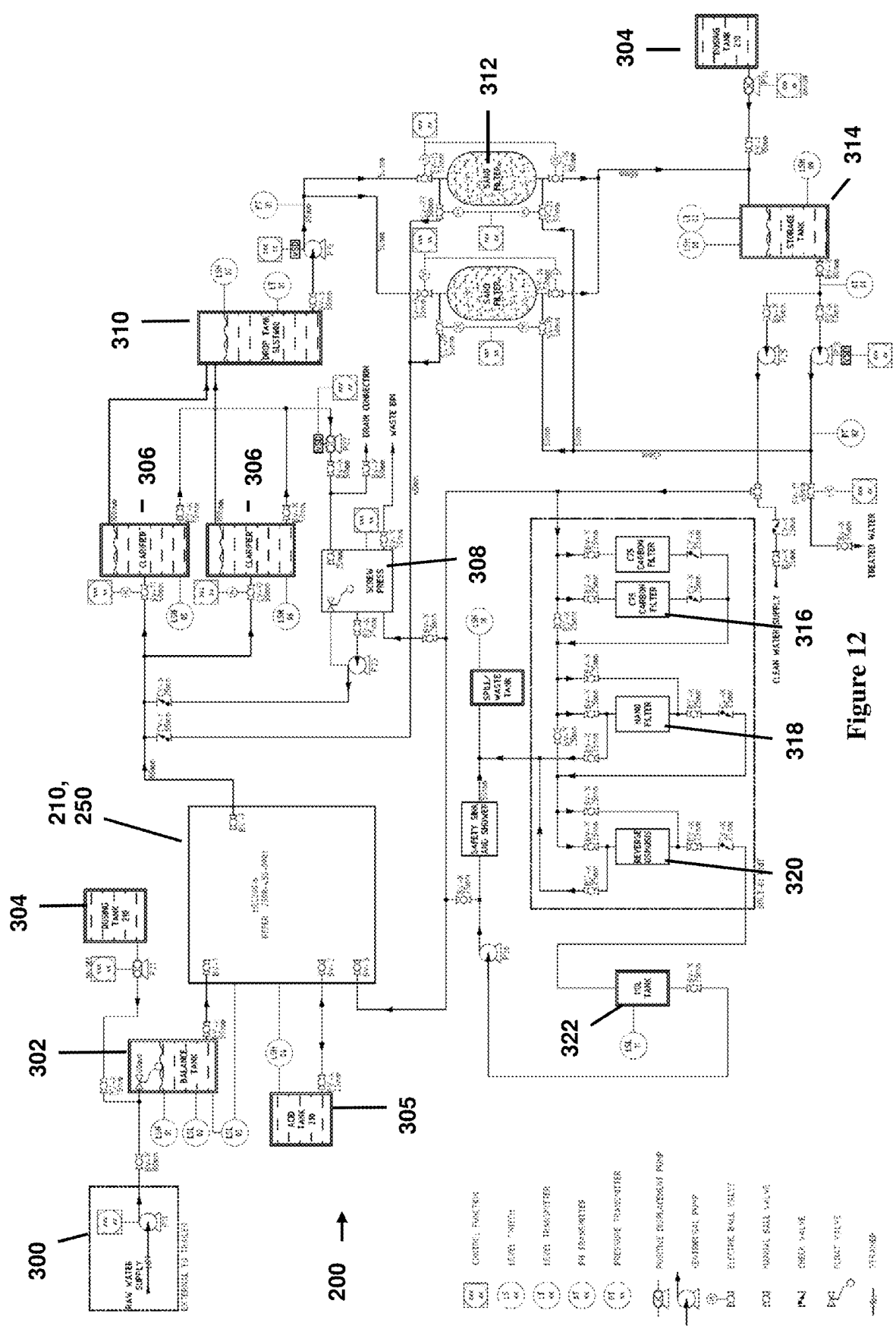
FIG. 12 is a process flow diagram of a liquid (slurry) treatment system including an electrochemical/electrolytic liquid treatment apparatus (HEC20016)
Figure 13:
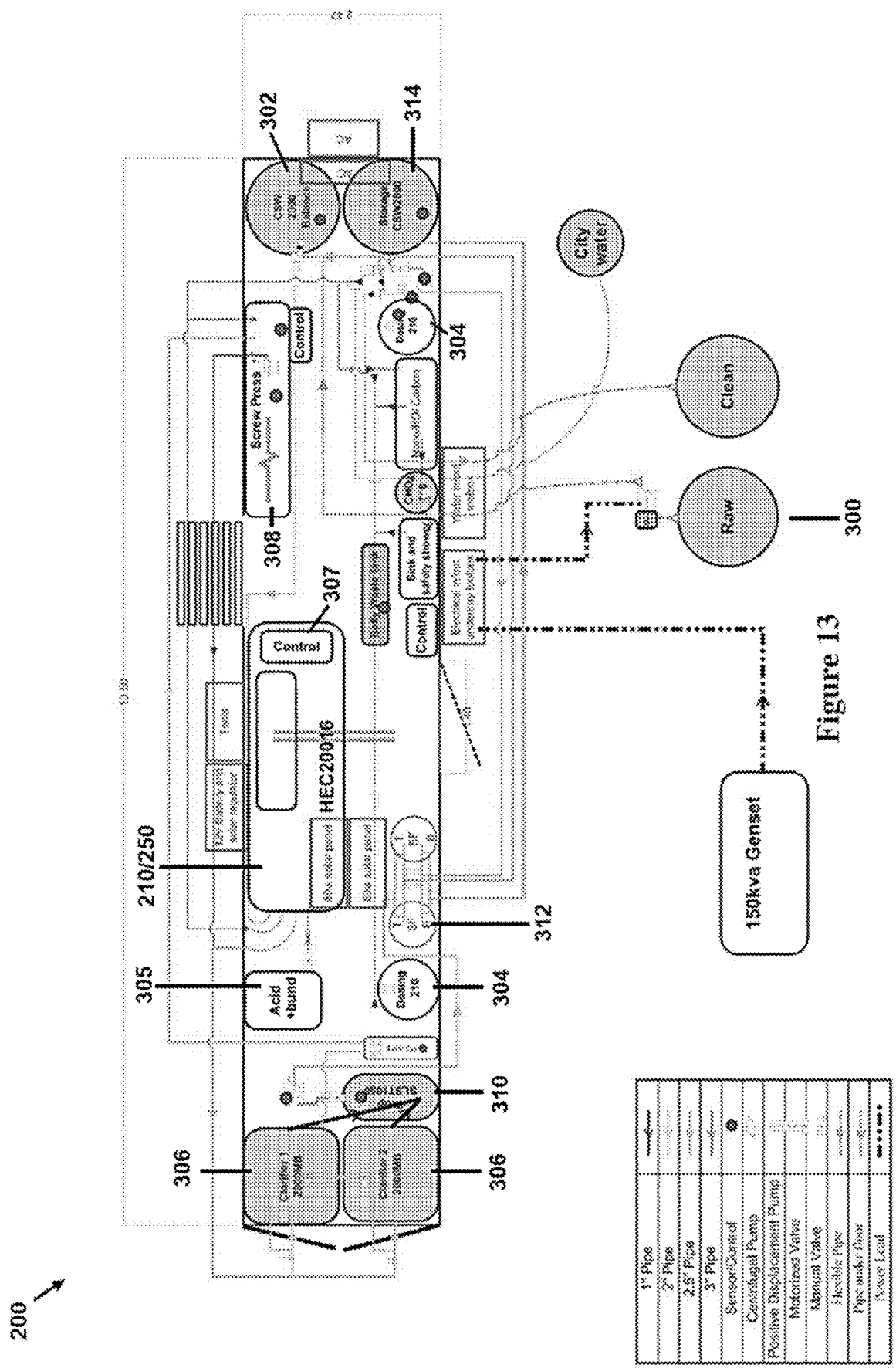
FIG. 13 is a top view of the layout of a trailer including the liquid (slurry) treatment system of FIG. 12.
Figure 17:
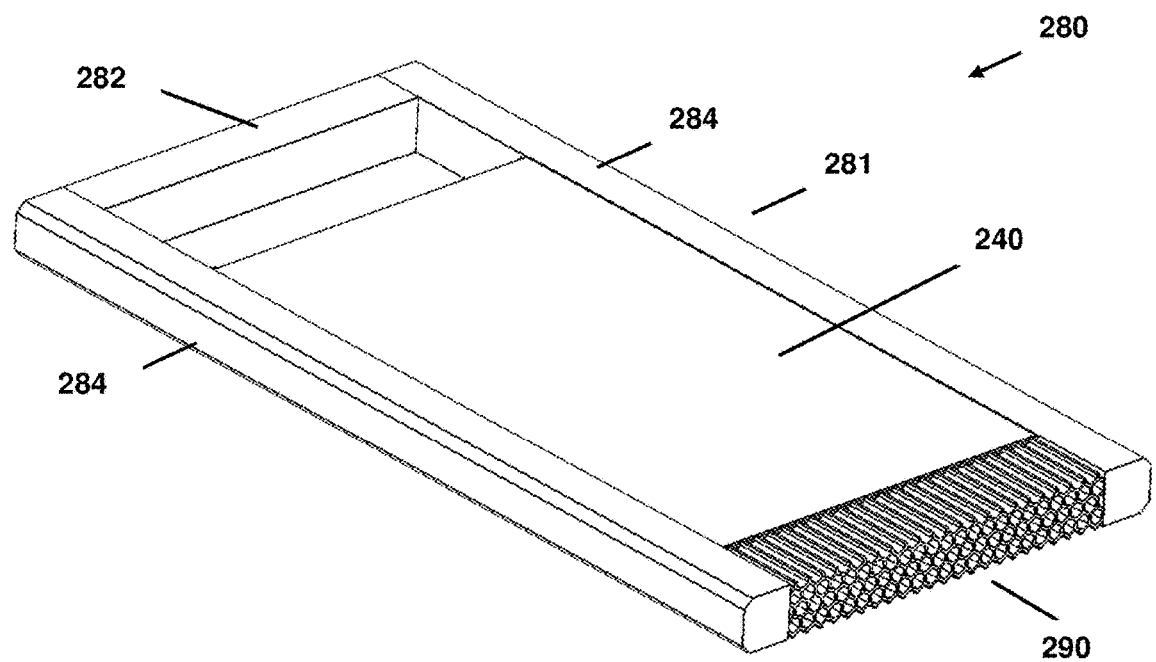
FIG. 17 is a perspective view of a second example electrode holder.
Figure 18:
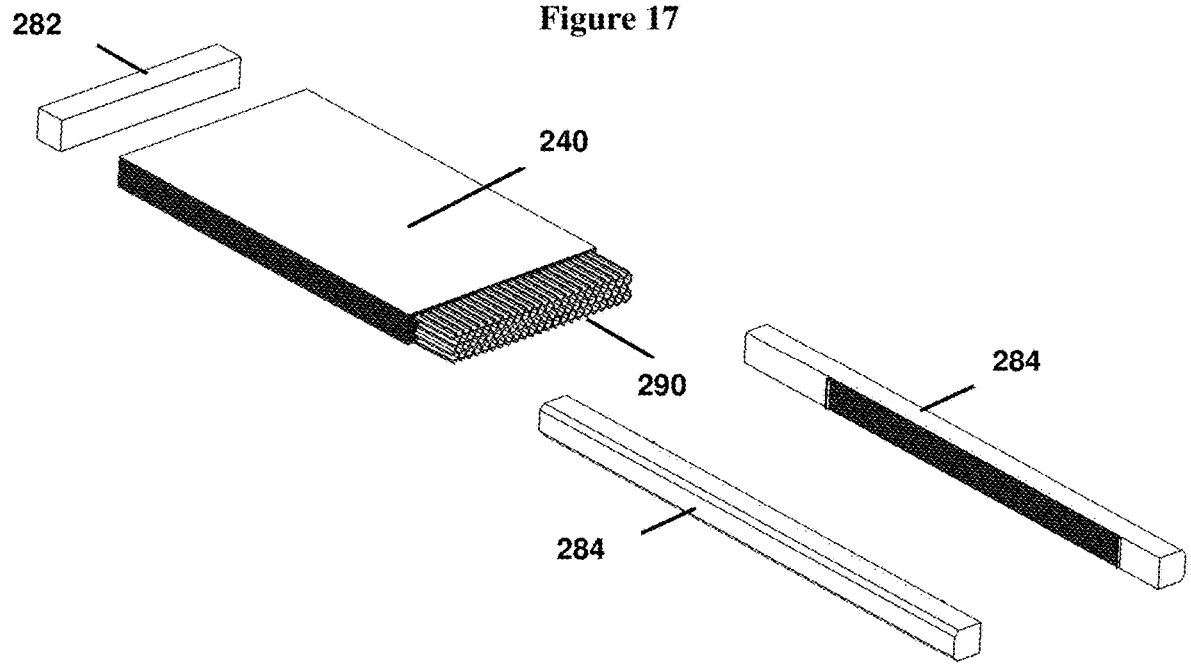
FIG. 18 is an exploded perspective view of the electrode holder of FIG. 17.

FIGS. 12 to 16 illustrate a iron treatment system 200 including an electrochemical liquid treatment apparatus 201. In FIGS. 12 and 13, the treatment chamber 210 and defoaming chamber 250 are provided within the component labelled HEC20016 (this component is illustrated, for example, in FIGS. 14-16 and 30-32).

As shown in FIG. 13, slurry 300 external to the trailer (for example overflow from a hydrocyclone) is supplied to a balance tank 302 using a centrifugal pump. At least one treatment agent (stored in a dosing tank 304) may be added to the water flowing to the balance tank 302 using a positive displacement pump. Manual ball valves are in the conduit between the slurry 300 and balance tank 302 (80 mm manual ball valve), and between the conduit between the dosing tank 304 and the balance tank 302 (15 mm manual ball valve). The balance tank includes an 80 mm float valve, as well as a level switch.

The slurry then flows through ball valves (the first of which is an 80 mm valve) to the treatment chamber 210 where electrochemical treatment occurs. The pH of the liquid during the electrochemical treatment may be controlled by the introduction of an acid such as acetic acid from acid tank 305. The electrochemically treated water then flows to the defoaming chamber 250. The electrochemical process may be controlled via a system for regulating the electrochemical treatment (which includes a controller (PLC) 307). Electrochemically treated slurry then flows to clarifiers 306 (which have a level switch) through a 65 mm conduit and 50 mm electric ball valves.

The slurry may flow past a separator during, or after the electrochemical treatment. In one embodiment, a separator may be positioned immediately after the treatment chamber 210 and/or the defoaming chamber 250. The separator may be positioned immediately before the clarifier 306, or immediately after the clarifier 306. Exemplary separators may include a wet drum magnetic separator (for example as sold by Sonal Magnetics), a high-intensity magnetic filter or a wet high intensity magnetic separator (for example as sold by Eriez Australia). The separator may also be positioned inside clarifier 306, for example using fixed magnets placed around the wall of the clarifier 306. The separator 306 collects the magnetic iron particles (especially iron oxide particles), especially magnetite and/or protomagnetite.

Clarified slurry solution (which may include floe) may exit the clarifiers 306 via 50 mm ball valves before passing through a positive displacement pump and then to successive 50 mm ball valves to a drain connection. Alternatively, the clarified slurry solution (which may include floe) from the clarifiers 306 may pass to a screw press 308 having a float valve. Pressed floc exits the screw press through a 25 mm ball valve to a waste bin. Liquid exiting the screw press 306 passes through a 25 mm ball valve to centrifugal pump, and then through a 25 mm check valve before passing back to clarifiers 306.

Clarified slurry solution may be passed from clarifiers 306 via a 100 mm conduit to a drop tank 310 (in which the tank has a level transmitter and a level switch). Fluid exiting drop tank 310 passes through a centrifugal pump and then to sand filters 312 (for separation of floe or unseparable iron particles from the water) or optionally back through clarifiers 306 by way of 50 mm ball vales and 65 mm check valve. After sand filtration the water may be passed to a storage tank 314 (where is it optionally treated by a treatment agent (stored in a dosing tank 304, in which the treatment agent may be pumped into the storage tank 314 by way of a positive displacement pump)), passing through 50 mm ball valves and a 65 mm conduit. From storage tank 314 the treated solution may pass through 80 mm ball valves and centrifugal pump before being released. Alternatively, solution from the storage tank 314 may pass through ball valves (80 mm and 25 mm), through centrifugal pump and then to: (i) further components of a filtration system, including a carbon filter 316, nanofilter 318, and reverse osmosis system 320; (ii) screw press 308; or (iii) treatment chamber 210 and defoaming chamber 250. The filtered solution may pass to a storage tank 322 before re-electrochemical treatment or disposal. In FIGS. 12 and 13, the electrochemical liquid treatment apparatus 201 includes balance tank 302, acid tank 305, dosing tank 304, treatment chamber 210, defoaming chamber 250, and clarifiers 306, and also possibly a separator. As illustrated in FIGS. 12 to 16, there are various pumps 324 and valves associated with the system 200 and apparatus 201.

Figure 30:
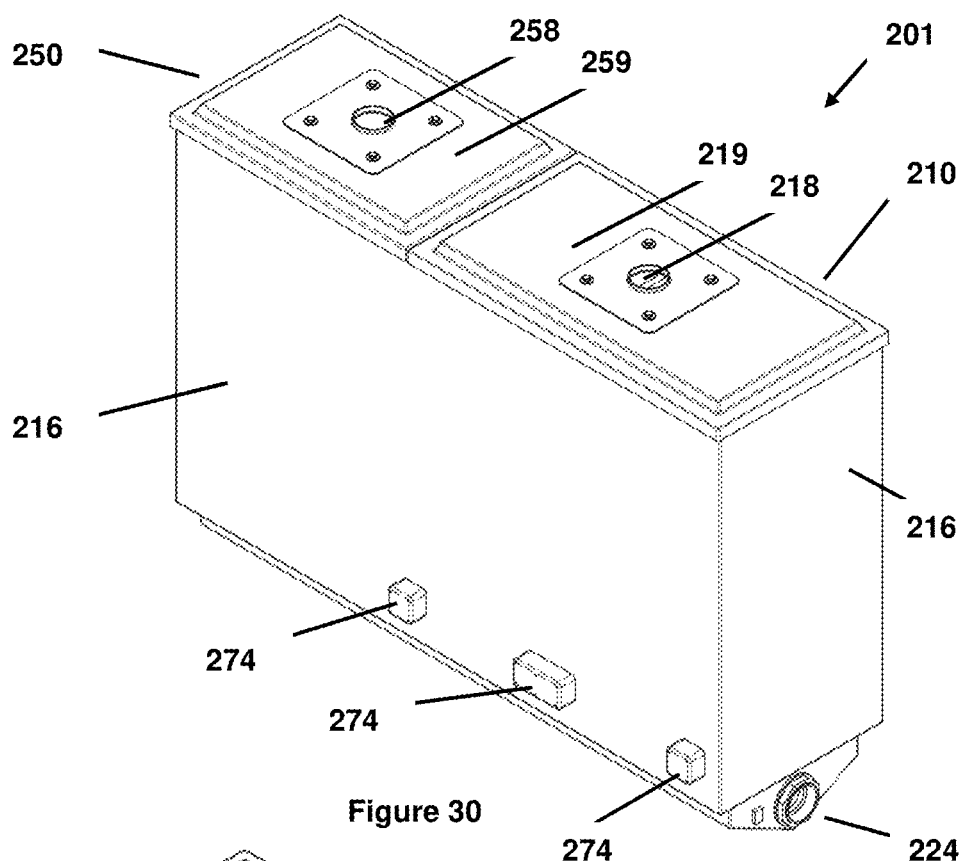
FIG. 30 is a perspective view of a fifth example electrochemical/electrolytic liquid treatment apparatus.
Figure 31:
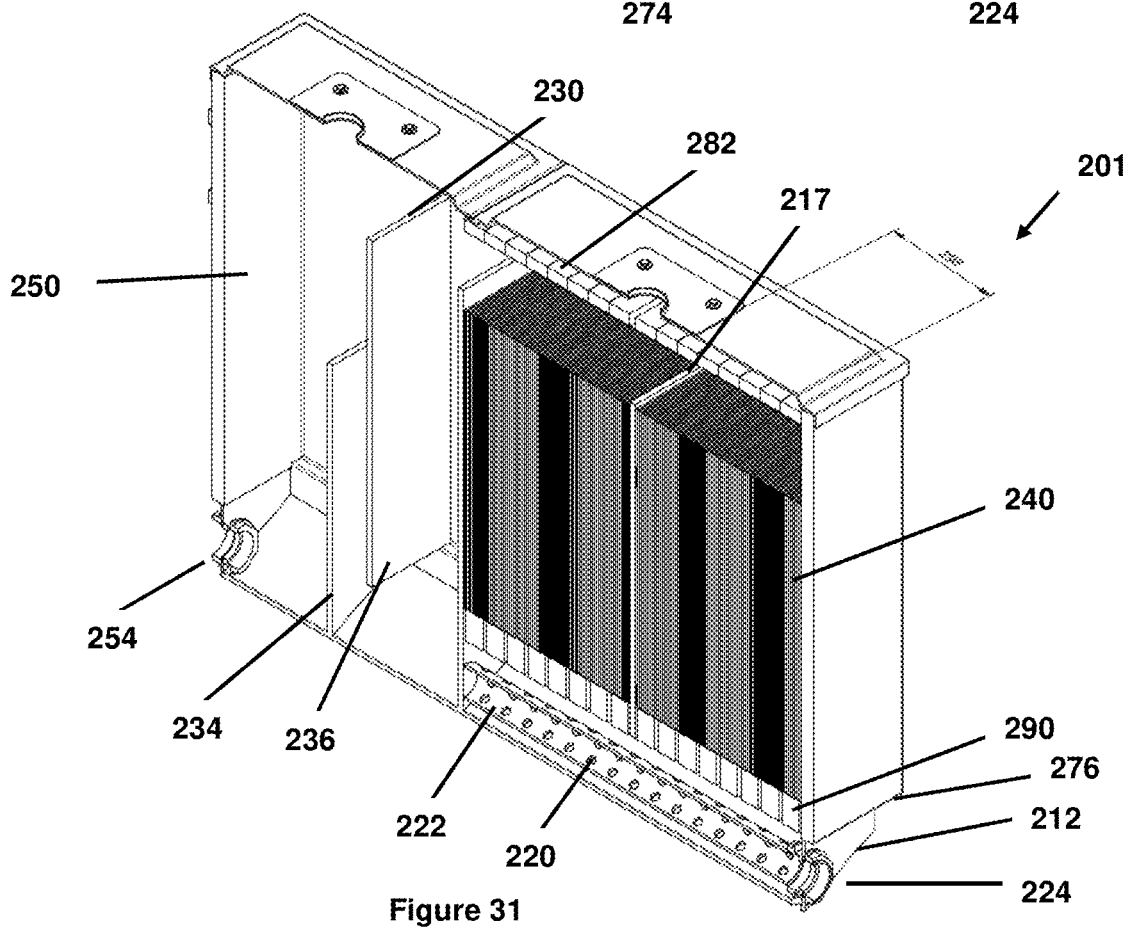
FIG. 31 is a cross sectional view of the apparatus of FIG. 30.
Figure 32:
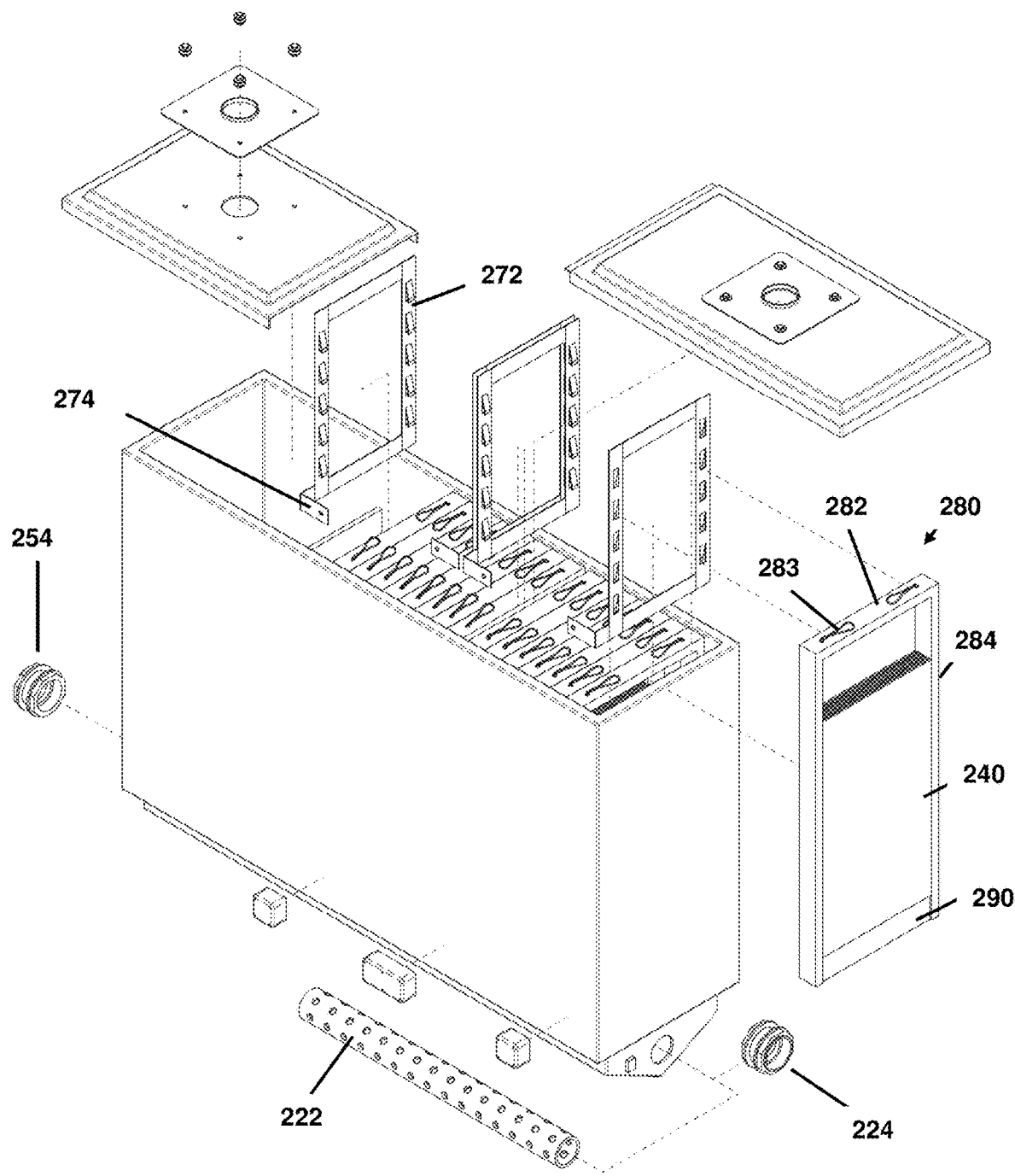
FIG. 32 is an exploded perspective view of the apparatus of FIG. 30.

Two example treatment chambers 210, electrode holders 280, and defoaming chambers 250 are illustrated in FIGS. 19 to 32; a first at FIGS. 19-29, and a second at FIGS. 30-32. The treatment chamber 210 illustrated in FIGS. 19-21 and 26-30 is capable of only accommodating one electrode holder 280. The treatment chamber 210 illustrated in FIGS. 30-32 is capable of accommodating 16 electrode holders 280. The electrode holders 280 illustrated in FIGS. 17 and 18 and 30-32 are each capable of holding 10 electrodes 240, whereas the electrode holder 280 illustrated in FIGS. 19-24, 28 and 29 is capable of holding 13 electrodes 240. The treatment chamber 210, defoaming chamber 250 and electrode holders 280 in the treatment system 200 illustrated in FIGS. 12-16 is of similar design to those in FIGS. 17-32. However, in the treatment system 200 of FIGS. 12-16, the treatment chamber 210 is capable of accommodating 400 electrodes (which equates to between 30 and 40 electrode holders 280) or the treatment chamber 210 is capable of accommodating 160 electrodes (equating to 16 electrode holders 280). In one embodiment, the treatment chamber 210, defoaming chamber 250 and electrode holders 280 in the treatment system 200 illustrated in FIGS. 12-16 is the treatment chamber 210, defoaming chamber 250 and electrode holders 280 illustrated in FIGS. 30-32. Context permitting, the apparatus 201 of FIGS. 12 to 32 may be used in the same manner, and for the same liquids, as for description above for FIGS. 1-11.

The treatment chamber 210 in the apparatus 201 of FIGS. 12-16 and 30-32 is about 500 L, and can accept a liquid flow rate of about 14 L/second. The residence time of the liquid in the treatment chamber 210 in the apparatus 201 of FIGS. 12-16 and 30-32 is typically about 30 s. The residence time of the liquid in the treatment chamber 210 of FIGS. 12-16 is typically about 30 s.

The treatment chamber 210 in FIGS. 19-21 and 26-29 is about 1 L, and can accept a liquid flow rate of about 2 L/minute. The residence time of the liquid in the treatment chamber 210 of FIGS. 19-21 and 26-29 is typically about 30 s.

The apparatuses 201 illustrated in FIGS. 12-29 are configured to operate at atmospheric temperature and pressure. The apparatus 201 illustrated in FIGS. 30-32 may be configured to operate at atmospheric temperature and pressure, or at reduced or elevated pressures (by applying suction or pressure at ports 218 and 258).

In the examples of FIGS. 12-32, the apparatus 201 is configured so that the liquid rises (or ascends) as it passes through the treatment chamber 210. As illustrated in FIGS. 19-21 and 26-32, the treatment chamber 210 includes a base 212 (or first wall), and four side walls 216.

Figure 19:
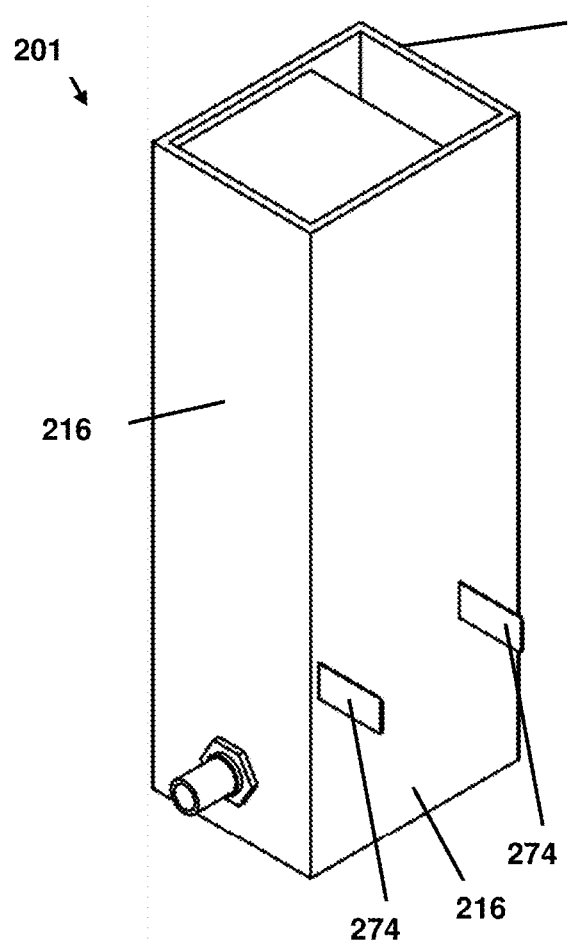
FIG. 19 is a perspective view of a fourth example electrochemical/electrolytic liquid treatment apparatus.
Figure 20:
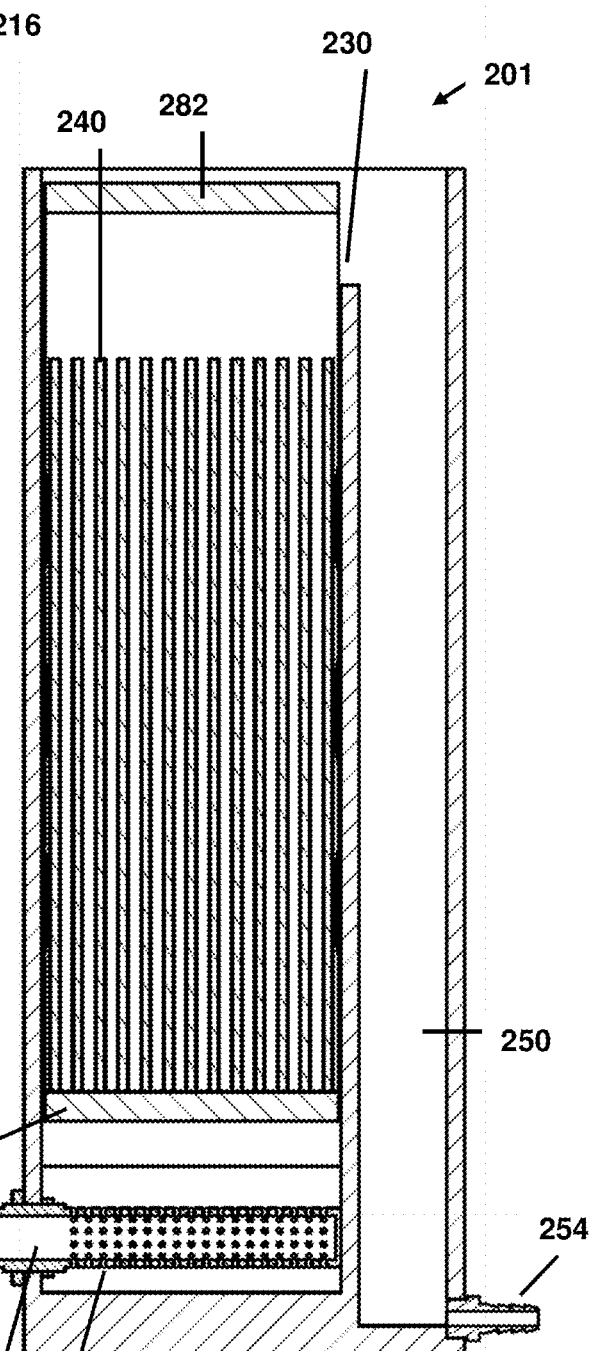
FIG. 20 is cross sectional view of the apparatus of FIG. 19, through the liquid entry point and defoaming chamber outlet.
Figure 21:
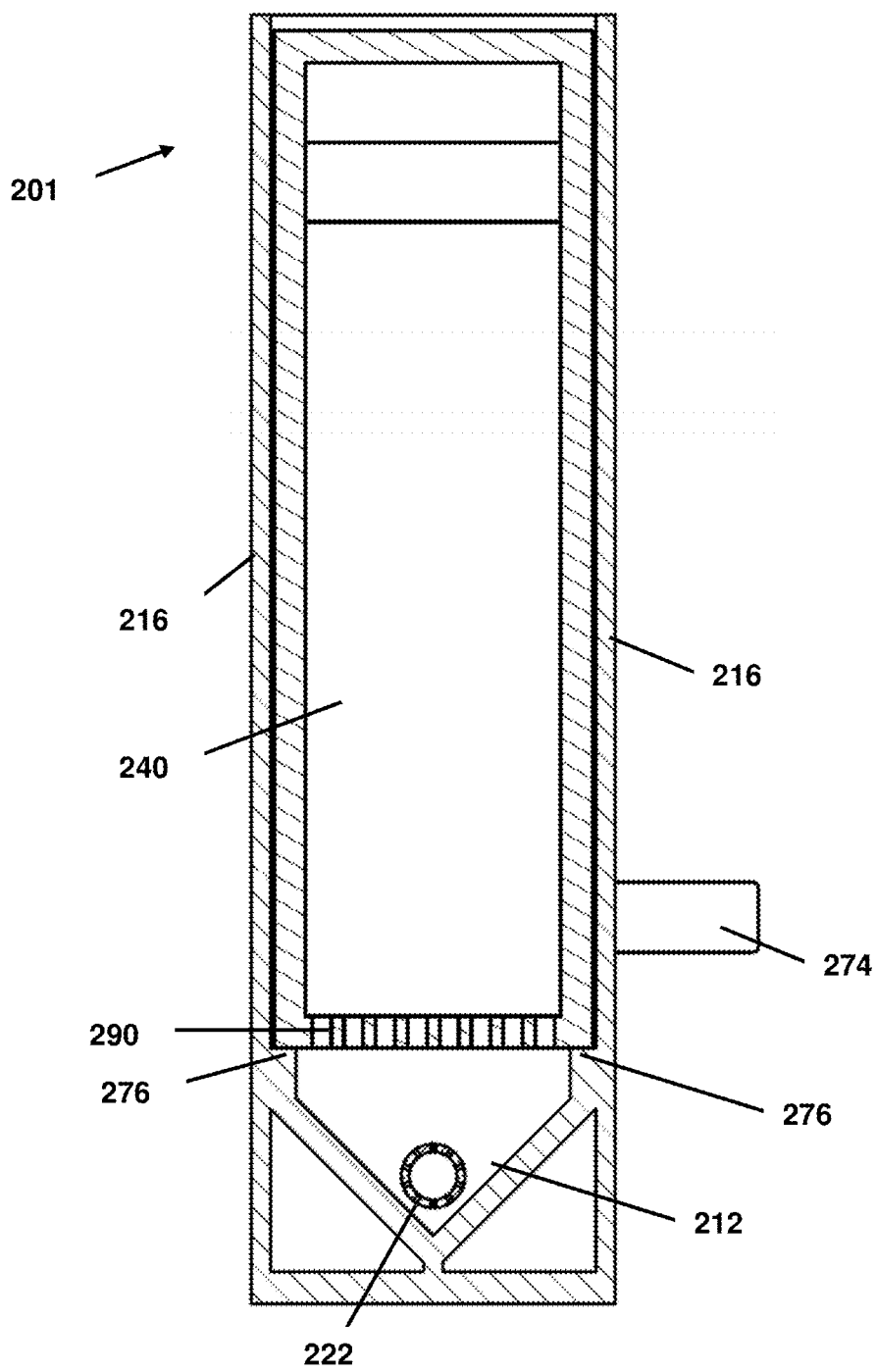
FIG. 21 is a cross sectional view of the apparatus of FIG. 19, through the treatment chamber.
Figure 25:
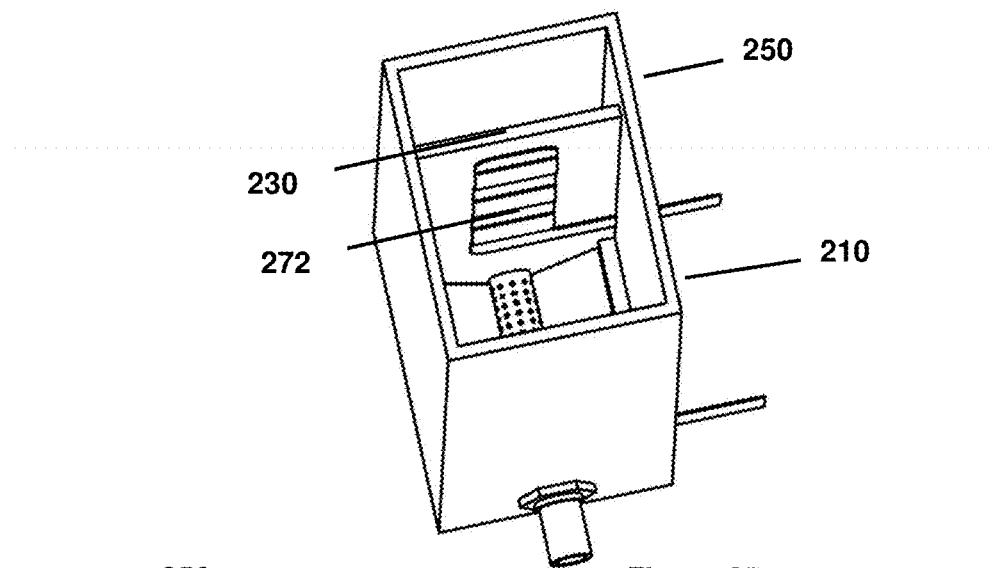
FIG. 25 is a top perspective view of the treatment chamber and defoaming chamber in the apparatus of FIG. 19.
Figure 26:
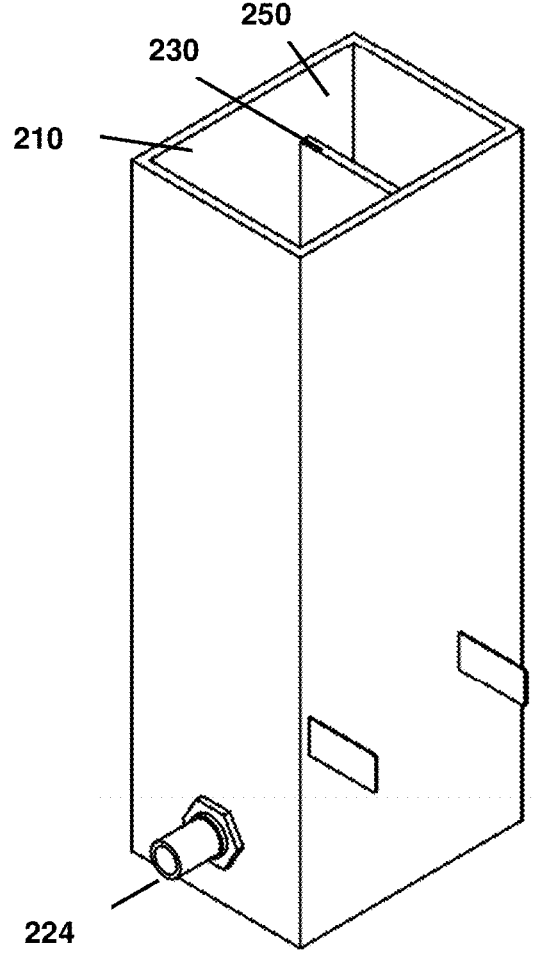
FIG. 26 is a perspective view of the treatment chamber and defoaming chamber of FIG. 25.
Figure 27:
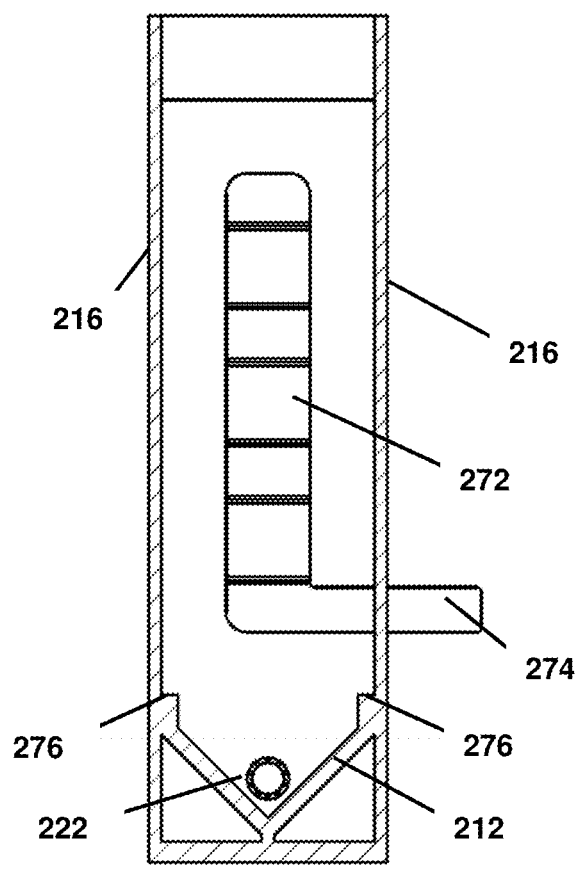
FIG. 27 is a cross sectional view through the treatment chamber of FIG. 25.

In FIGS. 19-21 and 26-29 the treatment chamber does not include a second wall (or lid), although a lid may be formed by the handle(s) of the electrode holders 280 (see FIGS. 19 and 20 for example). However, in FIGS. 30-32 the treatment chamber 210 and defoaming chamber 250 include a lid 219, 259. The lids 219, 259 include ports 218, 258 as discussed above. The ports 218, 258 may be for extracting gas.

The treatment chambers 210 in FIGS. 19-32 are generally of substantially rectangular (or square) cross section. Each side wall 216 is planar. However, the bases 212 include a trough or channel and are substantially V-shaped.

The treatment chambers 210 include a disperser 222, and the disperser 222 includes a tube with one liquid (slurry) entry point 224 and a plurality of inlets 220. The disperser 222 illustrated in the apparatuses 201 of FIGS. 19-32 is a tube perforated along its length to provide a plurality of inlets 220 into the treatment chamber 210 (see FIGS. 20 and 32 in particular). The disperser 222 is positioned within the trough or channel in the base 212.

The apparatuses 201 further include a flow aligner 290. The flow aligner 290 is connected to the electrode holders 280 (see FIGS. 17, 18, 22-23, 31 and 32). The flow aligner 290 is in the form of a wall or partition defining a plurality of apertures for passage of the liquid (slurry). In use, liquid (slurry) flows (or is pumped) through the inlets 220 into the lower portion of the treatment chamber 210. The rate at which the liquid flows through the inlets 220 is set so that the liquid pressure on the side of the flow aligner 290 proximate to the at least one inlet is greater than the liquid pressure on the side of the flow aligner 290 proximate to the electrodes 240. The inventors have advantageously found that the combination of the pressure differential across the flow aligner 290 and the consistently spaced and sized apertures across the flow aligner 290 provides an even flow of liquid between the electrodes 240, minimising so-called "dead spots" in between the electrodes 240.

The flow aligner 290 in the apparatuses 201 of FIGS. 12-18 and 30-32 is segmented (with one segment per electrode holder 280). When the electrode holders 280 are in position in the treatment chamber 210, each flow aligner 290 segment is in close proximity with the adjoining segment, so that the electrode holders 280 collectively form the flow aligner 290.

The flow aligner 290 in FIGS. 17, 18 and 30-32 have polygonal (hexagonal) apertures, and the flow aligner 290 in FIGS. 19 to 24, 28 and 29 have ovoid apertures.

The apparatus 201 may be configured to electrochemically treat the liquid in the presence of at least one treatment enhancer or at least one treatment agent. The at least one treatment enhancer is capable of penetrating a solid wall of the treatment chamber, and consequently the at least one treatment enhancer (such as ultraviolet radiation, microwave radiation or ultrasonic waves) may be applied to a side wall 216 of the treatment chamber 210. The at least one treatment agent may enter the treatment chamber 210 through at least one treatment inlet, such as through a gas inlet. The gas inlets may be part of a gas disperser, which may be integral with the base 212 of the treatment chamber 210. The types and function of such gases may be as previously described. Alternatively, the at least one treatment inlet may be mixed with the liquid to be treated before the liquid enters the treatment chamber 210. As illustrated in FIG. 12, in the illustrated system 200 the dosing tank 304 may include a treatment agent which is mixed with the liquid in balance tank 302 before the liquid enters the treatment chamber. Also, at least one treatment agent may be added to the liquid entering the storage tank 314 after electrochemical treatment from dosing tank 304. Furthermore, in FIG. 12 at least one treatment agent (in the form of a pH modifier (an acid such as acetic acid)) may be added to the treatment chamber 210 during the electrochemical treatment from acid tank 305.

The treatment chamber 210 also includes at least one outlet 230 for exit of electrochemically treated liquid (slurry). In the apparatuses 201 of FIGS. 19-21 and 26-32 the at least one outlet 230 is one outlet. As shown in FIGS. 20 and 31, in these apparatuses 201 the outlet 230 is positioned so that the electrodes 240 are configured to be positioned intermediate the at least one inlet 220, and the at least one outlet 230, and the at least one inlet 220 is positioned in a lower portion of the treatment chamber 210 and the at least one outlet 230 is positioned in an upper portion of the treatment chamber 230.

In the apparatuses 201 of FIGS. 19-21 and 26-32 the at least one outlet 230 is in the form of a weir or spillway. The outlet 230 is positioned at the intended height of liquid in the treatment chamber 210. In the apparatuses 201 of FIGS. 19-21 and 26-32, after exiting the treatment chamber 210 at outlet 230, the liquid passes to a defoaming chamber 250.

In the apparatus 201 of FIGS. 19-21 and 26-29, the defoaming chamber 250 does not include a defoamer 252. After flowing through outlet 230, the liquid descends through defoaming chamber 250 and then through an outlet 254 at the base of the chamber 250.

In the apparatus 201 of FIGS. 30-32, the defoaming chamber 250 includes a first flow diverter 234 and a second flow diverter 236. The first flow diverter 234 provides a weir inside the defoaming chamber 250. The second flow diverter 236 provides an underflow weir (under which fluid passes when flowing through the defoaming chamber 250). The bottom of the second flow diverter 236 extends below than the top of the first flow diverter 234. Both the first and second flow diverters 234, 236 are substantially vertical and are in the form of a wall or plate. In the arrangement illustrated in FIG. 31, electrochemically treated fluid exits the treatment chamber 210 through outlet 230. The fluid then falls into the space between the second flow diverter 236 and the outlet 230, and in use fluid fills this space to at least the height of the first flow diverter 234. As foam floats, the foam is trapped in this space, and the fluid falling into this space over outlet 230 penetrates the foam to thereby release trapped gas. Meanwhile, defoamed fluid passes beneath the second flow diverter 236 and then over the first flow diverter 234 before exiting the defoaming chamber 250 through outlet 254.

In FIGS. 12 and 13, after exiting the defoaming chamber 250 the liquid (slurry) flows to a vessel for clarification (clarifier 306). A slurry mover 80 (as described above) may be used with the vessel (or clarifier 306).

In the apparatuses of FIGS. 12-32, the electrodes 240 are added or removed from the treatment chamber 210 via electrode holders 280. In the apparatuses 201 of FIGS. 19-21 and 26-32 the treatment chamber 210 also includes a shelf 276 upon which the electrode holders 280 rest when in position.

Within each electrode holder 280 only two or three electrodes 240 may be connected to power (and thereby become anodes and cathodes). The remaining electrodes may all be electrical conductors. In each electrode holder 280 each electrode 240 is substantially planar and is of solid construction. The electrodes 240 may have a tapered lower edge, as previously described. The apparatuses 201 of FIGS. 12-32 are configured so that the electrodes 240 are positionable below the level of the liquid in the treatment chamber 210. The apparatuses 201 of FIGS. 12-32 are configured so that the electrodes 240 are positioned substantially vertically (substantially in a plane perpendicular to the first wall 212) within the treatment chamber 210 (although it may also be advantageous to position the electrodes 240 (or a portion of the electrodes) at an angle as previously described).

As illustrated in FIGS. 17, 18, 22-24 and 32, the electrode holder 280 includes a frame 281, and the frame 281 includes a handle 282 and two side walls 284. The frame 281 is substantially "U" shaped. The frame also includes a flow aligner 290 (or a segment thereof).

The treatment chamber 210 of FIGS. 14-16, 19-21, and 28-32 further includes at least one power connector 272 for connecting power to an electrode holder 280 or to at least one electrode 240 held by the electrode holder 280. In FIGS. 19-21 and 25-29, the treatment chamber 210 is configured to supply power longitudinally along the working face of at least one electrode 240. In this example, the power connector 272 is adapted to contact the working face of at least one electrode 240. The power connector 272 includes a corrugated spring steel strip. In this example, the power connector 272 also traverses the wall of the treatment chamber 210 to provide a tab 274 for connection to a power source. A similar arrangement may be used with a plurality of electrode holders 280 (such as in the treatment chamber 210 of FIGS. 12-16), as in this case each power connector 272 may be positioned intermediate to the working face of a terminal electrode 240 held by two electrode holders 280. The crests (and troughs) of the power connector 272 may be positioned so that the crests of the power connector 272 contact one terminal electrode 240, and the troughs of the power connector 272 contact the other terminal electrode 240.

A similar mechanism for connecting power to the electrodes 240 is illustrated in the treatment chamber 210 of FIGS. 30-32. In FIGS. 30-32 the treatment chamber 210 is also configured to supply power longitudinally along the working face of at least one electrode 240. However, while the power connector 272 illustrated in FIGS. 19-21 and 26-29 includes one corrugated spring steel strip per electrode 240, in FIGS. 30-32 the power connector 272 includes two corrugated spring steel strips per electrode 240 (see FIG.

32). The treatment chamber 210 in the apparatus 201 of FIGS. 30-32 includes four power connectors 272, and each power connector provides power to only one electrode 240.

In FIGS. 17-24 and 28-32, the electrodes 240 are, on average, 3 mm thick and 3 mm apart. However, alternative thicknesses and distances may also be used in the apparatus 201.

In the apparatus 201 of FIGS. 19-21 and 25-29 two of the 13 electrodes 240 (or about 15% of the electrodes 240) are connected to power. The remaining nine electrodes 240 are all electrical conductors.

In the apparatus 201 of FIGS. 30-32, four of the 160 electrodes 240 (or about 2.5% of the electrodes 240) are connected to power. The remaining 156 electrodes 240 are all electrical conductors.

The treatment chamber 210 in FIGS. 30-32 also includes a divider wall (or plate) 217 positionable between the electrode holders 280. The electrode holders 280 in FIGS. 30 and 32 also include an electrode holder remover 283 (in the form of a cable loop or string) to assist in removing the electrode holder 280 from the treatment chamber 210.

As illustrated in FIGS. 14-16, the apparatus 201 may further include a liquid (slurry) pump 324 for pumping liquid to be treated through the at least one inlet for entry of a liquid to be treated, and a further pump 324 for pumping liquid from the defoaming chamber 250 (see FIG. 14). In FIG. 14, 326 is a treated solution outlet (DN80), 328 is a fresh water inlet (DN25), 330 is a clean-in-place connection (DN25), 332 is a drain outlet (DN25) and 334 is a raw slurry inlet (DN80). The power supply to the apparatus 201 of FIGS. 14-16 is 415 V, 50 Hz and 150 A.

The apparatus 201 of FIGS. 12-16 further includes sensors for sensing the level of liquid in the treatment chamber 210, and a variable speed pump 324 to control the flow rate of liquid exiting the treatment chamber 210. The sensors and variable speed pump 324 may form part of a system for regulating the electrochemical treatment, which may be controlled by controller (PLC) 307. The controller 307 may control the polarity of the current and its reversal to thereby switch the electrodes 240 between anodes and cathodes. The controller 307 may also control the sinewave ramping angles during the electrochemical treatment, and/or modify the rate of current application to the electrodes 240 during the electrochemical treatment. Similar components may be used in the apparatuses 201 discussed in FIGS. 19-32.

Any suitable current may be applied to the electrodes 240 during the electrochemical treatment, however the voltage applied to each electrode holder 280 in the treatment chamber 210 in FIGS. 12-32 is typically between about 20 and 45 V, especially about 26 V or about 40 V. The effective voltage to each cell is typically around 2-3 V, especially about 2.6 V or about 3 V. For the apparatus 201 of FIGS. 30-32, the total voltage applied to the treatment chamber 210 may be about 415 V, resulting in an effective voltage to each cell (given there are 160 electrodes 240) of about 2.6 V.

In use, liquid (slurry including iron particles, especially iron oxyhydroxide particles) is pumped into the treatment chamber 210 via the at least one inlet 220, and liquid pressure builds beneath flow aligner 290. Liquid passes through the flow aligner 290 and between the electrodes 240 where the liquid and iron particles (especially iron oxyhydroxide particles) are electrochemically treated and floc is generated. The floc and electrochemically treated liquid/iron particles (or iron oxide particles) then flow to the upper portion of the treatment chamber 210, and gas bubbles (from gas inlets 260, for example) may assist in driving the floc and electrochemically treated liquid vertically. The floc and electrochemically treated liquid/iron particles (especially iron oxyhydroxide particles) then pass through the at least one outlet 230 and into the defoaming chamber 250, over/around flow diverter(s) 232 and optionally past defoamers 252. This process leads to defoaming of the floc electrochemically treated liquid/iron particles. The floc/electrochemically treated liquid/iron particles then flows out the outlet 254 in the defoaming chamber 250 and then to a vessel for separation of the floc (e.g. clarifier 306). A separator, as discussed above, may be positioned within the treatment chamber 210, or after the treatment chamber 210, for example between the treatment chamber 210 and the clarifier 306, or within the clarifier 306.

Example 1

An example process for improving the grade of iron in a slurry including iron oxyhydroxide minerals will now be described with reference to FIGS. 33 to 37.

Figure 33:
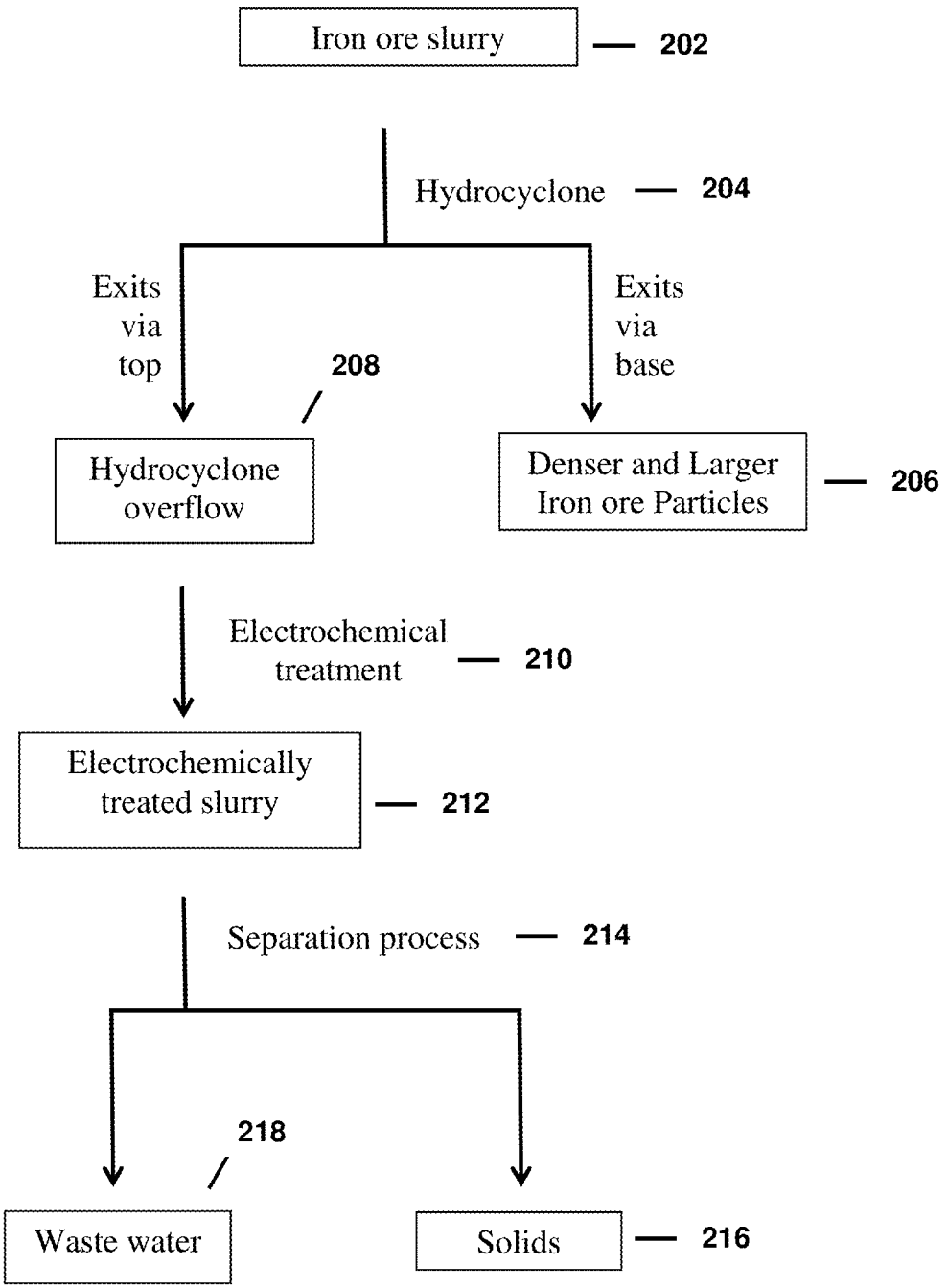
FIG. 33 is a schematic illustrating the treatment of an iron ore slurry.

A schematic of an example process is provided in FIG. 33. In this process, an aqueous iron ore slurry 202 was generated during the wet beneficiation processing of a typical banded-iron-formation (BIF) ore from the Pilbara region (Australia). The iron reject stream ('slimes') consists of the flow from the deslime circuit overflow in the ore beneficiation plant (OBP), with a saline water flow of typically 60,000-70,000 total dissolved solids (TDS) carrying fine to very fine particulate iron oxyhydroxy mixed with clay and other waste rock.

The aqueous slurry 202 included solid matter all having a particle size below a screen size of 1 mm with the majority by weight in the very fine size fraction of less than 100 microns.

The aqueous slurry is normally fed into a hydrocyclone 204. The hydrocyclone 204 then separates the denser and larger particles 206 from the less dense and smaller (finer) particles which pass into the hydrocyclone overflow 208. The hydrocyclone overflow is routinely sent to tailings because of the inability to separate the hematite component from the residual goethite, kaolinite, quartz and amorphous (the unknown) content. The tailings component presents numerous challenges to mine management because of the very high water content and very slow settling times resulting in difficulty in recovering clean supernatant water from the surface of the dam.

The hydrocyclone overflow 208 included 88%-90% water and 10-12% solids. To quantify the weight percent solids in the aqueous slurry, four aliquots of 250 m taken directly from the overflow 208 were filtered onto pre-weighed filter papers, dried at 105° C. and then weighed. The results indicate that the circuit carries typically 84-95 grams of reject slimes per litre of process water with an average of 89 g/L (as shown in Table 2).

TABLE 2

Slurry composition on an air dried basis, in grams per litre

| Aliquot | volume (ml) | Air dried weight | calculated g/L |
|---|---|---|---|
| 1 | 250 | 21.157 | 84.628 |
| 2 | 250 | 21.997 | 87.988 |
| 3 | 250 | 23.937 | 95.748 |
| 4 | 250 | 22.513 | 90.052 |
| Average | | | 89.604 g/L |

The air dried solids in the overflow 208 were subjected to X-Ray Diffraction (XRD) and Rietveld quantitative phase analysis to identify the phases present, and to quantitatively analyse the relative amount of each phase. The XRD was performed using 10% corundum ($Al_2O_3$) as an internal standard.

The Rietveld quantitative phase analysis was performed using a background fitted to a Chebyshev function of 11 terms, refined using the 1/X background term. The phase analysis was performed using sample displacement, domain size broadening parameters (Lorentzian), scale factors and unit cell parameters as required.

Figure 34:
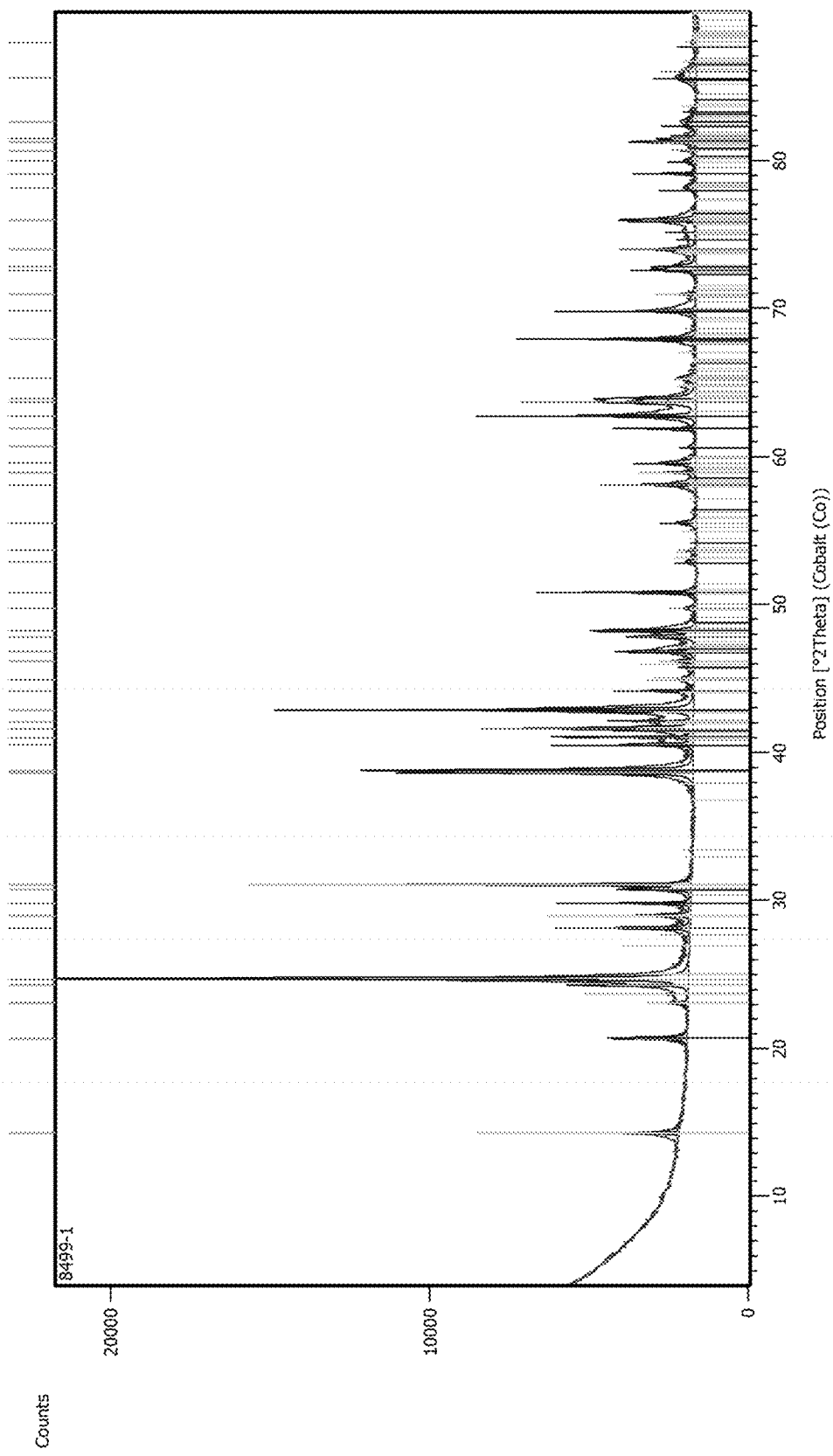
FIG. 34 is an X-Ray Diffraction (XRD) spectrum of the solids from the overflow slurry of a hydrocyclone.

The XRD spectrum of the (untreated) solids from the hydrocyclone overflow 208 is provided in FIG. 34. This spectrum illustrates the dominant presence of goethite (FeO(OH)) and hematite ($Fe_2O_3$), with quartz ($SiO_2$), a kaolinite phase ($Al_2Si_2O_5(OH)_4$) and the internal standard (corundum). The Rietveld quantitative phase analysis spectrum of the solids from the hydrocyclone overflow 208 is provided in FIG. 36. This data had a $R_{wp}$ of 3.52; a $R_{wp}$—Background of 10.59 and a Goodness of Fit of 2.08. The relative proportion of each of goethite (FeO(OH)), quartz ($SiO_2$), hematite ($Fe_2O_3$), the kaolinite phase ($Al_2Si_2O(OH)_4$) and an amorphous phase is provided in Table 3.

TABLE 3

Results of Rietveld Phase Analysis of the air-dried Solids from Aqueous Waste 208, wt %

| Phase Name | Weight (%)* | Estimated standard deviation† |
|---|---|---|
| Quartz | 6.14 | 0.06 |
| Hematite | 17.52 | 0.12 |
| Goethite | 50.70 | 0.17 |
| Kaolinite (BISH model) | 12.79 | 0.2 |
| Amorphous‡ | 12.84 | 0.8 |

*Weight percent may be incorrect if incorrect chemical formula is assigned to a phase.
†Estimate of precision, not the accuracy of the refined weight.
‡Includes: unidentified phases if any; intensity not explained by the model: and real non-diffracting material if any The hydrocyclone overflow 208 (tailings mud/slurry) was then subjected to electrochemical treatment 210 using the apparatus 1 shown in FIG. 11. This apparatus has a 700 mL treatment chamber 10 and 13 mild steel electrodes 40 (7 anodes 44 and 6 cathodes 42, in alternating arrangement), with reversible polarity every 30 seconds. The electrodes 40 were 3 mm thick, spaced 3 mm apart and of dimensions 150 mm×100 mm.

In the electrochemical treatment 210, the hydrocyclone overflow 208 was adjusted to a 4 L slurry with approximately 3.5 wt % solids.

The 4 L of slurry was then recirculated through the apparatus 1 of FIG. 11 at a residence time of 30 seconds. Flow to the treatment chamber 10 was via a peristaltic pump, adjusted to give a consistent flow rate through the treatment chamber 10 of 1.0 litres per 30 seconds or 2 litres per minute. No reactants were added to the treatment chamber 10 and the electrochemical treatment was run on an as-received basis. The electrochemical treatment was run at 37.9V and 4.7 A for a cell voltage of 3.16 V. To ensure that only steady state conditions had been achieved, the slurry output from the first 30 seconds of cell operation was rejected and the remainder was recirculated through the apparatus 1. The slurry was passed through the apparatus 1 between one and two times, with the pH measured at the completion of each circuit.

Before the electrochemical treatment, the 4 L slurry 208 had a pH of 5.89, and this pH increased during the electrochemical treatment to first 6.2 and finally 6.9 (the longer the treatment progresses, the higher the pH became). The conductivity of the supernatant water of the 4 L slurry was 5.33 mS before electrochemical treatment, and the conductivity of the supernatant water was between 5.15 and 5.33 mS during the treatment.

After the electrochemical treatment was complete, the treated slurry 212 underwent a separation process 214. This process 214 included filtration to separate the solids 216 from the waste water 218, followed by air drying the solid fraction at 333 K (59.86° C.) overnight. The dried solid fraction 216 was then allowed to cool.

Figure 35:
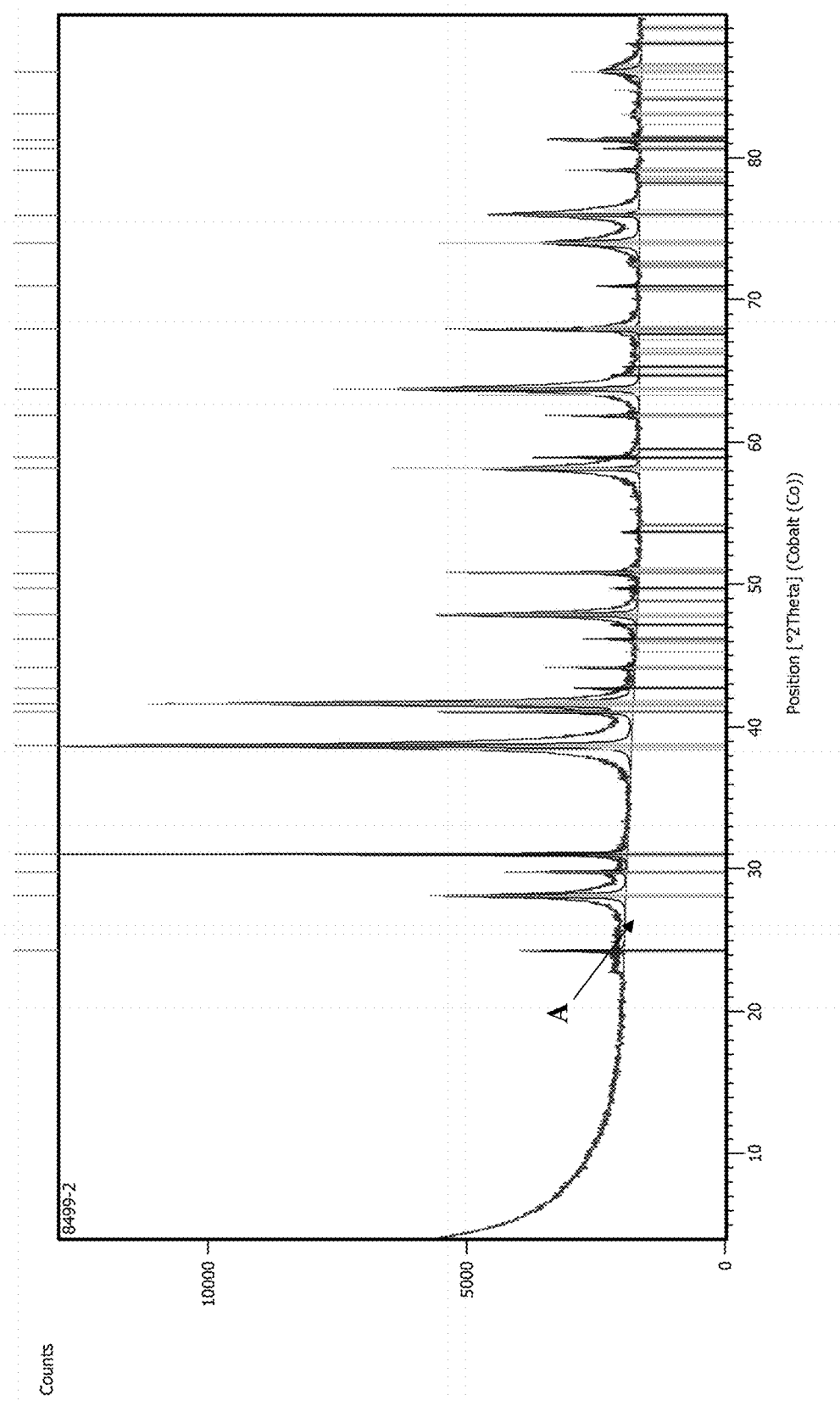
FIG. 35 is an X-Ray Diffraction (XRD) spectrum of the solids from the overflow slurry of FIG. 34, after electrochemical treatment.
Figure 36:
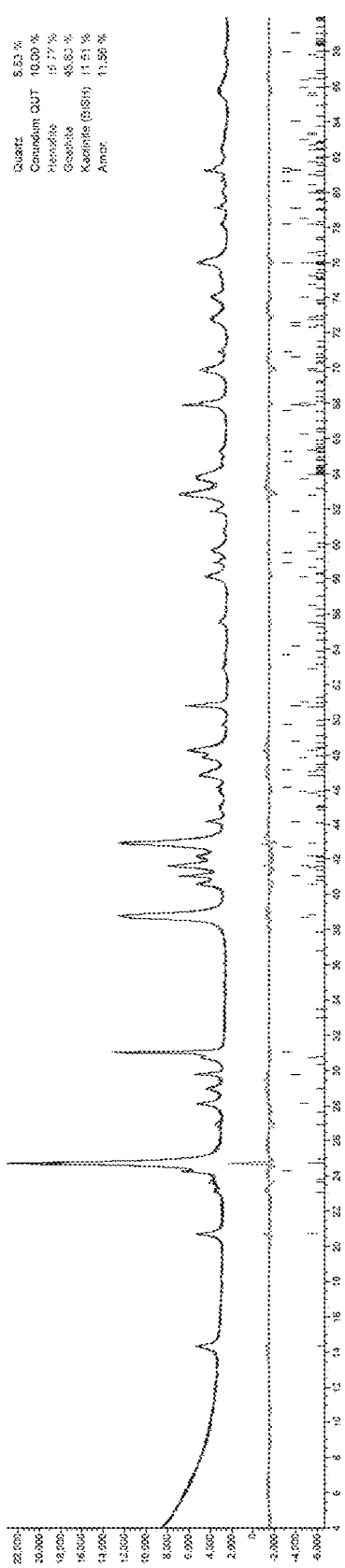
FIG. 36 is a Rietveld quantitative phase analysis spectrum of the solids of FIG. 34.

The solids 216 were subjected to X-Ray Diffraction (XRD) and Rietveld quantitative phase analysis to identify the phases present, and to quantitatively analyse the relative amount of each phase after the electrochemical treatment. The XRD spectrum is provided in FIG. 35. This spectrum illustrates the presence of quartz ($SiO_2$), hematite ($Fe_2O_3$), and the internal standard (corundum) (the spectrum also includes a possible unidentified peak at low angle (indicated by the arrow at A), but there was insufficient data for further identification). As illustrated in FIG. 35, in this spectrum there is an increased proportion of hematite.

Figure 37:
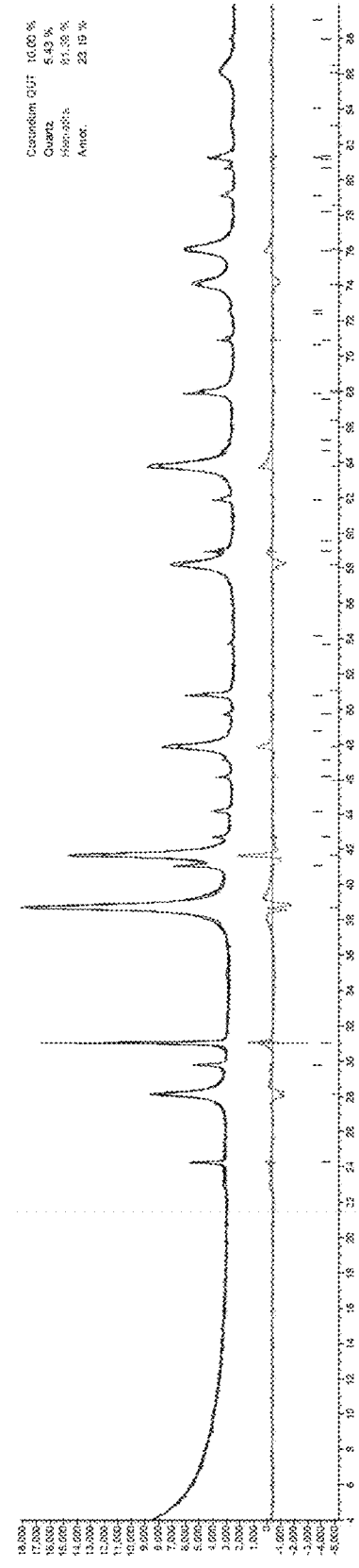
FIG. 37 is a Rietveld quantitative phase analysis spectrum of the solids of FIG. 35.

The Rietveld quantitative phase analysis spectrum of the solids 216 is provided in FIG. 37. This data had a $R_{wp}$ of 4.22; a $R_{wp}$—Background of 4.22 and a Goodness of Fit of 2.47. The relative proportion of each of quartz ($SiO_2$), hematite or maghemite ($Fe_2O_3$) and an amorphous phase is provided in Table 4. The most significant change is an increase in the Hematite phase from 17.52% to 68.21% in the Rietveld Phase Analysis table even though there remains a large amorphous percentage at 25.77%.

TABLE 4

Results of Rietveld Phase Analysis of the Solids 216, wt %

| Phase Name | Weight (%)* | Estimated standard deviation† |
|---|---|---|
| Quartz | 6.03 | 0.05 |
| Hematite | 68.21 | 0.11 |
| Amorphous‡ | 25.77 | 0.8 |

*Weight percent may be incorrect if incorrect chemical formula assigned to phase.
†Estimate of precision, not the accuracy of the refined weight.
‡Includes: unidentified phases if any, intensity not explained by the model, and real non-diffracting material
Note:
hematite peaks were very broad at the base. Required modelling of a strain broadening term (Lorentzian) to give an adequate fit.

The 'amorphous' phase of the overflow 208 was investigated further. A 120 g dry-weight sample of the (Dewatering Hydrocyclone) Overflow 208 was submitted to Australian Laboratory Services (ALS) for Mineral Liberation Analysis (MLA) using their MLA-XBSE technology on single polished mounts of the ore samples, in order to develop the following data:
  List of detected minerals with formulae and composition;
  Bulk Mineral Abundances as wt % (including the assignment of minerals to what had previously been reported as amorphous material);
  Grain Size Distributions;
  Elemental distribution of the elements of interest;
  Liberation and locking data for minerals of interest;
  Mineral Association Data;
  Data generated Grade Recovery Curves; and
  False colour images of the particles/minerals of interest.
In addition, ALS were requested to provide multi-element chemical analyses of the sample using method ME-XRF21n—for $Al_2O_3$, As, Ba, CaO, Cl, Co, $Cr_2O_3$, Cu, Fe, $K_2O$, MgO, Mn, $Na_2O$, Ni, P, Pb, S, $SiO_2$, Sn, Sr, $TiO_2$, V, Zn, Zr and loss on ignition (LOI). However note that this XRF-21n process involves calcining the sample at 1,000° C., with oxides expressed in their 'normalised' form—i.e. $Fe_2O_3$ with any goethite or similar iron oxy-hydroxide or carbonate being converted to hematite at above approximately 240° C.

Australian Laboratory Services (ALS) provided X-ray fluorescence spectrometry (ME-XRF21n) for the geochemical analysis of the samples presented. This was coupled with Mineral Liberation Analysis (MLA), X-ray diffraction and Scanning Electron Microscopy (SEM) to produce an accurate and quantitative mineralogical assemblage of the raw and treated samples. The sophisticated image analysis method generates False Colour Images of the particles/minerals of interest, which are recorded as MOI images. Texture resolutions were sufficient to measure 0.5-30 micron particles thereby enabling automated elemental quantification and false colour assignment to the 'grey scale' target minerals through the close integration of Back-Scattered Electrons (BSE image) and EDS X-ray analyses. BSE are beam electrons that are reflected from deeper locations within the specimen. These were used in combination with characteristic X-rays, however the intensity of the BSE signal is strongly related to the atomic number (Z) of the specimen, thereby providing distribution data for elements in the sample.

Above data from ALS is provided in Tables 5-10 below.

TABLE 5

Sample Particle Size Data

| Size Fractions (μm) | Weight (g) | Cumulative Distribution (%) |
|---|---|---|
| +150 | 0.18 | 0.2 |
| +106 | 0.02 | 0.0 |
| +53 | 0.82 | 0.8 |
| +20 | 8.66 | 8.7 |
| −20 | 90.38 | 90.3 |
| Total | 100.1 | 100.0 |

TABLE 6

Sample Particle Size Percent Passing Values - Cumulative Passing, Sieve Size Series 4SQRT2

| | Size Definition | |
|---|---|---|
| P-value | Equivalent Ellipse μm | Maximum Diameter μm |
| P10 | 1.36 | 2.15 |
| P20 | 1.74 | 3.12 |
| P50 | 3.34 | 6.83 |
| P80 | 9.11 | 17.57 |
| P90 | 14.29 | 26.82 |

Figure 38:
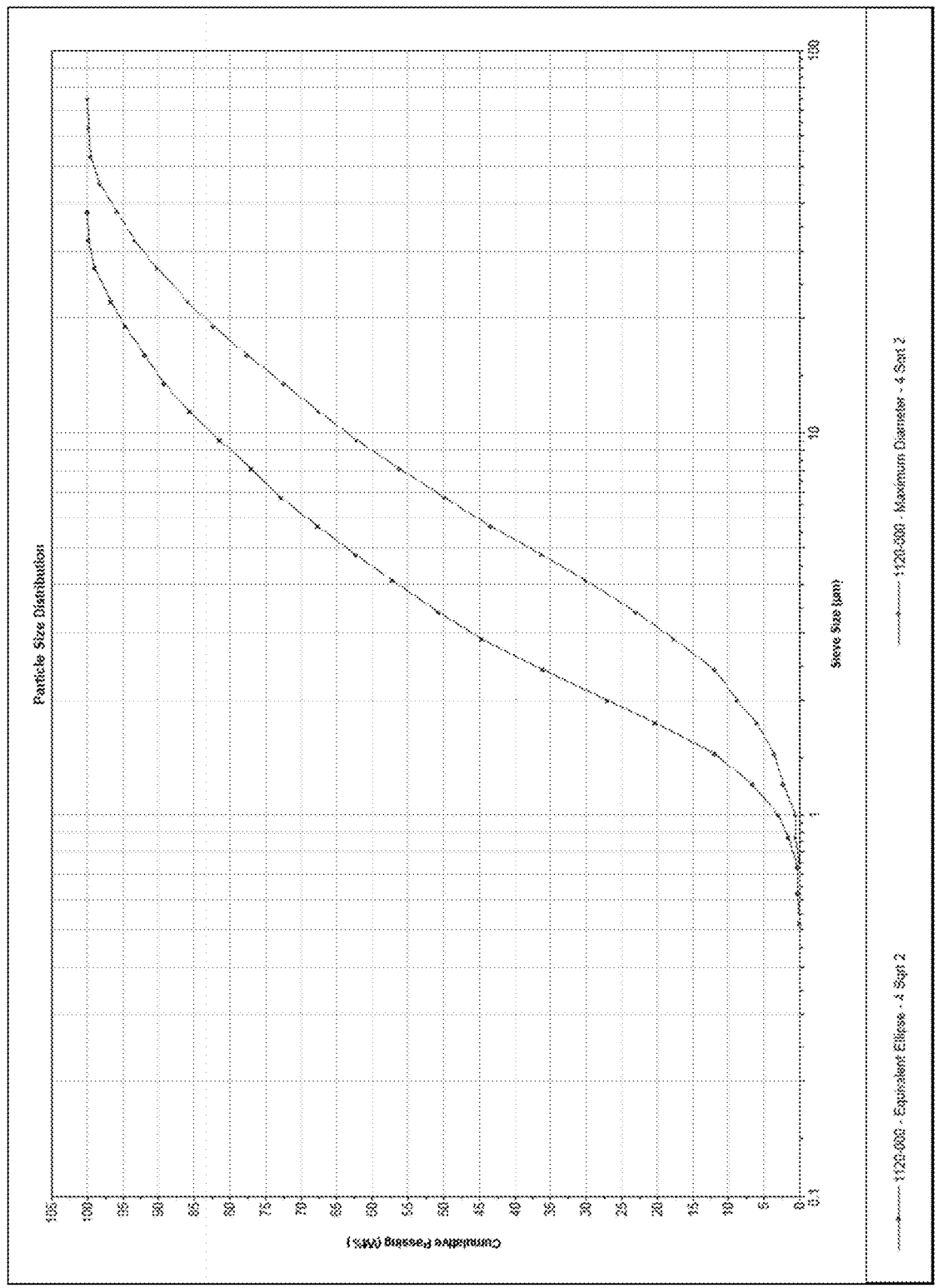
FIG. 38 shows the particle size distribution of dewatering hydrocyclone overflow.

This information is also provided in FIG. 38.

TABLE 7

Sample Geochemical Assay Data using method ME-GRA05 (for LOI) and method ME-XRF21n (for all other components)

| Component | % |
|---|---|
| $Al_2O_3$ | 4.6 |
| As | 0.004 |
| Ba | <0.001 |
| CaO | 0.04 |
| Cl | 0.128 |
| Co | 0.002 |
| $Cr_2O_3$ | <0.001 |
| Cu | 0.001 |
| Fe | 53.81 |
| $K_2O$ | 0.048 |
| MgO | 0.13 |
| Mn | 0.284 |
| $Na_2O$ | 0.124 |
| Ni | 0.003 |
| P | 0.078 |
| Pb | <0.001 |
| S | 0.068 |
| $SiO_2$ | 7.37 |
| Sn | <0.001 |
| Sr | <0.001 |
| $TiO_2$ | 0.27 |
| V | 0.002 |
| Zn | 0.01 |
| Zr | 0.004 |
| LOI | 9.59 |

TABLE 8

Mineral abundances derived by ALS.

| Mineral | wt % | Particle Count | Grain Count |
|---|---|---|---|
| Hematite | 9.91 | 6,226 | 7,287 |
| Goethite | 23.80 | 17,140 | 18,936 |
| Goethite SiAl | 26.32 | 101,289 | 102,976 |
| Limonite | 26.78 | 33,404 | 35,069 |
| Goethite Mix | 9.34 | 124,017 | 124,033 |
| Other (Illite, Kaolinite, Quartz, Ilmenite, Rutile and Alunite) | 3.84 | 8,963 | 9,028 |
| Total | 100.00 | 275,439 | 297,329 |

TABLE 9

Elemental Distributions Calculated using Mineral Abundances and Assigned Average Mineral Compositions (ungrouped)

| Mineral | Al (%) | Ba (%) | Fe (%) | H (%) | Hf (%) | K (%) | Mg (%) | Mn (%) |
|---|---|---|---|---|---|---|---|---|
| Hematite | 0.00 | 0.00 | 12.87 | 0.00 | 0.00 | 0.00 | 0.00 | 0.00 |
| Goethite | 9.73 | 0.00 | 26.04 | 20.03 | 0.00 | 0.00 | 0.00 | 11.90 |
| Goethite_SiAl | 36.30 | 0.00 | 26.89 | 22.72 | 0.00 | 0.00 | 0.00 | 25.50 |
| Limonite | 27.91 | 0.00 | 24.41 | 47.77 | 0.00 | 0.00 | 95.17 | 21.76 |

TABLE 9-continued

Elemental Distributions Calculated using Mineral Abundances and Assigned Average Mineral Compositions (ungrouped)

| | | | | | | | | |
|---|---|---|---|---|---|---|---|---|
| Goethite_mix | 12.89 | 0.00 | 9.54 | 8.06 | 0.00 | 0.00 | 0.00 | 9.05 |
| Cryptomelane | 0.00 | 100.00 | 0.01 | 0.00 | 0.00 | 20.63 | 0.00 | 26.94 |
| Groutite | 0.00 | 0.00 | 0.00 | 0.01 | 0.00 | 0.00 | 0.00 | 2.68 |
| Ilmenite | 0.00 | 0.00 | 0.10 | 0.00 | 0.00 | 0.00 | 0.00 | 2.16 |
| Rutile | 0.00 | 0.00 | 0.00 | 0.00 | 0.00 | 0.00 | 0.00 | 0.00 |
| Alunite | 0.89 | 0.00 | 0.00 | 0.11 | 0.00 | 50.22 | 0.00 | 0.00 |
| Illite | 5.63 | 0.00 | 0.12 | 0.48 | 0.00 | 29.15 | 4.83 | 0.00 |
| Kaolinite | 6.65 | 0.00 | 0.02 | 0.82 | 0.00 | 0.00 | 0.00 | 0.00 |
| Quartz | 0.00 | 0.00 | 0.00 | 0.00 | 0.00 | 0.00 | 0.00 | 0.00 |
| Zircon | 0.00 | 0.00 | 0.00 | 0.00 | 100.00 | 0.00 | 0.00 | 0.00 |
| Total | 100.00 | 100.00 | 100.00 | 100.00 | 100.00 | 100.00 | 100.00 | 100.00 |

| Mineral | Na (%) | O (%) | P (%) | S (%) | Si (%) | Ti (%) | Zr (%) |
|---|---|---|---|---|---|---|---|
| Hematite | 0.00 | 7.60 | 0.00 | 0.00 | 0.00 | 0.00 | 0.00 |
| Goethite | 0.00 | 22.49 | 17.99 | 0.00 | 15.19 | 0.00 | 0.00 |
| Goethite_SiAl | 0.00 | 25.56 | 43.10 | 0.00 | 21.50 | 0.00 | 0.00 |
| Limonite | 0.00 | 30.30 | 23.61 | 0.00 | 12.01 | 0.00 | 0.00 |
| Goethite_mix | 0.00 | 9.07 | 15.30 | 0.00 | 7.63 | 0.00 | 0.00 |
| Cryptomelane | 56.06 | 0.14 | 0.00 | 0.00 | 0.00 | 0.00 | 0.00 |
| Groutite | 0.00 | 0.01 | 0.00 | 0.00 | 0.00 | 0.00 | 0.00 |
| Ilmenite | 0.00 | 0.16 | 0.00 | 0.00 | 0.00 | 58.03 | 0.00 |
| Rutile | 0.00 | 0.08 | 0.00 | 0.00 | 0.00 | 39.24 | 0.00 |
| Alunite | 0.00 | 0.15 | 0.00 | 100.00 | 0.00 | 0.00 | 0.00 |
| Illite | 43.94 | 0.93 | 0.00 | 0.00 | 6.81 | 2.72 | 0.00 |
| Kaolinite | 0.00 | 1.04 | 0.00 | 0.00 | 5.79 | 0.00 | 0.00 |
| Quartz | 0.00 | 2.48 | 0.00 | 0.00 | 31.05 | 0.00 | 0.00 |
| Zircon | 0.00 | 0.00 | 0.00 | 0.00 | 0.02 | 0.00 | 100.00 |
| Total | 100.00 | 100.00 | 100.00 | 100.00 | 100.00 | 100.00 | 100.00 |

TABLE 10

Elemental Distributions Calculated using Mineral Abundances and Assigned Average Mineral Compositions (MOI Groupings)

| Mineral | Al (%) | Ba (%) | Fe (%) | H (%) | Hf (%) | K (%) | Mg (%) | Mn (%) |
|---|---|---|---|---|---|---|---|---|
| Fe Oxide_hydroxides | 73.95 | 0.00 | 90.21 | 90.51 | 0.00 | 0.00 | 95.17 | 59.16 |
| Other Oxides | 0.00 | 100.00 | 0.10 | 0.01 | 0.00 | 20.63 | 0.00 | 31.79 |
| Phyllosilicates | 12.28 | 0.00 | 0.14 | 1.30 | 0.00 | 29.15 | 4.83 | 0.00 |
| Quartz_others | 0.89 | 0.00 | 0.00 | 0.11 | 100.00 | 50.22 | 0.00 | 0.00 |
| Goethite_mix | 12.89 | 0.00 | 9.54 | 8.06 | 0.00 | 0.00 | 0.00 | 9.05 |
| Total | 100.00 | 100.00 | 100.00 | 100.00 | 100.00 | 100.00 | 100.00 | 100.00 |

| Mineral | Na (%) | O (%) | P (%) | S (%) | Si (%) | Ti (%) | Zr (%) |
|---|---|---|---|---|---|---|---|
| Fe Oxide_hydroxides | 0.00 | 85.95 | 84.70 | 0.00 | 48.70 | 0.00 | 0.00 |
| Other Oxides | 56.06 | 0.38 | 0.00 | 0.00 | 0.00 | 97.28 | 0.00 |
| Phyllosilicates | 43.94 | 1.97 | 0.00 | 0.00 | 12.60 | 2.72 | 0.00 |
| Quartz_others | 0.00 | 2.63 | 0.00 | 100.00 | 31.07 | 0.00 | 100.00 |
| Goethite_mix | 0.00 | 9.07 | 15.30 | 0.00 | 7.63 | 0.00 | 0.00 |
| Total | 100.00 | 100.00 | 100.00 | 100.00 | 100.00 | 100.00 | 100.00 |

Figure 39:
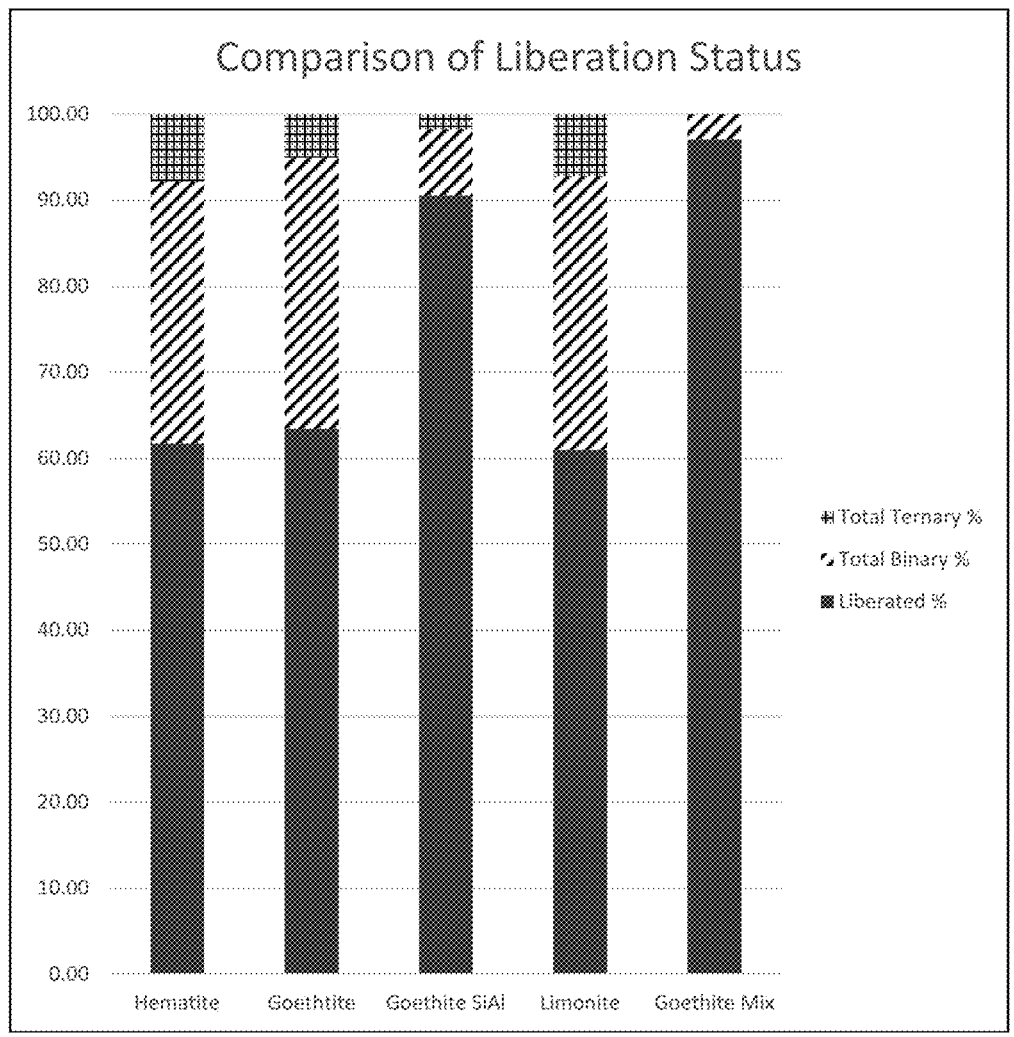
FIG. 39 shows the comparison of liberation status of iron minerals in the dewatering hydrocyclone overflow of FIG. 38.

FIG. 39 shows a comparison of liberation status of iron minerals in the sample. Liberated minerals are those which are not associated with other minerals. Binary minerals are those which are associated with one other mineral. Ternary minerals are those which are associated with two other minerals.

Figure 40:
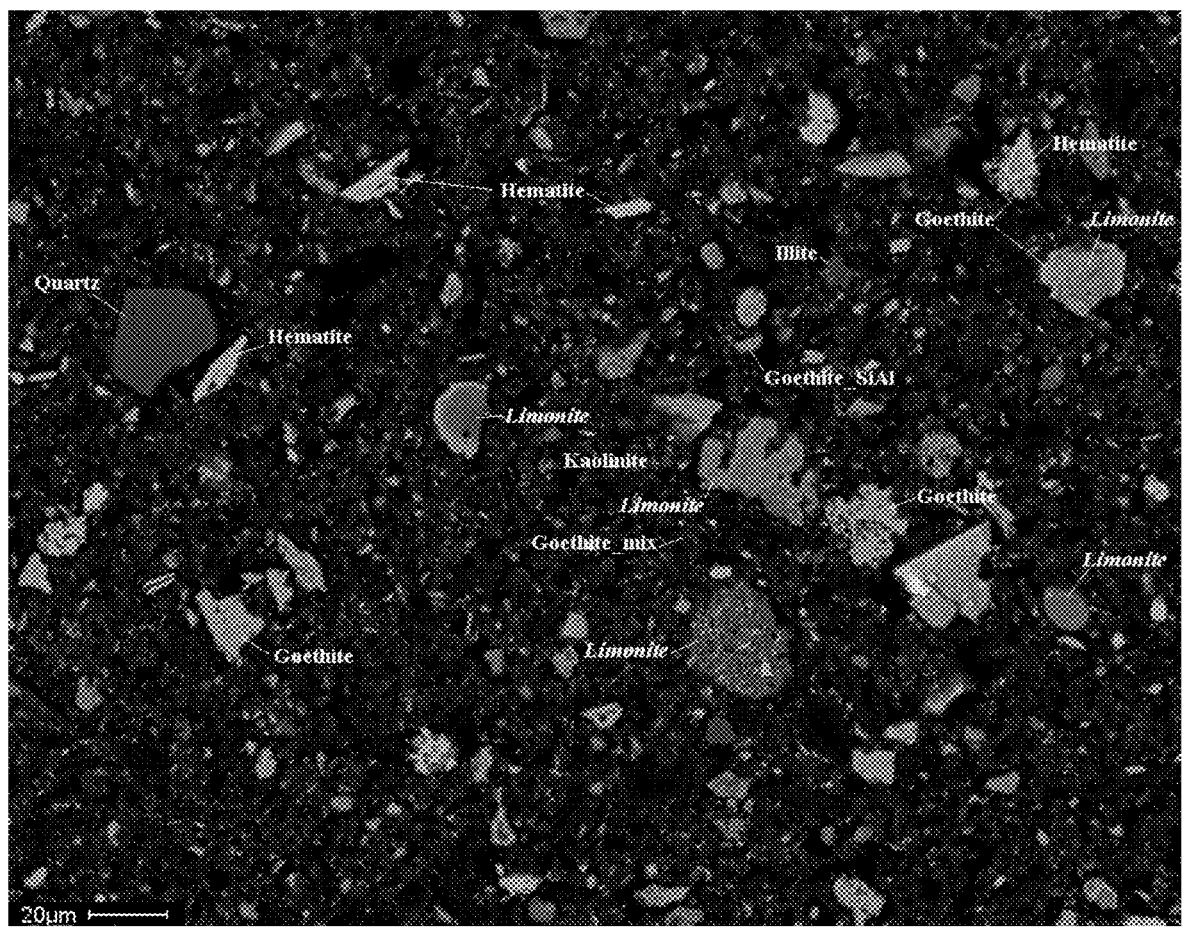
FIG. 40 shows a Scanning Electron Microscope image of the dewatering hydrocyclone overflow of FIG. 38.

SEM imaging of the sample was also carried out to better understand the previously amorphous phases in the XRD spectrum. The resulting image is shown at FIG. 40.

Individual nanoparticles of Hematite, Goethite, Limonite, Goethite mix, Illite and Kaolinite shown in the SEM image have ellipsoid shape and log-normal particle size distribution with typical size of between 1.36-2.15 µm (P10) 3.34-6.83 µm for 50% of the population (P50) and a P90 value of 14.29 µm to 26.82 µm, with the lower and higher numbers reflecting the shortest and longest axis respectively (see Table 6).

Example 2

Following the collection of the additional data and SEM of the amorphous content, the design parameters of the electrochemical treatment were re-configured in order to encourage the reductive dissolution of hematite (to produce magnetite) as shown in formula [10] below. The electrochemical treatment was performed using the apparatus 201 of FIGS. 19-29. The apparatus 201 of FIGS. 19-29 has longer electrodes 240 than the apparatus of FIG. 11, which provides increased duration of action of the electrochemical treatment and the electrical field (in the apparatus of FIG. 11 the electrodes were 150×100 mm in size. In the apparatus of FIGS. 19-29 the electrodes were 200×75 mm in size). A simple carboxylic acid, in the example methanoic (acetic) acid was believed to exhibit a catalytic effect in the magnetite formation reaction as shown in reactions [4] and [5]:

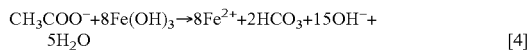

$$CH_3COO^- + 8Fe(OH)_3 \rightarrow 8Fe^{2+} + 2HCO_3 + 15OH^- + 5H_2O \quad [4]$$

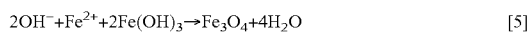

$$2OH^- + Fe^{2+} + 2Fe(OH)_3 \rightarrow Fe_3O_4 + 4H_2O \quad [5]$$

The electrochemical treatment was performed using the apparatus of 201 in FIG. 19-29 with the cell capacity slightly increased from 760 mL to 1 litre in the vertical plane by the use of longer anodes (200 mm high and 75 mm wide) of the same 3 mm mild steel as before.

Prior to treatment, 22 grams of the air dried iron oxyhydroxides prepared from the slimes dewatering circuit earlier was repulped to 250 ml with saline filtered water from the process circuit. 50 ml of glacial acetic acid (AR grade— 80%) was added to the process water, to achieve a measured pH of 3.2. A control sample of 21.16 g received no acetic acid but was treated similarly, with a process pH of 7.1.

The resulting suspensions were stirred for 5 minutes and left to stand for 10 minutes. Then a further 750 mL of clear process water from the settled hydrocyclone overflow 208 was added. Without wishing to be bound by theory, it is believed that the optimal pH for production of magnetite is similar to the pH of seawater—in the range 8.2-8.35. Accordingly the use of saline process water provides some protection to the process by providing a buffering effect to the reduction in pH previously encountered through the release of protons in the ferrous ion conversion to ferric ion. Minor pH adjustment was performed using drop-wise 1.8 M NaOH solution, to as close as possible to 7.7.

A peristaltic pump circulated the hydrocyclone overflow suspension 208 through the plates, as before. The resulting mixture was treated electrochemically using sacrificial mild-steel anodes at a targeted current of 5 A, with current adjustment being by way of the overall applied voltage. As before, to standardise the cell residence time of 30 seconds, water was pumped into the cell and a stopwatch was used at the start and also as the water commenced overflowing from the cell into the weir. After three pump trials using plain water, the settings for the peristaltic pump to enable a cell residence time of 30 seconds were fixed. There were no observable differences with the samples passage through the apparatus other than the generation of hydrogen at the anode indicating some sacrificial anode consumption.

The starting pH, ending pH, applied current and cell voltage for the two samples is provided in Table 11 below.

TABLE 11

Parameters for the two samples

| Aliquot | Starting pH | Current (A) | Volts (per cell) | Ending pH. |
|---|---|---|---|---|
| 1 (Control) | 7.1 | 5.0 | 2.28 | 7.9 |
| 2 (Acetic Acid) | 7.76 | 5.0 | 2.23 | 8.5 |
| Average | 7.43 | 5.0 | 2.25 | 8.2 |

The sample pH for the Control sample dropped immediately from 7.9 to 7.4 following treatment and it was necessary to immediately re-adjust from 7.4 to 8.2 using 1.8M NaOH. There was no observed change to the pH in the second sample where acetic acid had been used.

Immediately following treatment, the solutions were filtered through a pre-weighed, 12 micron filter paper and the resulting precipitate was oven dried at 95° C. for 1 hr.

The resulting oven dried weights of treated iron ore is shown in Table 12.

TABLE 12

Oven Dried Weights of Treated Iron Ore

| Aliquot | Designation | Dried weight (g) | Starting weight (g) | Change (g) |
|---|---|---|---|---|
| 1 | Control (nil treatment) | 21.157 | 21.16 | (0.003) |
| 2 | Acetic acid | 21.604 | 21.997 | (0.393) |

There was no significant change in the weight of the control sample but a decrease of 0.393 g in sample 2 due to inevitable minor process losses within the equipment and the processes of filtering, drying and weighing the residue. However any decrease is almost certainly offset by a theoretical increase resulting from sacrificial anode consumption reporting as ferrous hydroxide. Faraday's Law is customarily used to predict anode consumption based on current consumption, however this provides a large overestimate in practice with slurries of this nature, because the ore itself displays low conductivity compared to the saline water solution. Multiple sample runs with the laboratory unit, including weighing of anodes before and after each run, have indicated a more reliable anode consumption of 0.35 g per minute. It was concluded that this would have a relatively minor impact (1.6%) on the final data given the short duration of each test run and the relatively large (22 g) weight of the treated and control samples.

After drying and weighing, samples of dried filter cakes from both control and treated sample were pulverised in a mortar and pestle and the contents returned to a weigh boat, which was then re-weighed. A hand-held magnet (made from magnetite covered by a 0.03 mm thick plastic bag) was used to recover the magnetic component of the resulting ore.

There was no noticeable, visible magnetic component for the control sample and the colour was a red-brown, consistent with the original hydrocyclone overflow. By contrast, Sample 2, using the acetic acid, had a large portion of the starting ore weight converted to a magnetic form which was easily recoverable from the finished sample at conclusion. The colour was predominantly red-brown with some darker material, however its strong magnetic property leads to the conclusion that the magnetic portion comprises maghemite, magnetite or protomagnetite. These results are provided in Table 13.

TABLE 13

Properties of the treated samples.

| Sample | Designation | Colour appearance | Magnetic component % |
|---|---|---|---|
| 1. | Control | Reddish brown powder | less than 5% |
| 2. | Acetic acid | Brown powder | more than 85% |

Example 3

The hydrocyclone overflow 208 (tailings mud/slurry) was further subjected to electrochemical treatment using the apparatus 201 shown in FIGS. 19-29. As before the apparatus has a 1 L treatment chamber and 13 mild steel electrodes with reversible polarity every 30 seconds. The electrodes were of dimensions 200×75 mm were 3 mm thick, spaced 3 mm apart.

In the electrochemical treatment 210, the hydrocyclone overflow 208 was adjusted to a 4 L slurry with approximately 2.5 wt % solids (i.e. 25 g/L of suspended solids).

The 4 L of slurry was then recirculated through the apparatus 201 of FIGS. 19-29 at a residence time of 30 seconds. The conductivity of the supernatant water of the 4 L slurry was 5.33 mS before the electrochemical treatment described below. Flow to the treatment chamber 210 was via a peristaltic pump, adjusted to give a consistent flow rate through the treatment chamber 210 of 1.0 litres per 30 seconds or 2 litres per minute. The electrochemical treatment was run at 27.3V and 5.0 A for a cell voltage of 2.27 V. To ensure that only steady state conditions had been achieved, the slurry output from the first 30 seconds of cell operation was rejected and the remainder was recirculated through the apparatus 201. The slurry was passed through the apparatus 201 one time, with the pH measured at the completion of each circuit.

Before the electrochemical treatment, the 4 L slurry 208 had a pH of 6.84, and this pH was reduced to 3.2 with the addition of 3 mL/L of glacial acetic acid and then to 1.54 with the addition of 3.75 mL/L of 32% HCl. After three minutes of stirring, this was increased to 7.81 with the addition of 33.75 mL of 5M NaOH. A separate aliquot was filtered to determine if any significant Fe had dissolved or gone into solution at this pH. The qualitative test (alkali addition) was negative for formation of any iron hydroxide. The pH was then further increased during the electrochemical treatment to 9.31 at discharge but this rapidly dropped as the (now electrically charged) suspended solids settled, with the pH dropping from 9.31 to 8.33 after 2 minutes. Without wishing to be bound by theory, this was considered to be at least partly attributable to the release of protons in the conversion of $Fe^{2+}$ to $Fe^{3+}$ within the layered double hydroxide structure of the suspended solids. Following two minutes of settling, the supernatant was relatively clear.

Anode dry weights before and after the process showed a loss of 29 g of mild steel anode metal into the process from Faradaic erosion into the process, diluted into the 4 L of electrolyte.

After the electrochemical treatment was complete, the treated slurry 212 was filtered and air dried at 105° C. overnight. The dried solid fraction 216 was then allowed to cool.

The solids 216 were subjected to separation using a high intensity neodymium doped rare earth magnet and the separated powders were then subjected to X-Ray Fluorescence studies (method XRF-21n) in order to measure quantitative changes in the composition. About 49% of the dried solids (by weight) was collected by the magnet. The results of the XRFD analysis is provided in Table 14.

Notably in the magnetic component there was observed to be a significant 6.0% increase in total Fe calculated as maghemite and a corresponding 9.5% reduction in silica ($SiO_2$) (from 8.01% to 7.25%) and 81.4% reduction in $Na_2O$ (0.7% to 0.13%). It is believed that the unexpected 78.5% increase in the MgO component (from 0.2% to 0.4%) corresponds to adsorbed brucite attached to the magnetic component and possibly incorporated into the layered double hydroxide structure—e.g. as hydrotalcite. However, the MgO component may also correspond to limonite present in the sample. Also important is that the Loss on Ignition (LOI) is performed at 1,000° C., with no ability to determine if the Fe was present as $Fe_3O_4$ rather than as reported—$Fe_2O_3$. Note that both hematite and maghemite are calculated using the same stoichiometric formula.

Example 4

The hydrocyclone overflow 208 (tailings mud/slurry) was further subjected to electrochemical treatment using the apparatus shown in FIGS. 19-29. As before the apparatus 201 has a 1 L treatment chamber and 13 mild steel electrodes with reversible polarity every 30 seconds. The electrodes were of dimensions 200×75 mm were 3 mm thick, spaced 3 mm apart.

In the electrochemical treatment 210, the hydrocyclone overflow 208 was adjusted to a 4 L slurry with approximately 3.75 wt % solids (ie 37.5 g/l of suspended solids).

The 4 L of slurry was then recirculated through the apparatus 201 of FIGS. 19-29 at a residence time of 30 seconds. The conductivity of the supernatant water of the 4 L slurry was 5.33 mS before the electrochemical treatment described below. Flow to the treatment chamber 210 was via a peristaltic pump, adjusted to give a consistent flow rate through the treatment chamber 210 of 1.0 litres per 30 seconds or 2 litres per minute. The electrochemical treatment was run at 36.2V and 8.8 A for a cell voltage of 3.02 V. To ensure that only steady state conditions had been achieved, the slurry output from the first 30 seconds of cell operation was rejected and the remainder was recirculated through the apparatus 201. The slurry was passed through the apparatus 201 one time, with the pH measured at the completion of each circuit.

Before the electrochemical treatment, the 4 L slurry 208 had a pH of 6.83, and this pH was reduced to 3.18 with the addition of 3.75 mL/L of glacial acetic acid and then 1.49 with the addition of 5.0 mL/L of 32% HCl. After three minutes of stirring, this was increased to 7.5 with the addition of 42.5 mL of 5M NaOH. A separate aliquot was filtered to determine if any significant Fe had dissolved or gone into solution at this pH. The qualitative test (alkali addition) was negative for formation of any iron hydroxide. The pH was then further increased during the electrochemical treatment to 9.31 at discharge. Following two minutes of settling the supernatant was relatively clear.

Anode dry weights before and after indicated that the anodes had gained 23 g of a black coating during the treatment, assumed to be magnetite. This was not removed with a polarity reversal of the plates. After the electrochemical treatment was complete, the treated slurry 212 was filtered and air dried at 105° C. overnight. The dried solid fraction 216 was then allowed to cool.

The solids 216 were subjected to separation using a high intensity neodymium rare earth magnet and the separated powders were then subjected to XRay Fluorescence studies (method XRF-21n) in order to measure quantitative changes in the composition. About 80-85% of the dried solids (by weight) was collected by the magnet. The results of the XRFD analysis is provided in Table 14.

In the magnetic component there was observed to be a significant 7.3% increase in Fe present as maghemite $Fe_2O_3$ and a corresponding 9.4% reduction in silica ($SiO_2$) (7.9 to 7.1%) and 85.2% reduction in $Na_2O$ (1.2 to 0.17). The alumina did not reduce as expected showing a 3.7% increase. Without wishing to be bound by theory, this is assumed to be a result of the stronger than necessary magnetic field used and incorporation of $Al_2O_3$ within either the layered double hydroxide structure or possibly within the hydrotalcite lattice that formed due to the presence of Mg in the electrolyte. The unexpected 100% increase in the MgO component (from 0.2% to 0.4%) in the recovered magnetic component is believed to be related to this, although this would normally be non-magnetic. This is believed to be carried over brucite ($Mg(OH)_2$) attached or adsorbed to individual maghemite grains or incorporated as a component of the layered double hydroxide structure, possibly as hydrotalcite. However, the MgO component may also correspond to limonite present in the sample. Hence the magnetic component showed a Loss on Ignition (LOI) of 8.6%—performed at 1,000° C. which would have reduced if MgO had not been inadvertently included. Due to the XRF method used, we were unable to determine if any of the Fe was present as $Fe_3O_4$ rather than the reported $Fe_2O_3$ and note that the increase in anode weight of 23 g, presumed magnetite, has not been accounted for in product. Note that both hematite and maghemite are calculated using the same stoichiometric formula.

TABLE 14

XRF Analysis of products from Examples 3 and 4.

| Analyte | Fe by XRF % | Fe calc. as Goethite % | Fe calc. as Maghemite % | $Al_2O_3$ % | Cl % | $K_2O$ % | MgO % | $Na_2O$ % | $SiO_2$ % | $TiO_2$ % | Sub-total % | Water to 105 C. % | LOI to 1000 C. % | Total all oxides % | Other % |
|---|---|---|---|---|---|---|---|---|---|---|---|---|---|---|---|
| Raw Sample | 53.2 | — | — | 4.55 | 0.203 | 0.058 | 0.14 | 0.33 | 7.55 | 0.27 | 89.32 | 1.86 | 7.99 | 99.17 | 0.83 |
| Ex. 3 Mag. | 53.4 | — | 76.35 | 4.53 | 0.096 | 0.048 | 0.5 | 0.13 | 7.25 | 0.21 | 89.23 | 3.13 | 6.9 | 99.26 | 0.74 |
| Ex. 3 Non-mag. | 47.4 | 75.4 | — | 4.48 | 0.156 | 0.06 | 0.28 | 0.7 | 8.01 | 0.27 | 89.55 | 1.94 | 7.95 | 99.44 | 0.56 |
| Ex. 4 Mag. | 53.8 | — | 76.92 | 4.42 | 0.148 | 0.047 | 0.4 | 0.18 | 7.1 | 0.22 | 89.50 | 0.87 | 8.6 | 98.97 | 1.03 |
| Ex. 4 Non-mag | 46.5 | 73.9 | — | 4.26 | 0.633 | 0.072 | 0.2 | 1.2 | 7.9 | 0.26 | 88.52 | 1.89 | 9.03 | 99.44 | 0.56 |
| Ex. 3 % change mag. vs. non-mag. | | | | 1.12% | −38% | −20.0 | 78.5% | −81.4% | −9.5% | −20.7% | — | — | −13.2% | — | — |
| Ex. 4 % change mag. vs. non-mag | | | | 3.76% | −77% | −34.7% | 100.0% | −85.2% | −9.4% | −15.1% | — | — | −4.7 | — | — |

Examples 3 and 4 above may indicate that it can be important to first prolong the preliminary acidulation phase to separate individual minerals at grain boundaries and secondarily, being able to precisely adjust the magnetic field strength during the separation.

The size analysis in Table 14 may indicate that as hematite progressively weathers to goethite, a higher proportion of the alumina, silica, albite and similar feldspathic minerals may accumulate in the finer fractions and the specific gravity (SG) of the fraction may progressively reduce. Goethite has an SG of approximately 4.28 compared to hematite of 5.2 and impurities such as kaolin, albite, gibbsite and silica have lower SG in turn. However, at coarser size fractions it is believed that these gangue minerals are intimately associated with the goethite and hematite and are attached at grain boundaries. Without wishing to be bound by theory, it is believed that these grain boundaries may weaken as a result of the partial acidulation phase. It is believed that unless these are weakened sufficiently to dislodge the mineral phases, subsequent magnetic separation, unless the intensity is carefully controlled, will also attract the non-magnetic gangue minerals attached at grain boundaries. Other methods of particle separation such as use of ultrasonics has also demonstrated success in some ore types.

Subsequent experiments by the inventors have confirmed that sonication of the dry solids prior to magnetic separation can assist in breaking apart different minerals, for example silica from iron minerals.

Goethite can be considered to be a multi-layered ferric oxide hydroxide mineral with the lowest energy state coinciding with a double $H_2O$ layer bonded in turn to a single $OH_2$—OH hydroxide layer being finally bonded to an inner $Fe^{3+}$ ion bonded to O at the centre. The opposite face may consist of essentially the same crystal geometry in mirror opposite such that it can be described chemically as an $FeOH_2$—$Fe_2OH$ layered structure with an alpha-FeOOH-1.0.0 surface. In these example cases, a dominant feature is the separate bonding to what is chemically attached water. Without wishing to be bound by theory, it is believed that the use of a sacrificial iron containing anode, combined with a strong electrical field, enables substitution of $Fe^{2+}$ ions within the $FeOH_2$—$Fe_2OH$ layered structure to produce either a maghemite or protomagnetite which can then be progressively separated magnetically.

Faradaic Considerations

Anode weights before and after electrochemical treatment may be used to determine the extent to which anode consumption contributed to yield and also to compare with Faradaic calculations for anode consumption at the currents recorded. Although relatively minor quantities of mild steel are sacrificially dissolving into the electrolyte, the $Fe^2$ ions resulting are incorporated into the resulting Layered Double Hydroxide (LDH) structure of the resulting magnetic product and are recovered. The anode consumption is considered economically minor in view of the substantial improvement potentially available in enabling recovery of a weakly to strongly magnetic product. In fact in Example 4 it is believed that the anode weights increased due to the much higher amperage involved, resulting in formation of adhered magnetite coating over the anode surface. As the coating was electrically conductive, no deterioration in process performance was observed.

Generation of Soluble Iron Chemicals

In Examples 3 and 4 the inventors had found that short term acidic pH conditions were favourable to encourage the conversion of non magnetic goethite to maghemite with consistently improving yields correlating with cell amperage (and assumed anode consumption). To confirm that iron, other than from the sacrificial anode, was not dissolving in the electrolyte, a further 4 L of liquor carrying 37.5 g/L of goethite was left stirring for 24 hrs at a pH of 3.2 consistent with glacial acetic acid addition of 3.75 mL/L. After 24 hrs the sample was settled and filtered. The clear filtrate was pH adjusted to 8.5 using 5M NaOH. There was no obvious formation of ferrous or ferric hydroxides, indicating that little if any iron dissolved in the treated liquor even after extensive stirring and agitation. As discussed elsewhere, it is believed that at this pH the only change occurring to the iron ore minerals is the weakening of zone boundaries where there is a localised cementing process that attaches alumina and silica minerals to the goethite and hematite mineral structure.

Temperature Dependent Reactions

Without wishing to be bound by theory, it is believed that some aspects of this invention may result in a phase conversion at lower temperatures than normally experienced or observed. In particular, the inventors believe that the combination of minor acidulation coupled with electrochemical treatment result in a lower temperature to achieve the conversions from and between the mineral phases of goethite, hematite, maghemite or magnetite. In particular it seems that a minimum of 240° C. temperature may not be required to convert hydroxides such as goethite to hematite, particularly if the gamma-form (maghemite) is first formed by the use of an electrical field as disclosed herein.

The process described in preferred embodiments of the present invention provides several advantages. These, for example, may include:

Conversion of a mineral processing waste stream (that is typically disposed of, such as dumped to tailings) to a saleable product, especially a direct shipping ore;

The amount of the saleable iron mineral recovered from the waste stream may be significant. For example, in an example of the present specification 12% of the waste stream was solids, and these solids were converted to 68% hematite. For a mine producing 20,000 tonnes of waste water per day, this may equate to recovery of almost 1,800 tonnes of saleable hematite per day;

Known processes involving the conversion of iron minerals to hematite with the use of heat typically require temperatures of 500-800° C., and the lowest temperature known to the inventors to effect this conversion thermally is 230-250° C.;

For the current commercial production of magnetite similar levels of energy are required. Reduction of hematite under hydrothermal conditions at 350° C.-570° C. and 1-2 kbar pressure is known to occur, however this is also highly energy intensive. In contrast, the process of the present application may be performed at temperatures well below 100° C., and especially at room temperature;

If the process is used to produce magnetite, maghemite or proto-magnetite, then the waste stream can be converted to greater than 65% grade iron, especially greater than 70% grade iron;

The iron minerals in the waste stream may include goethite and/or a largely amorphous phase—the non-kaolin component believed to be predominantly ferrihydrite. Both of these minerals are lower grade, non-magnetic iron minerals, in contrast to magnetite or proto-magnetite which is a higher grade, magnetic iron mineral (a magnetic iron mineral assists in separation). Also hematite (another potential product of the process of the present invention) is a higher grade iron mineral that is very weakly magnetic, but can most easily be separated from the gangue by virtue of its increased specific gravity;

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described includes preferred forms of putting the invention into effect. The invention is, therefore, claimed in any of its forms or modifications within the proper scope of the appended claims appropriately interpreted by those skilled in the art.

The invention claimed is:

1. A process for improving the grade of iron, the process comprising electrochemically treating a slurry comprising at least one iron mineral to thereby improve the grade of the iron in the slurry, wherein electrochemically treating a slurry comprises electrochemically treating at least one solid non-magnetic iron mineral to thereby produce a magnetic iron mineral, and wherein the electrochemical treatment is performed in the presence of a carboxylic acid.

2. The process of claim 1, wherein the at least one solid non-magnetic iron mineral has a particle size of less than 100 μm, and wherein the magnetic iron mineral has a particle size of less than 100 μm.

3. The process of claim 1, wherein the process further comprises the step of magnetically separating the magnetic iron mineral from the slurry.

4. The process of claim 1, wherein the slurry is acidified prior to the electrochemical treatment.

5. The process of claim 4, wherein the slurry is acidified by adding the carboxylic acid to the slurry.

6. The process of claim 5, wherein the carboxylic acid is acetic acid.

7. The process of claim 1, wherein the electrochemical treatment is performed at from 1.5 A to 7.5 A.

8. The process of claim 1, wherein the electrochemical treatment is performed using an electrochemical treatment apparatus comprising a treatment chamber within which a plurality of electrodes are positioned for electrochemical treatment, the treatment chamber comprising at least one inlet and at least one outlet.

9. The process of claim 8, wherein each of the plurality of electrodes is spaced from 0.5 mm to 5 mm apart from each adjacent electrode.

10. The process of claim 8, wherein the electrochemical treatment provides a voltage between two adjacent electrodes of from 0.5 to 10 V.

11. The process of claim 8, wherein electrochemically treating the slurry comprises introducing the slurry into the apparatus and applying a voltage/current to at least two of the plurality of electrodes to provide at least one cathode and at least one anode to thereby electrochemically treat the slurry, and wherein the process further comprises separating the magnetic iron mineral from the electrochemically treated slurry.

12. The process of claim 11, wherein separating iron minerals comprises separating the slurry to provide liquid and solids, and drying the solids.

13. The process of claim 12, wherein the solids are dried at a temperature of less than 120° C.

14. The process of claim 1, wherein after the electrochemical treatment the slurry is filtered to provide filtered solids.

15. The process of claim 14, wherein the filtered solids are dried at a temperature of less than 120° C.

16. The process of claim 15, wherein a magnet is used on the dried filtered solids to separate magnetic dried filtered solids from non-magnetic dried filtered solids.

17. The process of claim 1, wherein the electrochemical treatment is performed at a pH of from 6 to 9.

18. A process for improving the grade of iron, the process comprising electrochemically treating a slurry comprising at least one iron mineral to thereby improve the grade of the iron in the slurry, wherein the step of electrochemically treating a slurry comprises electrochemically treating at least one iron hydroxide and/or at least one iron oxide hydroxide to thereby produce at least one iron oxide, wherein the at least one iron hydroxide and/or the at least one iron oxide hydroxide is a solid, and wherein the electrochemical treatment is performed in the presence of a carboxylic acid.

19. The process of claim 18, wherein the at least one iron hydroxide and/or at least one iron oxide hydroxide has a particle size of less than 100 μm, and wherein the iron oxide has a particle size of less than 100 μm.

20. The process of claim 18, wherein the carboxylic acid is acetic acid.

* * * * *